US012684293B2

(12) United States Patent
Genovese et al.

(10) Patent No.: US 12,684,293 B2
(45) Date of Patent: Jul. 14, 2026

(54) ARTIFICIAL REVERBERATION IN SPATIAL AUDIO

(71) Applicant: QUALCOMM Incorporated, San Diego, CA (US)

(72) Inventors: Andrea Felice Genovese, Brooklyn, NY (US); Graham Bradley Davis, Seattle, WA (US); Andre Schevciw, San Diego, CA (US); Manyu Deshpande, Chula Vista, CA (US)

(73) Assignee: QUALCOMM Incorporated, San Diego, CA (US)

( * ) Notice: Subject to any disclaimer, the term of this patent is extended or adjusted under 35 U.S.C. 154(b) by 219 days.

(21) Appl. No.: 18/428,364

(22) Filed: Jan. 31, 2024

(65) Prior Publication Data

US 2024/0259731 A1 Aug. 1, 2024

Related U.S. Application Data

(60) Provisional application No. 63/514,565, filed on Jul. 19, 2023, provisional application No. 63/512,527, (Continued)

(51) Int. Cl.
*H04R 5/033* (2006.01)

(52) U.S. Cl.
CPC .................................... *H04R 5/033* (2013.01)

(58) Field of Classification Search
CPC .. H04S 2420/01; H04S 2400/11; H04S 7/303; H04S 7/304; H04S 7/302; H04S 7/305; H04S 3/008; H04S 2400/01; H04S 1/005; H04S 7/301; H04S 7/306; H04S 7/40; G06F 21/31; G06F 21/6209; G06F 21/64; G06F 3/041; G06F 3/147;
(Continued)

(56) References Cited

U.S. PATENT DOCUMENTS 7,099,482 B1 8/2006 Jot et al.
2008/0273708 A1* 11/2008 Sandgren ............... H04S 1/005 381/63

(Continued)

OTHER PUBLICATIONS

International Search Report and Written Opinion—PCT/US2024/013969—ISA/EPO—Jun. 10, 2024.

*Primary Examiner* — Lun-See Lao
(74) *Attorney, Agent, or Firm* — QUALCOMM Incorporated; Espartaco Diaz Hidalgo

(57) ABSTRACT

According to a particular implementation of the techniques disclosed herein, a device includes a memory configured to store data corresponding to multiple candidate channel positions. The device also includes one or more processors coupled to the memory and configured to obtain audio data that represents one or more audio sources. The one or more processors are configured to obtain early reflection signals based on the audio data and spatialized reflection parameters. The one or more processors are configured to pan each of the early reflection signals to one or more respective candidate channel position of the multiple candidate channel positions to obtain panned early reflection signals. The one or more processors are also configured to generate an output binaural signal, based on the audio data and the panned early reflection signals, that represents the one or more audio sources with artificial reverberation.

20 Claims, 28 Drawing Sheets

Related U.S. Application Data filed on Jul. 7, 2023, provisional application No. 63/482,744, filed on Feb. 1, 2023.

(58) Field of Classification Search

CPC .... G06F 21/6245; G06F 1/163; G06F 1/1684; G06F 1/1694; G10L 15/22; G10L 17/00; G10L 17/26; G10L 19/173; G10L 19/20; G10L 19/24; G10L 2021/02166; G10L 21/02; G10L 21/0208; G10L 21/0224; G10L 15/26; G10L 19/005; G10L 19/16; G10L 19/18; G10L 25/30; G10L 25/48; G10L 25/63; H04R 5/04; H04R 2499/11; H04R 5/033; H04R 29/00; H04R 5/02; H04R 2460/13; H04R 2420/07; H04R 3/12; H04R 3/04; H04R 29/001; H04R 2420/09; H04R 25/50; H04R 25/70; H04R 27/00; H04R 1/1083; H04R 1/406; H04R 2201/401; H04R 2420/05; H04R 2430/01; H04R 2430/03; H04R 2430/20; H04R 3/005; H04R 5/027; H04R 2499/13; H04R 3/14; G10K 15/10; G10K 11/002; G10K 15/02; H04N 2007/145; H04N 23/60; H04N 23/611; H04N 7/141; H04N 7/147; H04N 7/15; H04N 9/806; H04N 21/2187; G10H 2210/281; G10H 1/0091; G10H 2210/285; G10H 2210/291; G10H 2250/061; G10H 2250/105; G10H 2250/111; G10H 2250/531; G10H 5/02; G10H 2210/136; G10H 2210/305; H03G 3/3089; H04H 60/04

USPC .......... 381/74, 61–66, 71.1–71.4, 94.1–94.5, 381/1–3; 700/94

See application file for complete search history.

(56) References Cited

U.S. PATENT DOCUMENTS

| | | | | |
|---|---|---|---|---|
| 2014/0355794 | A1* | 12/2014 | Morrell | H04S 7/307 381/303 |
| 2016/0255453 | A1 | 9/2016 | Fueg et al. | |
| 2021/0287651 | A1* | 9/2021 | Eronen | H04S 7/305 |
| 2023/0060774 | A1 | 3/2023 | Salehin et al. | |
| 2023/0070774 | A1* | 3/2023 | Li | A61M 25/0113 |

* cited by examiner

ARTIFICIAL REVERBERATION IN SPATIAL AUDIO

I. CROSS-REFERENCE TO RELATED APPLICATIONS

The present application claims priority from Provisional Patent Application No. 63/482,744, filed Feb. 1, 2023, entitled "ARTIFICIAL REVERBERATION IN SPATIAL AUDIO," from Provisional Patent Application No. 63/512,527, filed Jul. 7, 2023, entitled "ARTIFICIAL REVERBERATION IN SPATIAL AUDIO," and from Provisional Patent Application No. 63/514,565, filed Jul. 19, 2023, entitled "ARTIFICIAL REVERBERATION IN SPATIAL AUDIO," the content of each of which is incorporated herein by reference in its entirety.

II. FIELD

The present disclosure is generally related to generating digital artificial reverberation.

III. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

One application of such devices includes providing wireless immersive audio to a user. As an example, a headphone device worn by a user can receive streaming audio data from a remote server for playback to the user. Artificial reverberation effects can be added to improve the immersive perceptual quality and realism of spatial audio experienced over headphones or similar device. Using conventional reverberation techniques, the audio output of the reverberation itself is not spatialized, and as a result directional information of virtual reflections is not experienced by the user. Other techniques that spatialize reflections are computationally expensive (e.g., direct re-computation of the direction of every reflection when the user's head moves), or provide a statically-spatialized reverberation which does not respond to a user's movements in their listening environment.

IV. SUMMARY

According to a particular implementation of the techniques disclosed herein, a device includes a memory configured to store data corresponding to multiple candidate channel positions. The device also includes one or more processors coupled to the memory and configured to obtain audio data that represents one or more audio sources. The one or more processors are configured to obtain early reflection signals based on the audio data and spatialized reflection parameters. The one or more processors are configured to pan each of the early reflection signals to one or more respective candidate channel position of the multiple candidate channel positions to obtain panned early reflection signals. The one or more processors are also configured to generate an output binaural signal, based on the audio data and the panned early reflection signals, that represents the one or more audio sources with artificial reverberation.

According to another particular implementation of the techniques disclosed herein, a method includes obtaining, at one or more processors, audio data representing one or more audio sources. The method includes obtaining, at the one or more processors, early reflection signals based on the audio data and spatialized reflection parameters. The method includes panning, at the one or more processors, each of the early reflection signals to one or more respective candidate channel position of multiple candidate channel positions to generate panned early reflection signals. The method also includes obtaining, at the one or more processors, an output binaural signal based on the audio data and the panned early reflection signals, the output binaural signal representing the one or more audio sources with artificial reverberation.

According to another particular implementation of the techniques disclosed herein, a non-transitory computer-readable medium includes instructions that, when executed by one or more processors, cause the one or more processors to obtain audio data representing one or more audio sources. The instructions, when executed by the one or more processors, cause the one or more processors to obtain early reflection signals based on the audio data and spatialized reflection parameters. The instructions, when executed by the one or more processors, cause the one or more processors to pan each of the early reflection signals to one or more respective candidate channel position of multiple candidate channel positions to obtain panned early reflection signals. The instructions, when executed by the one or more processors, also cause the one or more processors to generate an output binaural signal, based on the audio data and the panned early reflection signals, that represents the one or more audio sources with artificial reverberation.

According to another particular implementation of the techniques disclosed herein, an apparatus includes means for obtaining audio data that represents one or more audio sources. The apparatus includes means for obtaining early reflection signals based on the audio data and spatialized reflection parameters. The apparatus includes means for panning each of the early reflection signals to one or more respective candidate channel position of multiple candidate channel positions to obtain panned early reflection signals. The apparatus also includes means for generating an output binaural signal, based on the audio data and the panned early reflection signals, that represents the one or more audio sources with artificial reverberation.

Other implementations, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
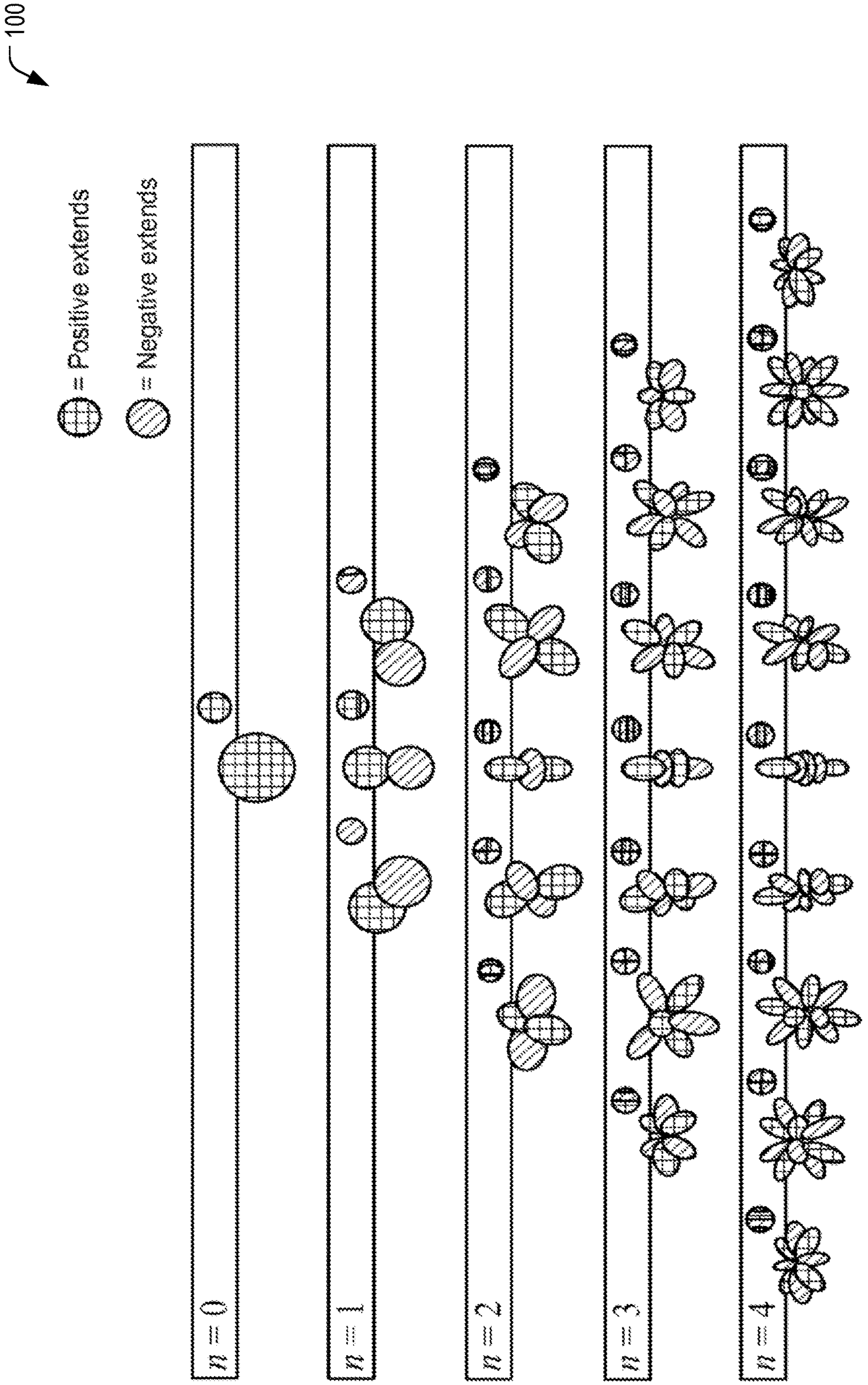
FIG. 1 is a diagram illustrating spherical harmonic basis functions of various orders and sub-orders.

Systems and methods for generating artificial reverberation in spatial audio are described that use an intermediate sound field representation of incoming audio sources and also use a temporary representation in multi-channel format for generating early reflections. In conventional systems that spatialize reflections, updating the spatialized reflections in response to user head movement is performed by recomputing the direction of every reflection, which is computationally expensive, or a statically spatialized reverberation is used that does not respond to a user's movements in their listening environment, which can negatively impact the user's experience. By using an intermediate sound field representation of incoming audio sources and also using a temporary representation in multi-channel format for generating early reflections, the disclosed systems and methods maintain spatial information in a computationally efficient manner and enable dynamic rendering, resulting in an improved immersive listening experience with a scalable computational complexity. Furthermore, according to some aspects, the digital reverberation effect is driven by multiple layers of customizable parameters for user control.

According to some aspects, the disclosed techniques involve separation of the virtual acoustic model into two components: "early reflections" and "late reverberation." "Early reflections" represent the behavior of sound reflections within a room over the first few milliseconds of time in response to the emission of sound by a source. Using a source-receiver position relationship, early reflection patterns can be generated using room acoustics models and are encoded as gain coefficients, time of arrival delays, and direction-of-arrival polar coordinates. These patterns can respond to input parameters describing rectangular virtual room dimensions, surface material, and source-receiver positional coordinates. "Late reverberation" represents the behavior of sound within a room after reflecting over room surfaces a few times, reaching a diffuse state. Late reverberation patterns can be simulated using statistically relevant parameters defining the general envelope of the reflection decays and diffusion rate. This part of the reverb tail can be assumed to be isotropic, thus non-spatial.

According to some aspects, the disclosed techniques include encoding and decoding of incoming sources into a sound field representation, such as using an ambisonics format of arbitrary order, with a temporary intermediate representation in multichannel format. The use of ambisonics allows for a scalable computational load which is fixed with respect to a number of input streams, and can be paired to a head-tracker to achieve a three degree of freedom (3DOF) rotational response. The final output can be rendered and mixed in an output signal, such as a two-channel binaural format for headphones reproduction.

According to some aspects, ambisonics encoding of incoming audio streams into a spherical soundfield, followed by decoding into a fixed number of channels, allows the complexity associated with computing early reflections to be controlled and scalable. The complexity of such early reflections computation is independent from the number of incoming source streams and instead depends on the ambisonics order used for encoding. In some implementations, binaural rendering at a binaural rendering stage is also advantaged by the ambisonics format because a fixed number S of head-related impulse responses (HRIRs) can be used (e.g., $S=(N+1)^2$, with N representing the ambisonics order number) as opposed to straight spatialization techniques which require an HRIR for each encoded reflection.

In addition, the ambisonics format allows early reflections to respond to tracked head rotations, which enables generation of a 3DOF response and enhanced immersive realism. According to some aspects, the disclosed techniques also enable a six-degree of freedom (6DOF) response that is based on user head translation in addition to rotation.

According to some aspects, the late reverberation generation of the disclosed techniques leverages knowledge about perceptually relevant attributes of room acoustics, resulting in a highly efficient two-channel decorrelated tail which sounds natural and isotropically diffused. The rendering complexity depends on the length of the reverberation tail and is independent of the number of sources.

According to some aspects, the disclosed systems and methods are responsive to three different sets of customizable parameters. For example, geometrical room parameters can be used to link virtual early reflections to real rooms, intuitive signal envelope parameters allow for a simple and fast generation of late reverb with perceivable listening impact, and mixing parameters allow for the intensity of the effect to be adjusted. The combination of such parameters can enable users to either simulate the sound response of real rooms or to create novel artistic room effects that are not found in nature.

Figure 2:
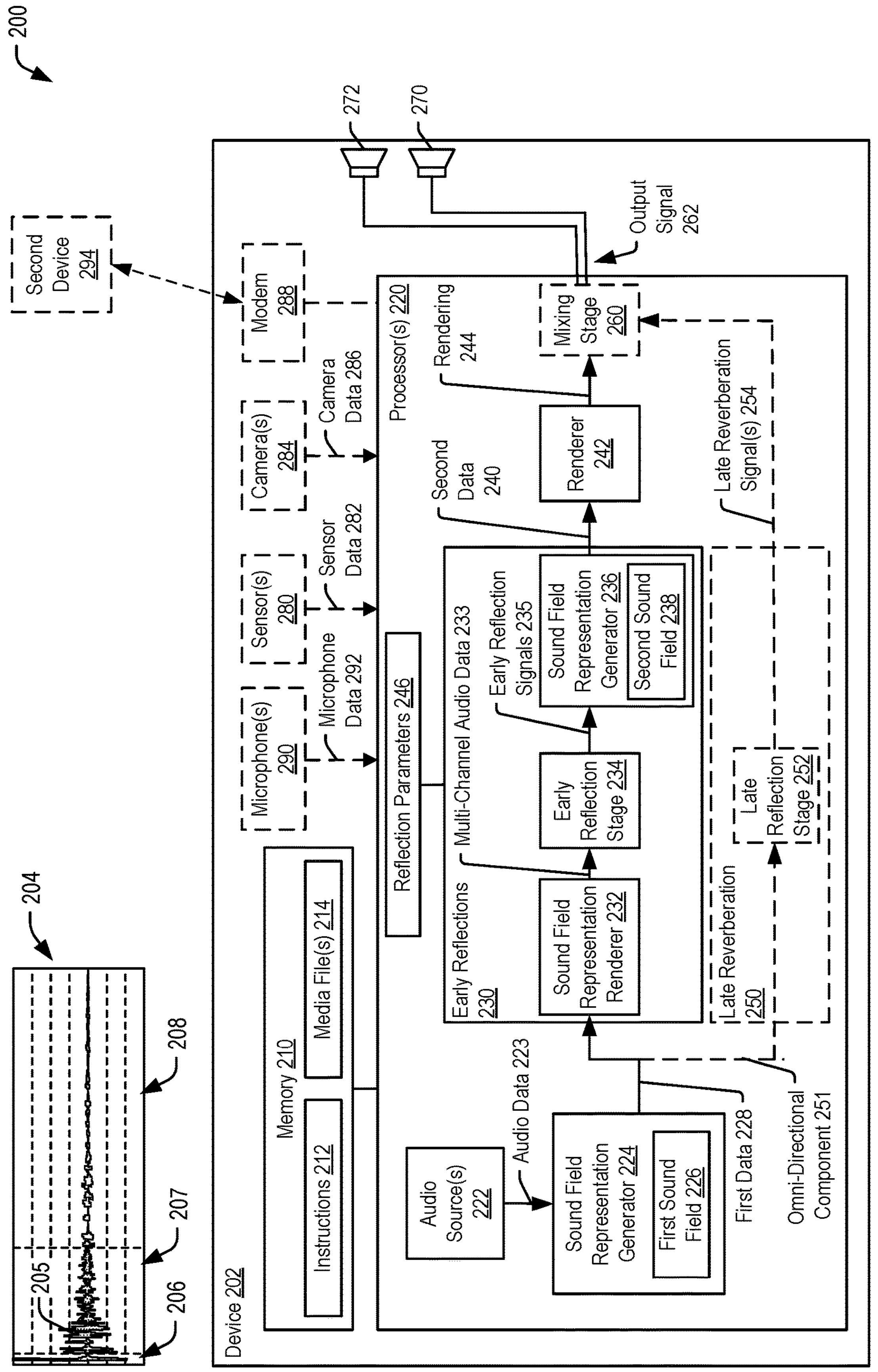
FIG. 2 is a block diagram illustrating an example of an implementation of a system for generating artificial reverberation in spatial audio, in accordance with some examples of the present disclosure.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 2 depicts a device 202 including one or more processors ("processor(s)" 220 of FIG. 2), which indicates that in some implementations the device 202 includes a single processor 220 and in other implementations the device 202 includes multiple processors 220. For ease of reference herein, such features are generally introduced as "one or more" features and are subsequently referred to in the singular unless aspects related to multiple of the features are being described.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

In some drawings, multiple instances of a particular type of feature are used. Although these features are physically and/or logically distinct, the same reference number is used for each, and the different instances are distinguished by addition of a letter to the reference number. When the features as a group or a type are referred to herein e.g., when no particular one of the features is being referenced, the reference number is used without a distinguishing letter. However, when one particular feature of multiple features of the same type is referred to herein, the reference number is used with the distinguishing letter. For example, referring to FIG. 11, multiple candidate channel positions are illustrated and associated with reference numbers 1160A, 1160B, 1160C, 1160D, 1160E, 1160F, 1160G, 1160H, and 1160I. When referring to a particular one of these candidate channel positions, such as a candidate channel position 1160A, the distinguishing letter "A" is used. However, when referring to any arbitrary one of these candidate channel positions or to these candidate channel positions as a group, the reference number 1160 is used without a distinguishing letter.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc.

Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "obtaining," "generating," "calculating," "estimating," "using," "selecting," "accessing," and "determining" may be used interchangeably. For example, "obtaining," "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device. To illustrate, "generating" a parameter (or a signal) may include actively generating, estimating, or calculating the parameter (or the signal), or selecting, obtaining, reading, receiving, or retrieving the pre-existing parameter (or the signal) (e.g., from a memory, buffer, container, data structure, lookup table, transmission channel, etc.), or combinations thereof, as non-limiting examples.

In general, techniques are described for coding of three dimensional (3D) sound data, such as ambisonics audio data. Ambisonics audio data may include different orders of ambisonic coefficients, e.g., first order or second order and more (which may be referred to as higher-order ambisonics (HOA) coefficients corresponding to a spherical harmonic basis function having an order greater than one). Ambisonics audio data may also include mixed order ambisonics (MOA). Thus, ambisonics audio data may include at least one ambisonic coefficient corresponding to a harmonic basis function.

The evolution of surround sound has made available many audio output formats for entertainment. Examples of such consumer surround sound formats are mostly 'channel' based in that they implicitly specify feeds to loudspeakers in certain geometrical coordinates. The consumer surround sound formats include the popular 5.1 format (which includes the following six channels: front left (FL), front right (FR), center or front center, back left or surround left, back right or surround right, and low frequency effects (LFE)), the growing 7.1 format, and various formats that includes height speakers such as the 7.1.4 format and the 22.2 format (e.g., for use with the Ultra High Definition Television standard). Non-consumer formats can span any number of speakers (e.g., in symmetric and non-symmetric geometries) often termed 'surround arrays.' One example of such a sound array includes 32 loudspeakers positioned at coordinates on the corners of a truncated icosahedron.

The input to a future Moving Picture Experts Group (MPEG) encoder is optionally one of three possible formats: (i) traditional channel-based audio (as discussed above), which is meant to be played through loudspeakers at pre-specified positions; (ii) object-based audio, which involves discrete pulse-code-modulation (PCM) data for single audio objects with associated metadata containing their location coordinates (amongst other information); or (iii) scene-based audio, which involves representing the sound field using coefficients of spherical harmonic basis functions (also called "spherical harmonic coefficients" or SHC, "Higher-order Ambisonics" or HOA, and "HOA coefficients"). The future MPEG encoder may be described in more detail in a document entitled "Call for Proposals for 3D Audio," by the International Organization for Standardization/International Electrotechnical Commission (ISO)/(IEC) JTC1/SC29/WG11/N13411, released January 2013 in Geneva, Switzerland, and available at http://mpeg.chiariglione.org/sites/default/files/files/standards/parts/docs/w13411.zip.

There are various 'surround-sound' channel-based formats currently available. The formats range, for example, from the 5.1 home theatre system (which has been the most successful in terms of making inroads into living rooms beyond stereo) to the 22.2 system developed by NHK (Nippon Hoso Kyokai or Japan Broadcasting Corporation). Content creators (e.g., Hollywood studios) would like to produce a soundtrack for a movie once, and not spend effort to remix it for each speaker configuration. Recently, Standards Developing Organizations have been considering ways in which to provide an encoding into a standardized bitstream and a subsequent decoding that is adaptable and agnostic to the speaker geometry (and number) and acoustic conditions at the location of the playback (involving a renderer).

To provide such flexibility for content creators, a hierarchical set of elements may be used to represent a sound field. The hierarchical set of elements may refer to a set of elements in which the elements are ordered such that a basic set of lower-ordered elements provides a full representation of the modeled sound field. As the set is extended to include higher-order elements, the representation becomes more detailed, increasing resolution.

One example of a hierarchical set of elements is a set of spherical harmonic coefficients (SHC). The following expression demonstrates a description or representation of a sound field using SHC:

$$p_i(t, r_r, \theta_r, \varphi_r) = \sum_{\omega=0}^{\infty}\left[4\pi\sum_{n=0}^{\infty} j_n(kr_r)\sum_{m=-n}^{n} A_n^m(k)Y_n^m(\theta_r, \varphi_r)\right]e^{j\omega t},$$

The expression shows that the pressure $p_i$ at any point $\{r_r, \theta_r, \varphi_r\}$ of the sound field, at time t, can be represented uniquely by the SHC, $$A_n^m(k).$$

Here, $$k = \frac{\omega}{c},$$

c is the speed of sound (~343 m/s), $\{r_r, \theta_r, \varphi_r\}$ is a point of reference (or observation point), $j_n(\bullet)$ is the spherical Bessel function of order n, and $$Y_n^m(\theta_r, \varphi_r)$$

are the spherical harmonic basis functions of order n and suborder m. It can be recognized that the term in square brackets is a frequency-domain representation of the signal (i.e., $S(\omega,r_r,\theta_r,\varphi_r)$) which can be approximated by various time-frequency transformations, such as the discrete Fourier transform (DFT), the discrete cosine transform (DCT), or a wavelet transform. Other examples of hierarchical sets include sets of wavelet transform coefficients and other sets of coefficients of multiresolution basis functions.

FIG. 1 is a diagram 100 illustrating spherical harmonic basis functions from the zero order (n=0) to the fourth order (n=4). As can be seen, for each order, there is an expansion of suborders m which are shown but not explicitly noted in the example of FIG. 1 for ease of illustration purposes. A number of spherical harmonic basis functions for a particular order may be determined as: # basis functions=(n+1)^2. For example, a tenth order (n=10) would correspond to 121 spherical harmonic basis functions (e.g., (10+1)^2).

The SHC $$A_n^m(k)$$

can either be physically acquired (e.g., recorded) by various microphone array configurations or, alternatively, they can be derived from channel-based or object-based descriptions of the sound field. The SHC represent scene-based audio, where the SHC may be input to an audio encoder to obtain encoded SHC that may promote more efficient transmission or storage. For example, a fourth-order representation involving $(4+1)^2$ (25, and hence fourth order) coefficients may be used.

As noted above, the SHC may be derived from a microphone recording using a microphone array. Various examples of how SHC may be derived from microphone arrays are described in Poletti, M., "Three-Dimensional Surround Sound Systems Based on Spherical Harmonics," J. Audio Eng. Soc., Vol. 53, No. 11, 2005 November, pp. 1004-1025.

To illustrate how the SHCs may be derived from an object-based description, consider the following equation. The coefficients $$A_n^m(k)$$

for the sound field corresponding to an individual audio object may be expressed as:

$$A_n^m(k) = g(\omega)(-4\pi ik)h_n^{(2)}(kr_s)Y_n^{m^*}(\theta_s, \varphi_s),$$

where i is $$\sqrt{-1},\ h_n^{(2)}(\cdot)$$

is the spherical Hankel function (of the second kind) of order n, and $\{r_s,\theta_s,\varphi_s\}$ is the location of the object. Knowing the object source energy $g(\omega)$ as a function of frequency (e.g., using time-frequency analysis techniques, such as performing a fast Fourier transform on the PCM stream) enables conversion of each PCM object and the corresponding location into the SHC $$A_n^m(k).$$

Further, it can be shown (since the above is a linear and orthogonal decomposition) that the $$A_n^m(k)$$

coefficients for each object are additive. In this manner, a multitude of PCM objects can be represented by the $$A_n^m(k)$$

coefficients (e.g., as a sum of the coefficient vectors for the individual objects). Essentially, the coefficients contain information about the sound field (the pressure as a function of 3D coordinates), and the above represents the transformation from individual objects to a representation of the overall sound field, in the vicinity of the observation point $\{r_r,\theta_r,\varphi_r\}$.

Referring to FIG. 2, a system 200 includes a device 202 that is configured to generate artificial reverberation in spatial audio. The device 202 uses an intermediate sound field representation of one or more audio sources, temporarily converts the intermediate sound field representation to multi-channel audio to generate early reflection signals for the one or more audio sources, and converts the early reflection signals to a sound field representation for further processing. The device 202 may also use omni-directional components of the intermediate sound field representation to generate one or more late reverberation signals that may be combined with a rendering of the sound field representation of the early reflection signals.

A diagram 204 illustrates an example of a reflection signal 205, with the horizontal axis representing time, and the vertical axis representing signal amplitude or intensity. An initial signal 206, such as an impulse, occurs at a first time (e.g., time 0). Reflections of the initial signal 206 from surrounding objects, such as the walls, ceiling, and floor of a room, result in a set of early reflections 207 that have perceivable direction to a listener in the room. As time continues, late reverberation 208 represents the behavior of the sound in the room after reflecting over room surfaces multiple times, reaching a diffuse state that is generally perceived by a listener to be isotropic, and thus non-spatial. The device 202 includes an early reflections component 230 to generate early reflection signals 235 for one or more audio sources 222 and optionally includes a late reverberation component 250 to generate one or more late reverberation signals 254 for the one or more audio sources 222, as described further below.

The device 202 includes a memory 210 and one or more processors 220. The memory 210 includes instructions 212 that are executable by the one or more processors 220. The memory 210 also includes one or more media files 214. The one or more media files 214 are accessible to the one or more processors 220 as a source of sound information, as described further below. In some examples, the one or more processors 220 are integrated in a portable electronic device, such as a headset, smartphone, tablet computer, laptop computer, or other electronic device.

The one or more processors 220 are configured to execute the instructions 212 to perform operations associated with audio processing. To illustrate, the one or more processors 220 are configured to obtain audio data 223 from the one or more audio sources 222. For example, the one or more audio sources 222 may correspond to a portion of one or more of the media files 214, a game engine, one or more other sources of sound information, such as audio data captured by one or more optional microphones 290 that may be integrated in or coupled to the device 202, or a combination thereof. In an example, the audio data 223 includes ambisonics data and corresponds to at least one of two-dimensional (2D) audio data that represents a 2D sound field or three-dimensional (3D) audio data that represents a 3D sound field. In another example, the audio data 223 includes audio data in a traditional channel-based audio channel format, such as 5.1 surround sound format. As used herein, "ambisonics data" includes a set of one or more ambisonics coefficients that represent a sound field. In another example, the audio data 223 includes audio data in an object-based format.

The one or more processors 220 include a sound field representation generator 224, the early reflections component 230, and a renderer 242, such as a binaural renderer. According to a particular aspect, the sound field representation generator 224 is configured to generate the first data 228 based on scene-based audio data, object-based audio data, channel-based audio data, or a combination thereof. For example, the sound field representation generator 224 is configured to convert the audio data 223 that are not already in a scene-based audio format, such as audio data 223 having object-based or channel-based audio formats, to sound field representations. The sound field representation generator 224 combines the sound fields for each of the one or more audio sources 222 to generate a representation of a first sound field 226 of the combined audio, which is output as the first data 228 for further processing. According to an aspect, the first data 228 corresponds to ambisonics data.

The early reflections component 230 is configured to obtain the first data 228 representing the first sound field 226 of the one or more audio sources 222. The early reflections component 230 includes a sound field representation renderer 232, an early reflection stage 234, and a sound field representation generator 236.

The sound field representation renderer 232 is configured to process the first data 228 to generate multi-channel audio data 233. For example, the multi-channel audio data 233 can correspond to multiple virtual sources. To illustrate, the multi-channel audio data 233 can be generated based on rendering the first data 228 for an arrangement of a fixed number of decoding points corresponding to virtual audio sources (e.g., virtual speakers), as described further below.

The early reflection stage 234 is configured to generate early reflection signals 235 based on the multi-channel audio data 233 and spatialized reflection parameters 246 corresponding to an audio environment, such as a room that includes the virtual speakers and the listener. In a particular implementation, the spatialized reflection parameters 246 include one or more of: room dimension parameters, surface material parameters for the walls, floor, and ceiling of the room, source position parameters of the virtual speakers, or listener position parameters, as described further with reference to FIG. 7. The early reflection signals 235 include one or more reflection signals at the listener's position for each of the virtual audio sources off of each of the walls, floor, and ceiling.

The sound field representation generator 236 is configured to generate second data 240 representing a second sound field 238 of spatialized audio that includes at least the early reflection signals 235. According to an aspect, the second data 240 corresponds to ambisonics data. In some implementations, the sound field representation generator 236 also combines an ambisonics portion of the audio data 223 into the second sound field 238 along with the early reflection signals 235, such as described further with reference to FIG. 3 and FIG. 5. In other implementations, the sound field representation generator 236 combines the first data 228 representing first sound field 226 into the second sound field 238 along with the early reflection signals 235, such as described further with reference to FIG. 6A. In some implementations, the sound field representation generator 236 also performs a rotation operation to rotate the second sound field 238 in response to a rotational movement of a listener's head, such as described further with reference to FIG. 3, FIG. 4A, FIG. 4B, and FIG. 4D. In some implementations, the sound field representation generator 236 also performs a translation operation to adjust the early reflection signals 235 based on a lateral movement of the listener's head, as described further with reference to FIG. 7.

The renderer 242 is configured to generate a rendering 244, such as a binaural rendering, of the second data 240. In a particular implementation in which an optional mixing stage 260 is omitted from the device 202, the renderer 242 is configured to generate an output signal 262, such as a binaural output signal, based on the second data 240, with the output signal 262 representing the one or more audio sources 222 with artificial reverberation. According to some aspects, the one or more processors 220 are configured to provide the output signal 262 for playout to earphone speakers. For example, the rendering 244 of the second data 240 can correspond to the output signal 262 that, in some implementations, can represent two or more loudspeaker gains to drive two or more loudspeakers. For example, a first loudspeaker gain is generated to drive a first loudspeaker 270 and a second loudspeaker gain is generated to drive a second loudspeaker 272. To illustrate, in some implementations, the one or more processors 220 are configured to perform binauralization of the second data 240, such as using one or more HRTFs or binaural room impulse responses (BRIRs) to generate the loudspeaker gains that are provided to the loudspeakers 270, 272 for playout.

Optionally, the one or more processors 220 also include the late reverberation component 250 and the mixing stage 260. The late reverberation component 250 includes a late reflection stage 252 that is configured to process an omni-directional component 251 of the first data 228 and to generate one or more late reverberation signals 254, such as mono, stereo, or multi-channel signals representing the late reverberation 208. An example of operation of the late reverberation component 250 is described in further detail with reference to FIG. 9.

Figure 3:
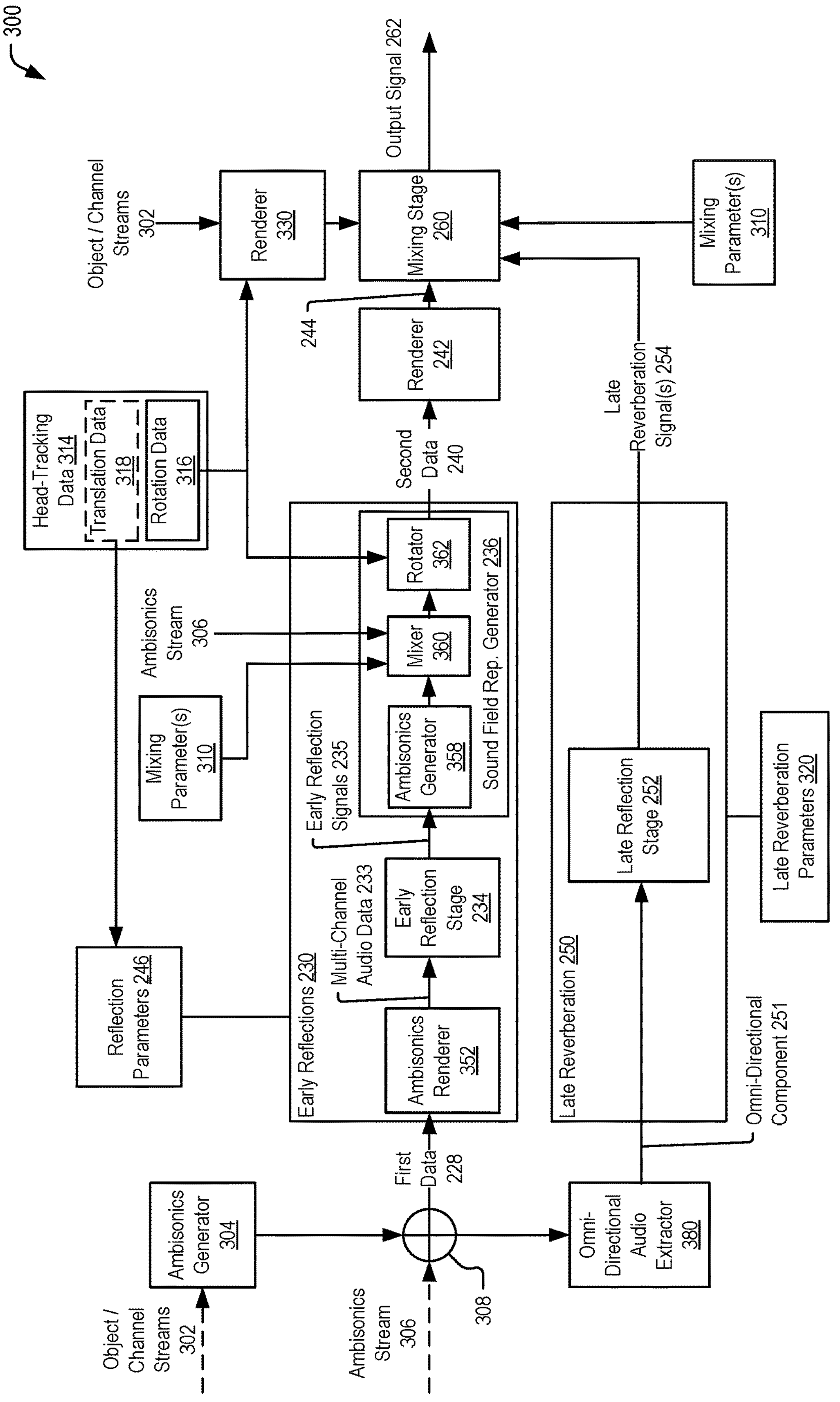
FIG. 3 is a block diagram of an illustrative aspect of components of a device of FIG. 2, in accordance with some examples of the present disclosure.

According to an aspect, the mixing stage 260 is configured to generate the output signal 262 based on the one or more late reverberation signals 254, one or more mixing parameters, and the rendering 244 of the second sound field 238, as described further with reference to FIG. 3.

The device 202 optionally includes one or more sensors 280, one or more cameras 284, a modem 288, the first loudspeaker 270, the second loudspeaker 272, the one or more microphones 290, or a combination thereof. In an illustrative example, the device 202 corresponds to a wearable device. To illustrate, the one or more processors 220, the memory 210, the one or more sensors 280, the one or more cameras 284, the modem 288, the one or more microphones 290, and the loudspeakers 270, 272 may be integrated in a headphone device in which the first loudspeaker 270 is configured to be positioned proximate to a first ear of a user while the headphone device is worn by the user, and the second loudspeaker 272 is configured to be positioned proximate to a second ear of the user while the headphone device is worn by the user.

In some implementations in which the device 202 includes one or more speakers, such as the loudspeakers 270, 272, the one or more speakers are coupled to the one or more processors 220 and configured to play out the output signal 262. However, in some implementations in which the loudspeakers 270, 272 are omitted or not selected (e.g., disabled or bypassed) for audio playout, the output signal 262 is instead transmitted to another device for playout, such as described below in relation to the modem 288.

In some implementations in which the device 202 includes the one or more sensors 280, the one or more sensors 280 are configured to generate sensor data 282 indicative of a movement of the device 202, a pose of the device 202, or a combination thereof. As used herein, the "pose" of the device 202 indicates a location and an orientation of the device 202. The one or more processors 220 may use the sensor data 282 to apply rotation, translation, or both, during generation of the second data 240. The one or more sensors 280 include one or more inertial sensors such as accelerometers, gyroscopes, compasses, positioning sensors (e.g., a global positioning system (GPS) receiver), magnetometers, inclinometers, optical sensors, one or more other sensors to detect acceleration, location, velocity, angular orientation, angular velocity, angular acceleration, or any combination thereof, of the device 202. In one example, the one or more sensors 280 include GPS, electronic maps, and electronic compasses that use inertial and magnetic sensor technology to determine direction, such as a 3-axis magnetometer to measure the Earth's geomagnetic field and a 3-axis accelerometer to provide, based on a direction of gravitational pull, a horizontality reference to the Earth's magnetic field vector. In some examples, the one or more sensors 280 include one or more optical sensors (e.g., cameras) to track movement, individually or in conjunction with one or more other sensors (e.g., inertial sensors).

In some implementations in which the device 202 includes the one or more cameras 284, the one or more cameras 284 are configured to generate camera data 286 indicating an environment of the device 202. The one or more cameras 284 may be included in the one or more sensors 280 or may be distinct from the one or more sensors 280. The one or more processors 220 may process the camera data 286 with a scene detector to determine or estimate room characteristics for the location of the device 202, which can enable the early reflections component 230 to generate early reflection signals 235 that emulate the reflections that a user would hear based on the geometry and/or materials of the surrounding walls, ceiling, and floor. In some implementations, the one or more cameras 284 include a depth camera or similar device to measure or estimate the surrounding room characteristics. Although detection of room characteristics are described via operation of the one or more cameras 284, in some implementations the room parameters are fetched from a server, if available. For example, in implementations in which the device 202 includes the modem 288, the device 202 may transmit location information to a server via the modem 288, and the server may return information regarding the room geometry, material characteristics, etc., that is used by the device 202 for generating the early reflection signals 235.

In some implementations in which the device 202 includes the modem 288 coupled to the one or more processors 220, the modem 288 is configured to transmit the output signal 262 to an earphone device. For example, a second device 294 may correspond to an earphone device (e.g., an in-ear or over-ear earphone device, such as a headset) that is configured to receive and play out the output signal 262 to a user of the second device 294. In some implementations, the second device 294 also, or alternatively, corresponds to a source of audio data, such as a streaming device (e.g., a server, or one or more external microphones). In such implementations, the audio data from the second device 294 is received via the modem 288 and provided to the one or more processors 220 as one of the audio source(s) 222.

Optionally, the one or more microphones 290 are coupled to the one or more processors 220 and configured to provide microphone data 292 representing sound of at least one of the one or more audio sources 222. As a result, in such implementations, the first data 228 is at least partially based on the microphone data 292.

By converting the audio data 223 to a sound scene format in which the combined audio of the one or more audio sources 222 is represented by the first sound field 226, the device 202 reduces the complexity that would otherwise result from directly generating reflection signals for an arbitrary number of audio sources having various audio formats. For example, in some implementations, the device 202 can select a resolution of the first data 228, such as by selecting an ambisonics order to encode the first sound field 226, which in turn determines the number of channels to be used in the multi-channel audio data 233. Thus, the early reflection stage 234 generates reflections for a controllable and scalable number of virtual audio sources, independent of how many audio sources are represented in the first sound field 226. Use of a sound scene format such as ambisonics also enables the renderer 242 to use a fixed number of precalculated HRIRs, as compared to a straight specialization method which requires an HRIR for each encoded reflection. Additionally, the sound scene format enables the early reflections component 230 to respond to tracked head movements, such as rotations and/or translations, which enables the device 202 to provide immersive realism to a user.

In addition, in implementations in which the device 202 includes the late reverberation component 250, generation of the one or more late reverberation signals 254 can leverage knowledge about perceptually relevant attributes of room acoustics, resulting in an efficient two-channel decorrelated tail which sounds natural and isotropically diffused. In addition, the rendering complexity of the late reverberations is based on the length of the reverberation tail, regardless of the number of sources.

Another benefit is that the artificial reverberation generated by the device 202 can be controlled via sets of customizable parameters, such as the reflection parameters 246, mixing parameters, and late reverberation parameters, as described further below. For example, geometrical room parameters included in the reflection parameters 246 can link virtual early reflections to actual physical rooms, intuitive signal envelope parameters included in the one or more late reverberation parameters allow for an efficient generation of late reverberation with perceivable listening impact, and mixing parameters allow adjustment of the intensity of the artificial reverberation? effect. The combination of these inputs can enable users to either simulate the sound response of real rooms or create novel artistic room effects not found in nature.

Although examples included herein describe the first data 228 and the second data 240 as ambisonics data, in other implementations the first data 228, the second data 240, or both can have a scene-based format that is not ambisonics. For example, advantages described above for ambisonics can arise from use of another format that has similar attributes, such as being rotatable and invertible.

Figure 15:
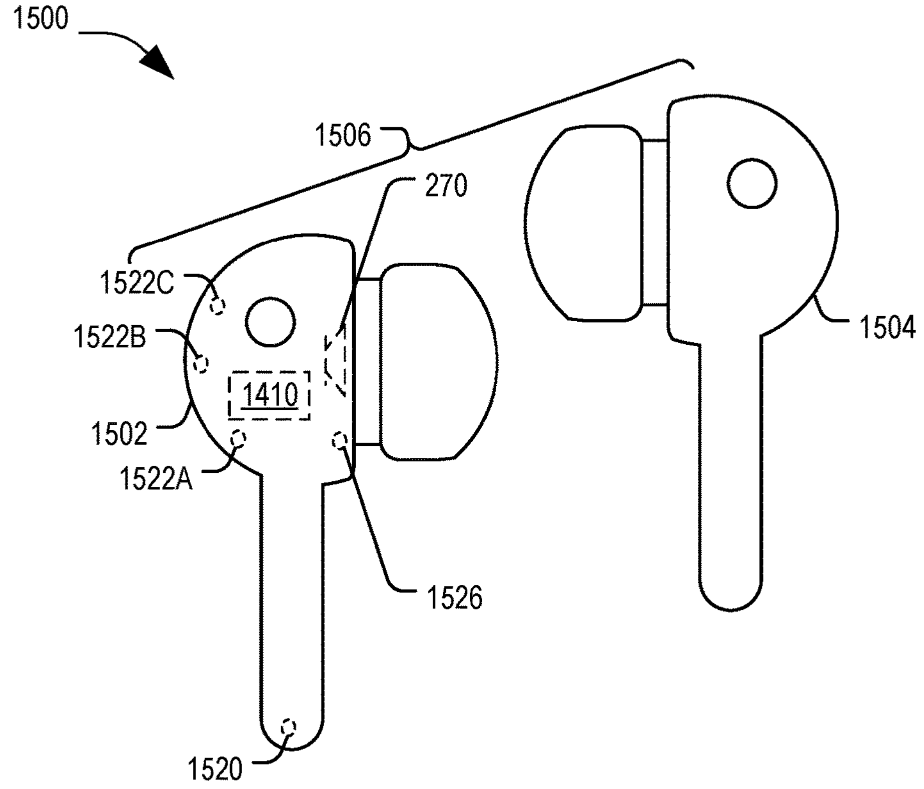
FIG. 15 is a diagram of earbuds operable to generate artificial reverberation in spatial audio, in accordance with some examples of the present disclosure.
Figure 16:
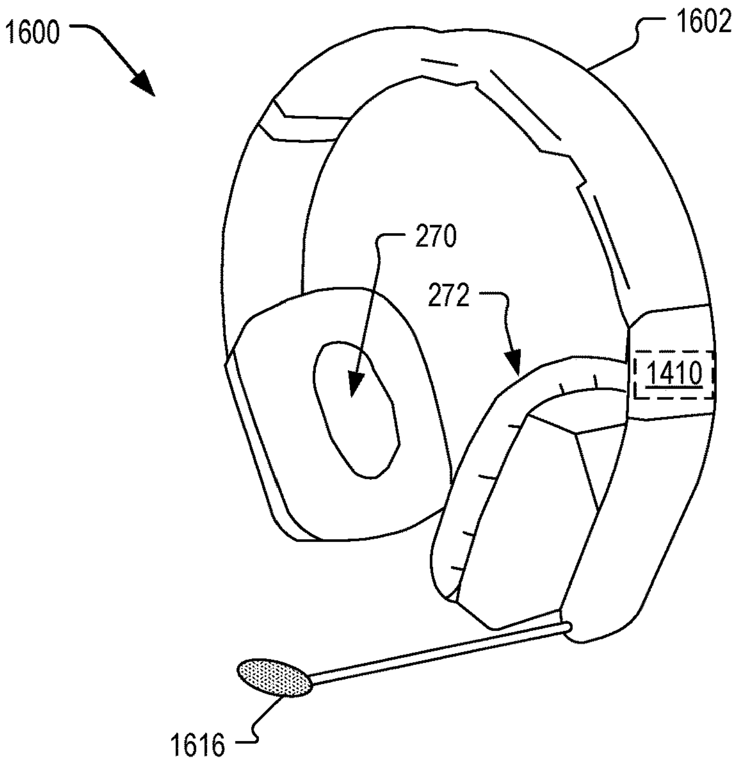
FIG. 16 is a diagram of a headset operable to generate artificial reverberation in spatial audio, in accordance with some examples of the present disclosure.
Figure 17:
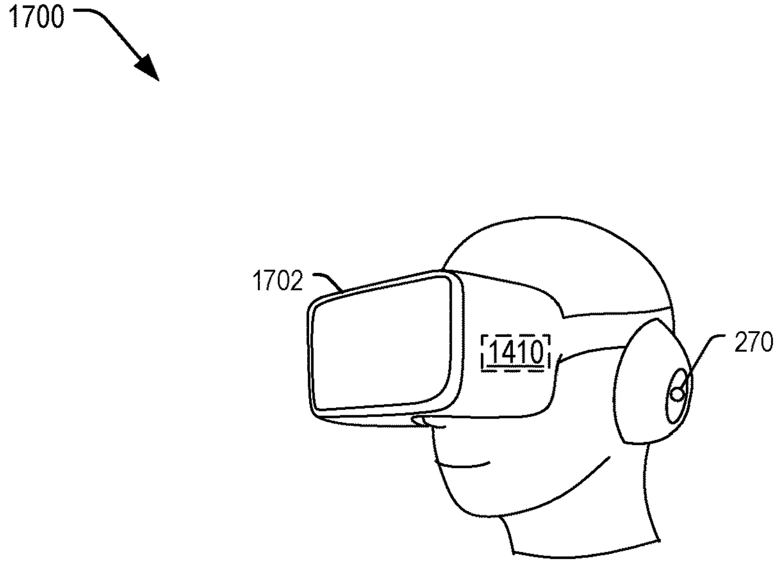
FIG. 17 is a diagram of a headset, such as a virtual reality, mixed reality, or augmented reality headset, operable to generate artificial reverberation in spatial audio, in accordance with some examples of the present disclosure.
Figure 18:
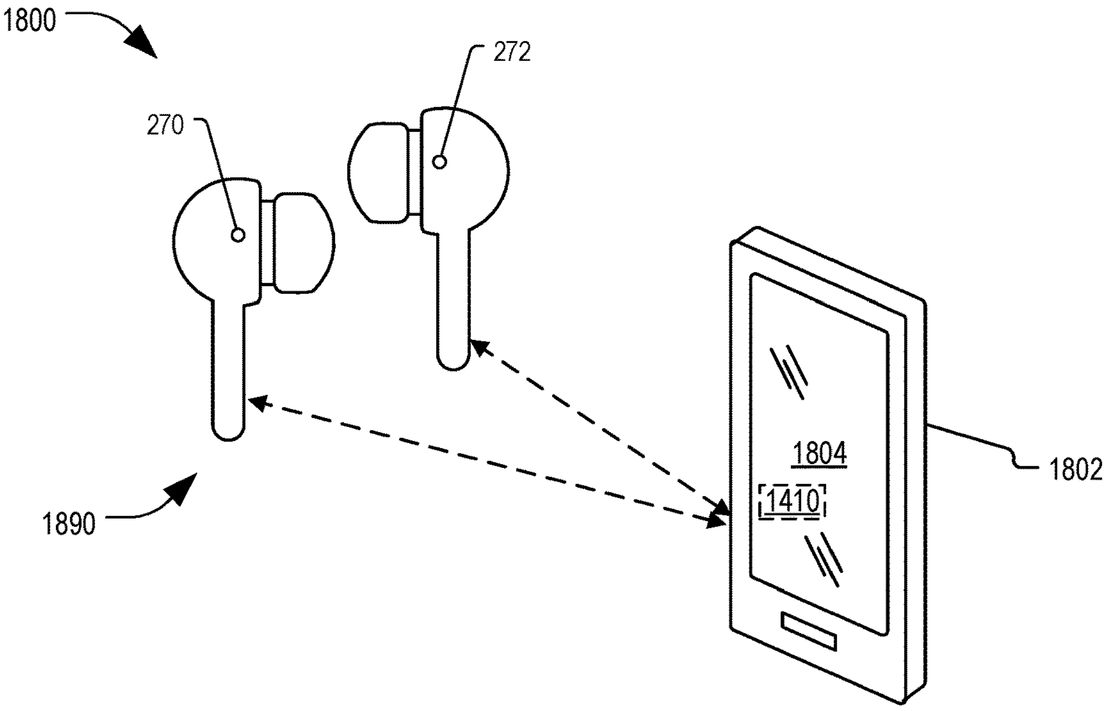
FIG. 18 is a diagram of a system including a mobile device operable to generate artificial reverberation in spatial audio, in accordance with some examples of the present disclosure.
Figure 19:
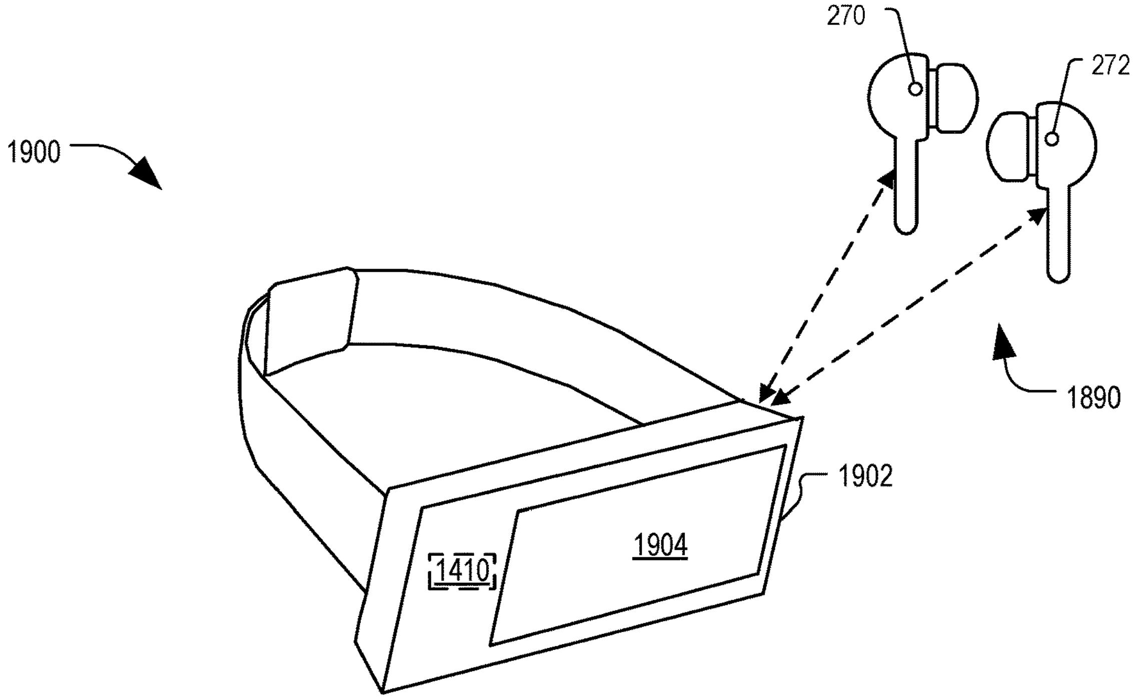
FIG. 19 is a diagram of a system including a wearable electronic device operable to generate artificial reverberation in spatial audio, in accordance with some examples of the present disclosure.
Figure 20:
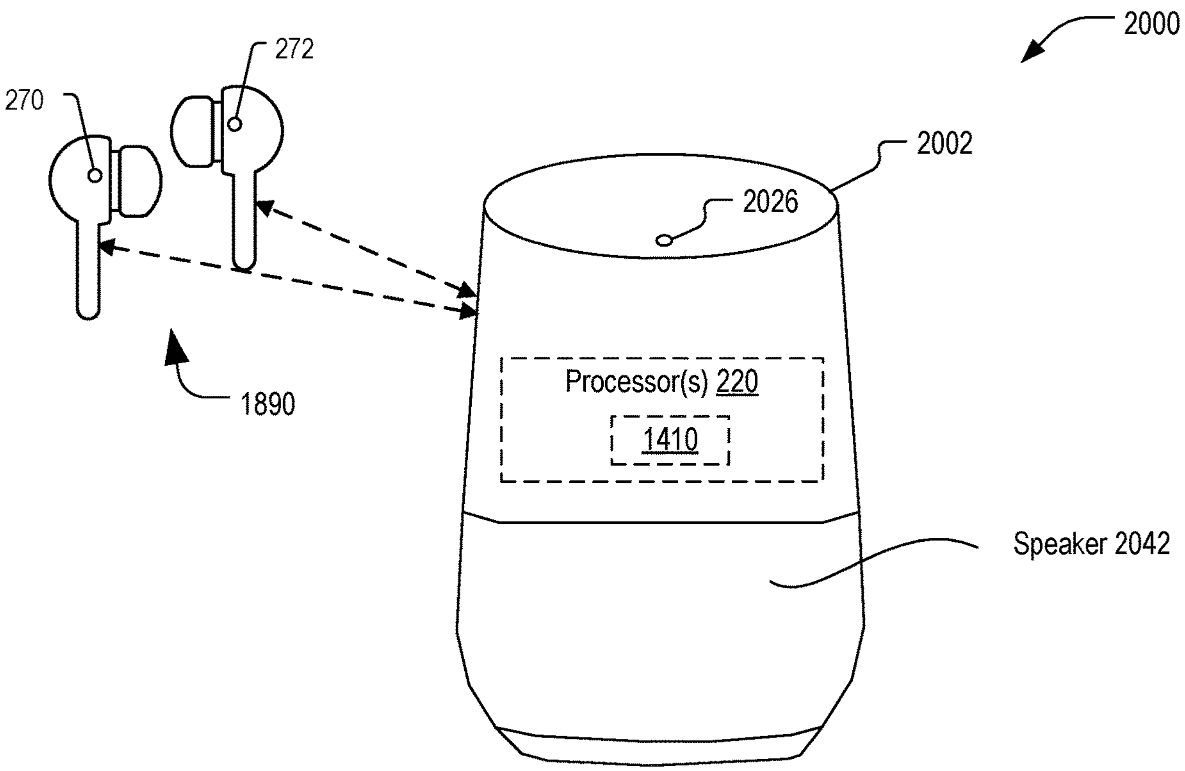
FIG. 20 is a diagram of a voice-controlled speaker system operable to generate artificial reverberation in spatial audio, in accordance with some examples of the present disclosure.
Figure 21:
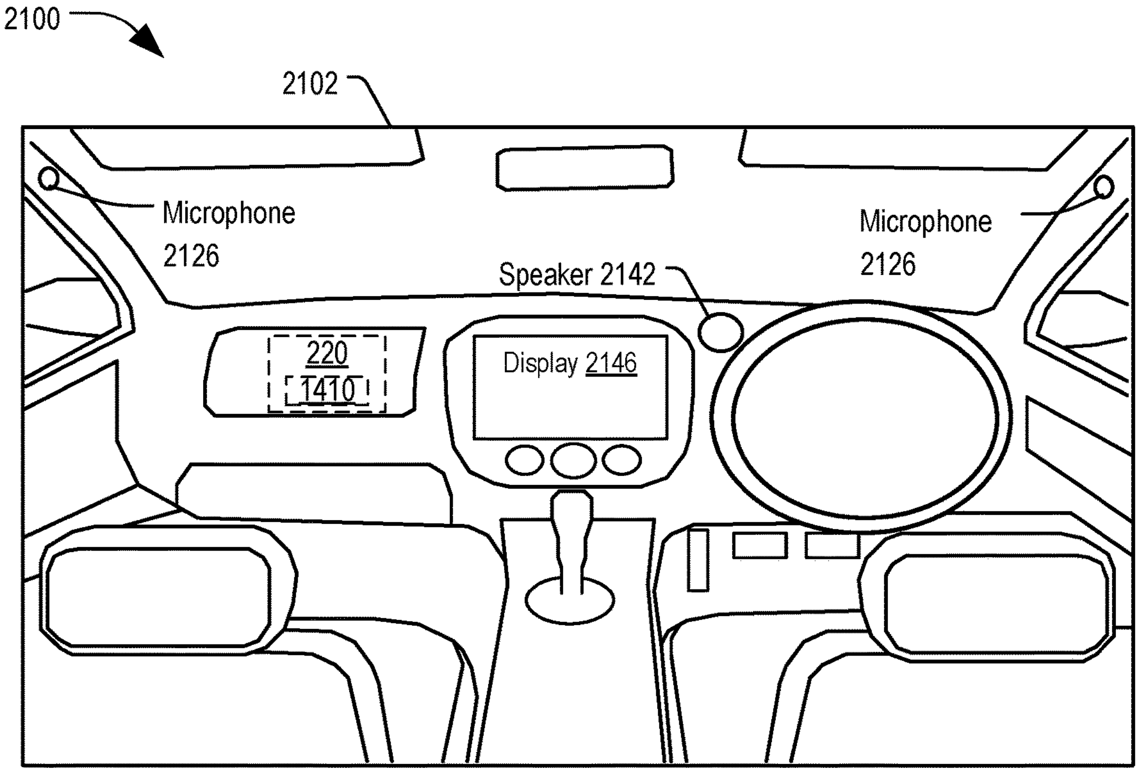
FIG. 21 is a diagram of an example of a vehicle operable to generate artificial reverberation in spatial audio, in accordance with some examples of the present disclosure.

Although in some examples the device 202 is described as a headphone device for purpose of explanation, in other implementations the device 202 is implemented as another type of device. For example, in some implementations, the device 202 (e.g., the one or more processors 220) is integrated in a headset device, such as depicted in FIGS. 15-17, and the second sound field 238, the early reflection signals 235, or both, are based on movement of the headset device. In an illustrative example, the headset device corresponds to at least one of a virtual reality headset, a mixed reality headset, or an augmented reality headset, such as described further with reference to FIG. 17. In some implementations, the device 202 is integrated in at least one of a mobile phone or a tablet computer device, as depicted in FIG. 18, a wearable electronic device, as depicted in FIG. 19, or a camera device. In some implementations, the device 202 is integrated in a wireless speaker and voice activated device, such as depicted in FIG. 20. In some implementations, the device 202 is integrated in a vehicle, as depicted in FIG. 21.

Although in various examples described for the system 200, and also for systems depicted in the following figures, correspond to implementations in which the output signal 262 is a binaural output signal, e.g., the renderer 242 generates a binaural rendering (e.g., the rendering 244), which in turn is used to generate a binaural output signal (e.g., the output signal 262), in other implementations the second data 240 is rendered to generate an output signal having a format other than binaural. As an illustrative, non-limiting example, in some implementations the renderer 242 may instead be a stereo renderer that generates the rendering 244 (e.g., a stereo rendering), which is used as, or used to generate, the output signal 262 (e.g., an output stereo signal) for playout at the loudspeakers 270, 272 (or for transmission to another device, as described below). In other implementations, the rendering of the second data 240 and the output signal provided by the one or more processors 220 may have one or more other formats and are not limited to binaural or stereo.

FIG. 3 illustrates an example of components 300 that can be included in the device 202 in an ambisonics-based implementation. The components 300 include an ambisonics generator 304, a combiner 308, the early reflections component 230, the late reverberation component 250, the renderer 242, the mixing stage 260, and a renderer 330.

In a particular implementation, the ambisonics generator 304 and the combiner 308 are included in the sound field representation generator 224 of FIG. 2. The ambisonics generator 304 is configured to process one or more object/channel streams 302 of the one or more audio sources 222, such as one or more audio streams having a channel-based audio format, one or more audio streams having an object-based audio format, or a combination thereof. The ambisonics generator 304 generates ambisonics data corresponding to the object/channel streams 302 and provides the ambisonics data to the combiner 308. The combiner 308 is configured to combine the output of the ambisonics generator 304 (if any) with an ambisonics stream 306 of the one or more audio sources 222 (if any) to generate the first data 228 as ambisonics data. In a particular aspect, the one or more object/channel streams 302, the ambisonics stream 306, or a combination thereof, correspond to the audio data 223 of FIG. 2.

The ambisonics renderer 352 corresponds to the sound field representation renderer 232 of FIG. 2 and is configured to process the first data 228 to generate the multi-channel audio data 233. The multi-channel audio data 233 is processed at the early reflection stage 234 to generate the early reflection signals 235 based on the reflection parameters 246.

The sound field representation generator 236 includes an ambisonics generator 358, a mixer 360, and a rotator 362. The ambisonics generator 358 is configured to process the early reflection signals 235 to generate an ambisonics representation of the sound field corresponding to the early reflection signals 235. The mixer 360 is configured to combine the output of the ambisonics generator 358 with the ambisonics stream 306, and the rotator 362 is configured to perform a rotation operation on the resulting ambisonics data to generate the second data 240. The renderer 242 processes the second data 240 to generate the rendering 244, as described above.

As illustrated, the one or more processors 220 are configured to obtain head-tracking data 314 that includes rotation data 316 corresponding to a rotation of a head-mounted playback device, and the second data 240 is generated further based on the rotation data 316. In general, the rotation data 316 can be used to perform rotation operations in various domains, such as an ambisonics domain (e.g., via an ambisonics rotation matrix) or in conjunction with a rendering operation (e.g., via a binaural renderer angle offset) as illustrative, non-limiting examples. Although FIG. 3 and subsequent figures depict rotations being performed in particular domains, it should be understood that, in other implementations. one or more such rotations may instead be performed in one or more other domains to achieve similar results.

In the particular implementation of FIG. 3, the rotator 362 is configured to perform the rotation operation in the ambisonics domain so that the second sound field 238 tracks the user's head, and the renderer 330 performs a matching rotation in conjunction with rendering the object/channel streams 302. In some implementations, the head-tracking data 314 further includes translation data 318 corresponding to a change of location of the head-mounted playback device, and the early reflection signals 235 are further based on the translation data 318, e.g., the translation data 318 can be used to determine one or more of the reflection parameters 246, as described further with reference to FIG. 7.

The combiner 308 also provides a copy of at least a portion of the first data 228 to an omni-directional audio extractor 380, and the omni-directional audio extractor 380 is configured to generate or extract the omni-directional component 251 of the first data 228. In a first example, the omni-directional audio extractor 380 is configured to output the ambisonics omni (W) channel as the omni-directional component 251 of the first data 228 to the late reverberation component 250. In a second example, the omni-directional audio extractor 380 is configured to generate the omni-directional component 251 by rendering the first data 228 to a mono stream. In a third example, the omni-directional audio extractor 380 is configured to generate the omni-directional component 251 by rendering the first data 228 to stereo and performing a stereo downmix to mono. The above examples are provided for purpose of illustration; in other implementations, the omni-directional audio extractor 380 may use one or more other techniques to generate the omni-directional component 251.

The late reflection stage 252 processes the omni-directional component 251 to generate the one or more late reverberation signals 254, such as a mono stream, a stereo stream, or a stream of late reverberation signals with any number of channels. In a particular implementation, the one or more late reverberation signals 254 have a stereo or mono format, which may facilitate mixing with rendered signals (e.g., the rendering 244). In another implementation, the one or more late reverberation signals 254 have a multi-channel or mono format, which may facilitate mixing with signals in an ambisonics domain, such as depicted in FIGS. 4D and 6B. The late reflection stage 252 processes the omni-directional component 251 based on a set of one or more late reverberation parameters 320. In a particular implementation, the set of late reverberation parameters 320 includes one or more of a reverberation tail duration parameter, a reverberation tail scale parameter, a reverberation tail density parameter, a gain parameter, or a frequency cutoff parameter, as described further with reference to FIG. 9.

The renderer 330 is configured to render and perform a rotation operation on the object/channel streams 302. For example, the renderer 330 performs an equivalent rotation as performed by the rotator 362, based on the rotation data 316, to track the user's head movement. In a particular implementation, the renderer 330 is configured to generate an output having a format matching the format of the rendering 244, such as a binaural renderer that generates a binaural rendering, a stereo renderer that generates a stereo rendering, etc.

The mixing stage 260 combines the one or more late reverberation signals 254, the rendering 244 (of the rotated early reflection signals 235 and the rotated ambisonics stream 306), and the rendering of the rotated object/channel streams 302 generated by the renderer 330 to produce the output signal 262.

According to an aspect, one or more mixing parameters 310 are used to control combining of various signals during processing. For example, the one or more mixing parameters 310 can include a set of gain ratios for use at the mixer 360, at the mixing stage 260, or both. In an illustrative example, the mixer 360 uses one or more of the mixing parameter(s) 310 to combine the output of the ambisonics generator 358 (e.g., a "wet" signal including the early reflections) with the ambisonics stream 306 (e.g., a "dry" signal without added reverberation). In another example, the mixing stage 260 is configured to generate the output signal 262 based on the one or more late reverberation signals 254, one or more of the mixing parameter(s) 310, and the rendering 244. In some implementations in which the one or more processors 220 obtain object-based audio data and/or channel-based audio data (e.g., in the object/channel streams 302) corresponding to at least one of the one or more audio sources 222, the output signal 262 is generated at the mixing stage 260 further based on the rendering of the object-based audio data and/or the channel-based audio data output by the renderer 330, which may be combined with the rendering 244 and the late reverberation signals 254 based on one or more of the mixing parameter(s) 310.

Using the renderer 330 to render the object/channel streams 302 enables improved spatial quality by mixing the object/channel streams 302, which were not originally ambisonics, in binaural directly rather than via ambisonic rendering performed at the renderer 242.

Figure 4A:
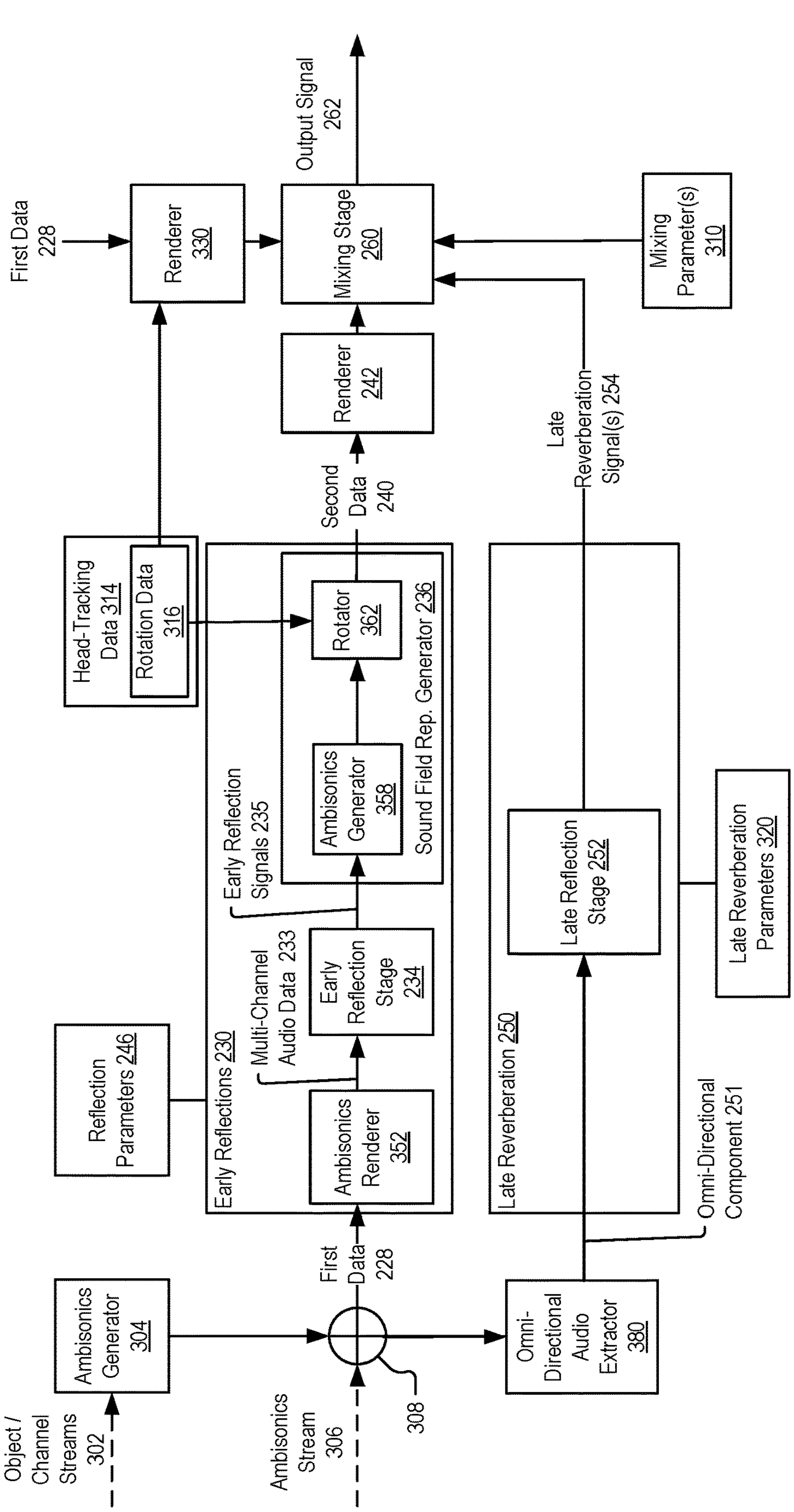
FIG. 4A is a block diagram of an illustrative aspect of components of the device of FIG. 2, in accordance with some examples of the present disclosure.

FIG. 4A illustrates another example of components 400 that can be included in the device 202 in an ambisonics-based implementation. The components 400 include the ambisonics generator 304, the combiner 308, the omni-directional audio extractor 380, the early reflections component 230, the late reverberation component 250, the renderer 242, the mixing stage 260, and the renderer 330.

The early reflections component 230 includes the ambisonics renderer 352, the early reflection stage 234, and the sound field representation generator 236. The sound field representation generator 236 includes the ambisonics generator 358 and the rotator 362, but omits the mixer 360 of FIG. 3. In particular, rather than separately adding the ambisonics stream 306 in the early reflections component 230 and the object/channel streams 302 at the renderer 330 (as shown in FIG. 3), the first data 228 is added at the renderer 330.

Rendering the first data 228 at the renderer 330 constrains the amount of processing that may be performed, reducing complexity and processing resources required, as compared to separately binauralizing the object/channel streams 302, which in some implementations may represent hundreds of individual audio sources.

Figure 4B:
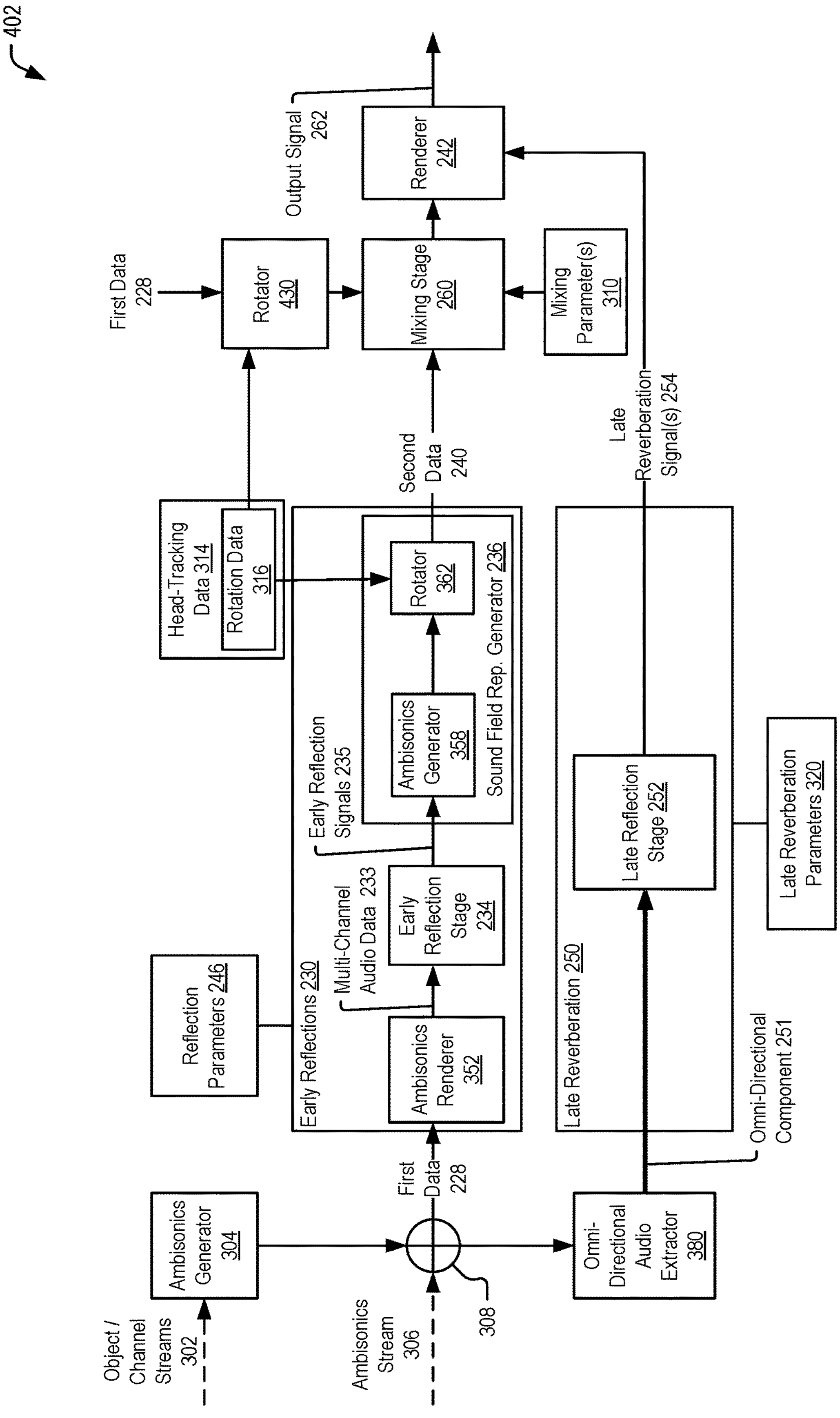
FIG. 4B is a block diagram of an illustrative aspect of components of the device of FIG. 2, in accordance with some examples of the present disclosure.

FIG. 4B illustrates another example of components 402 that can be included in the device 202 in an ambisonics-based implementation. The components 402 include the ambisonics generator 304, the combiner 308, the omni-directional audio extractor 380, the early reflections component 230, and the late reverberation component 250 arranged as in FIG. 4A.

The early reflections component 230 includes the ambisonics renderer 352, the early reflection stage 234, and the sound field representation generator 236. The sound field representation generator 236 includes the ambisonics generator 358 and the rotator 362, but omits the mixer 360 of FIG. 3.

In FIG. 4B, the first data 228 and the second data 240 are mixed in the ambisonics domain. To illustrate, the first data 228 is rotated by a rotator 430 based on the rotation data 316, and the mixing stage 260 mixes the output of the rotator 430 and the second data 240. The output of the mixing stage 260 and the one or more late reverberation signals 254 are provided to the renderer 242 to generate the output signal 262. The one or more late reverberation signals 254 may have a stereo or mono format, as illustrative, non-limiting examples.

Figure 4C:
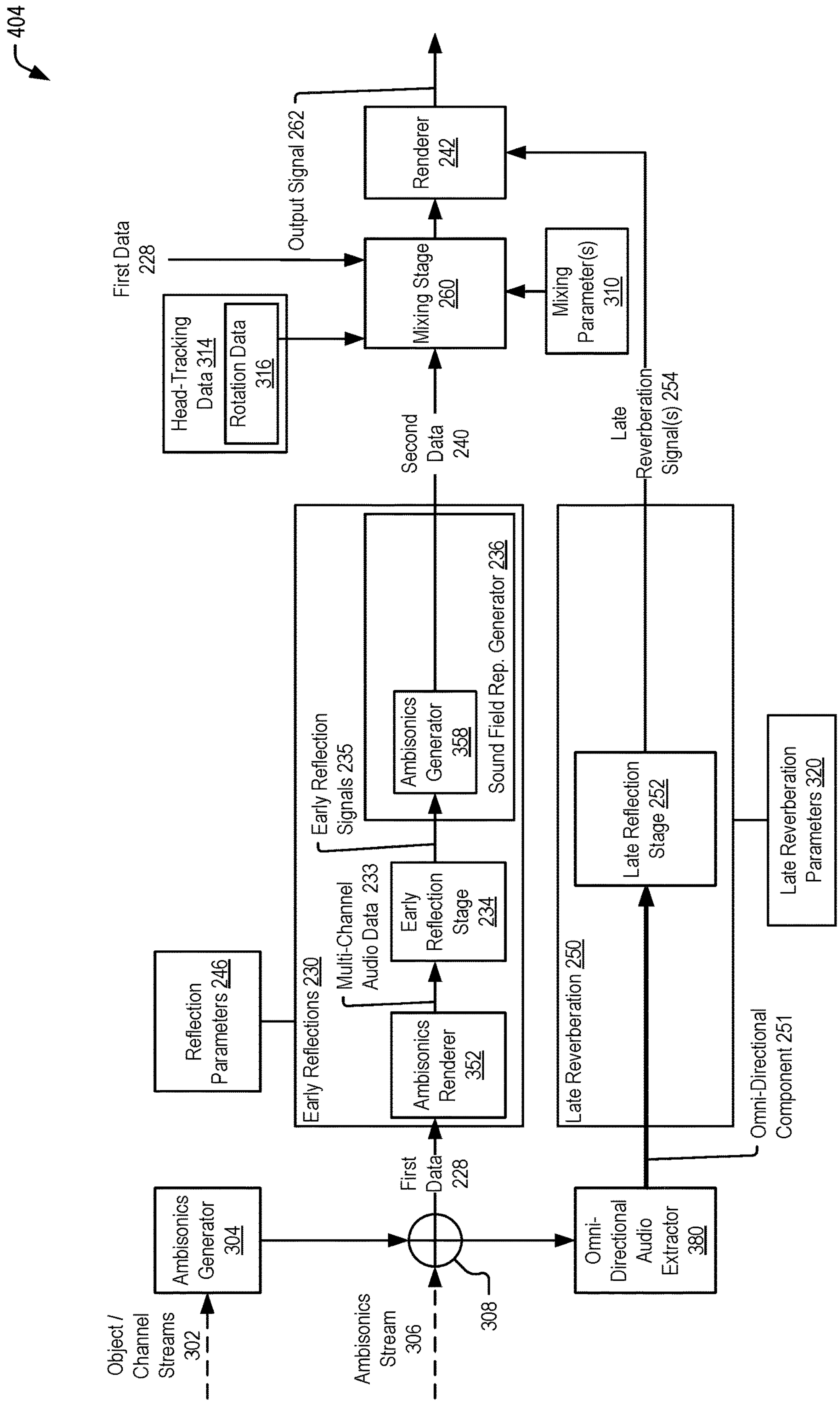
FIG. 4C is a block diagram of an illustrative aspect of components of the device of FIG. 2, in accordance with some examples of the present disclosure.
Figure 4D:
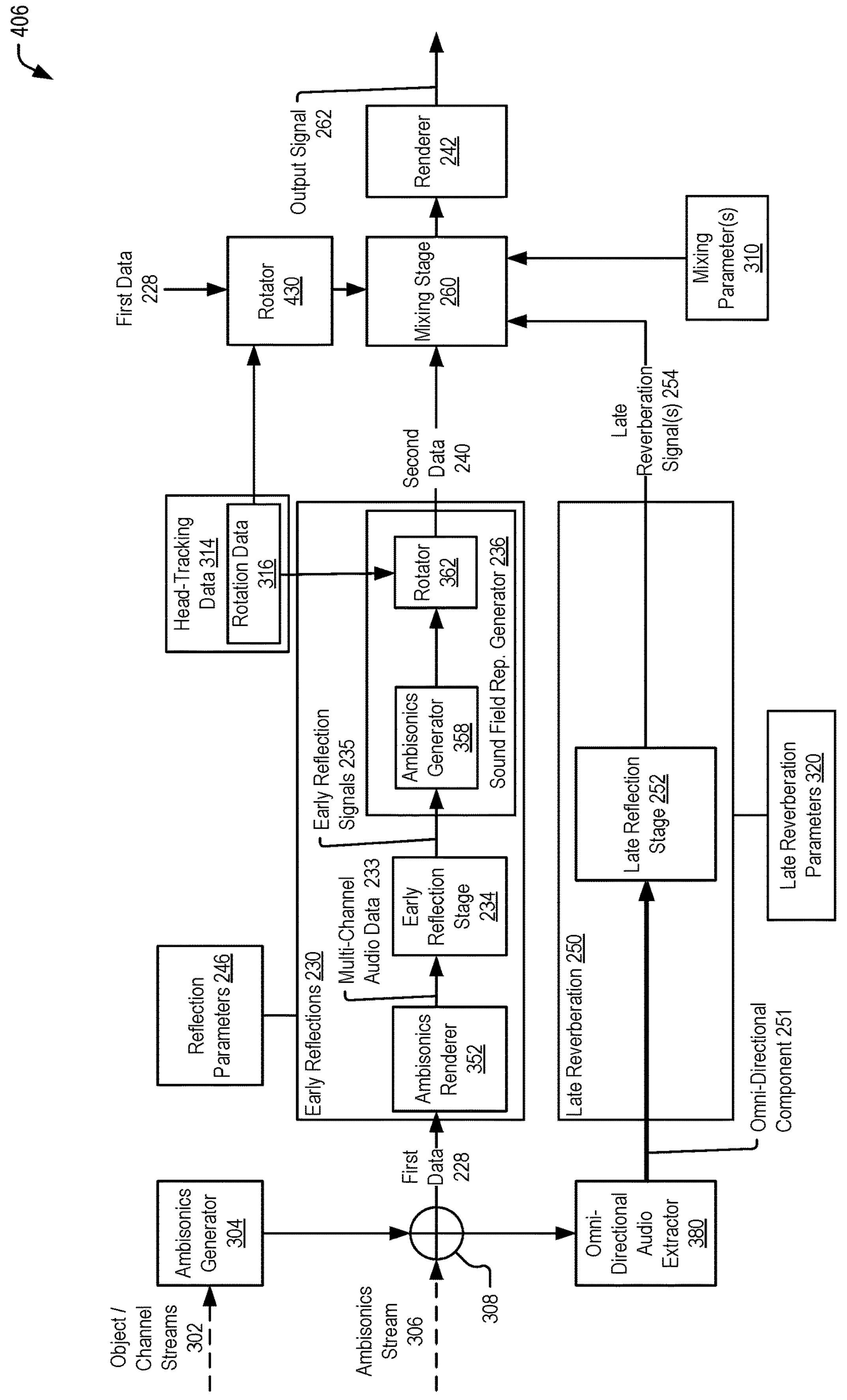
FIG. 4D is a block diagram of an illustrative aspect of components of the device of FIG. 2, in accordance with some examples of the present disclosure.

FIG. 4C illustrates another example of components 404 that can be included in the device 202 in an ambisonics-based implementation. The components 404 include the ambisonics generator 304, the combiner 308, the omni-directional audio extractor 380, the early reflections component 230, the late reverberation component 250, the renderer 242, and the mixing stage 260.

The early reflections component 230 includes the ambisonics renderer 352, the early reflection stage 234, and the sound field representation generator 236. The sound field representation generator 236 includes the ambisonics generator 358, but omits the mixer 360 and the rotator 362 of FIG. 3.

In FIG. 4C, the first data 228 and the second data 240 are mixed and rotated in the ambisonics domain. To illustrate, the first data 228 and the second data 240 are mixed and also rotated based on the rotation data 316 at the mixing stage 260. The output of the mixing stage 260 and the one or more late reverberation signals 254 are provided to the renderer 242 to generate the output signal 262. The one or more late reverberation signals 254 may have a stereo or mono format, as illustrative, non-limiting examples.

FIG. 4D illustrates another example of components 406 that can be included in the device 202 in an ambisonics-based implementation. The components 406 include the ambisonics generator 304, the combiner 308, the omni-directional audio extractor 380, the early reflections component 230, the late reverberation component 250, the renderer 242, the mixing stage 260, and the rotator 430 arranged as in FIG. 4B.

In FIG. 4D, the one or more late reverberation signals are combined with the first data 228 and the second data 240 in the ambisonics domain at the mixing stage 260 prior to rendering at the renderer 242. The one or more late reverberation signals 254 may correspond to a decorrelated stream having a multi-channel or mono format to facilitate mixing in the ambisonics domain, as illustrative, non-limiting examples.

Figure 5:
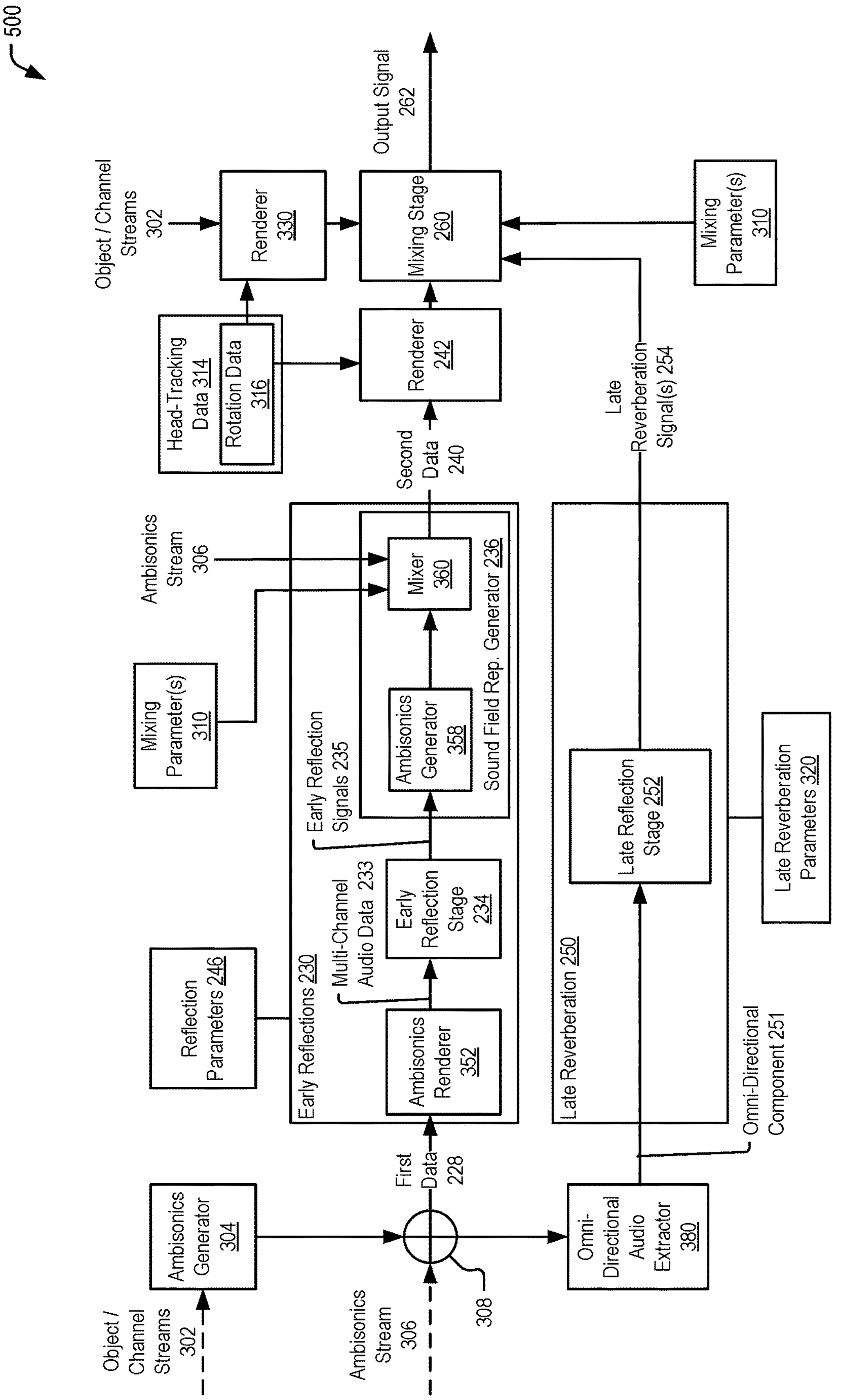
FIG. 5 is a block diagram of an illustrative aspect of components of the device of FIG. 2, in accordance with some examples of the present disclosure.

FIG. 5 illustrates another example of components 500 that can be included in the device 202 in an ambisonics-based implementation. The components 500 include the ambisonics generator 304, the combiner 308, the omni-directional audio extractor 380, the early reflections component 230, the late reverberation component 250, the renderer 242, the mixing stage 260, and the renderer 330 that processes the object/channel streams 302.

The early reflections component 230 includes the ambisonics renderer 352, the early reflection stage 234, and the sound field representation generator 236. The sound field representation generator 236 includes the ambisonics generator 358 and the mixer 360, but omits the rotator 362 of FIG. 3. Instead, rather than rotating the second sound field 238 at the second sound field representation generator 236, the renderer 242 performs the rotation operation based on the rotation data 316.

Figure 6A:
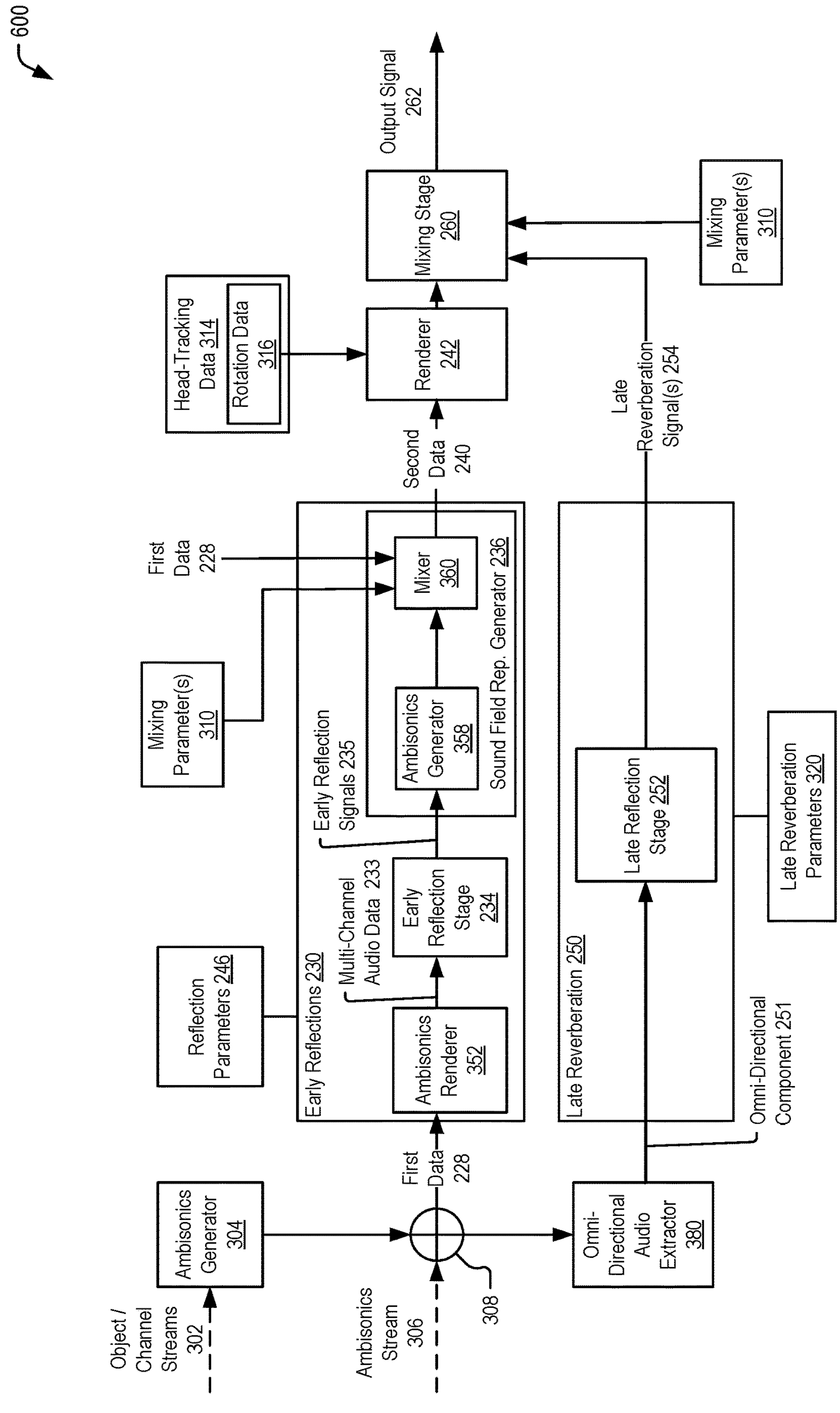
FIG. 6A is a block diagram of an illustrative aspect of components of the device of FIG. 2, in accordance with some examples of the present disclosure.
Figure 6B:
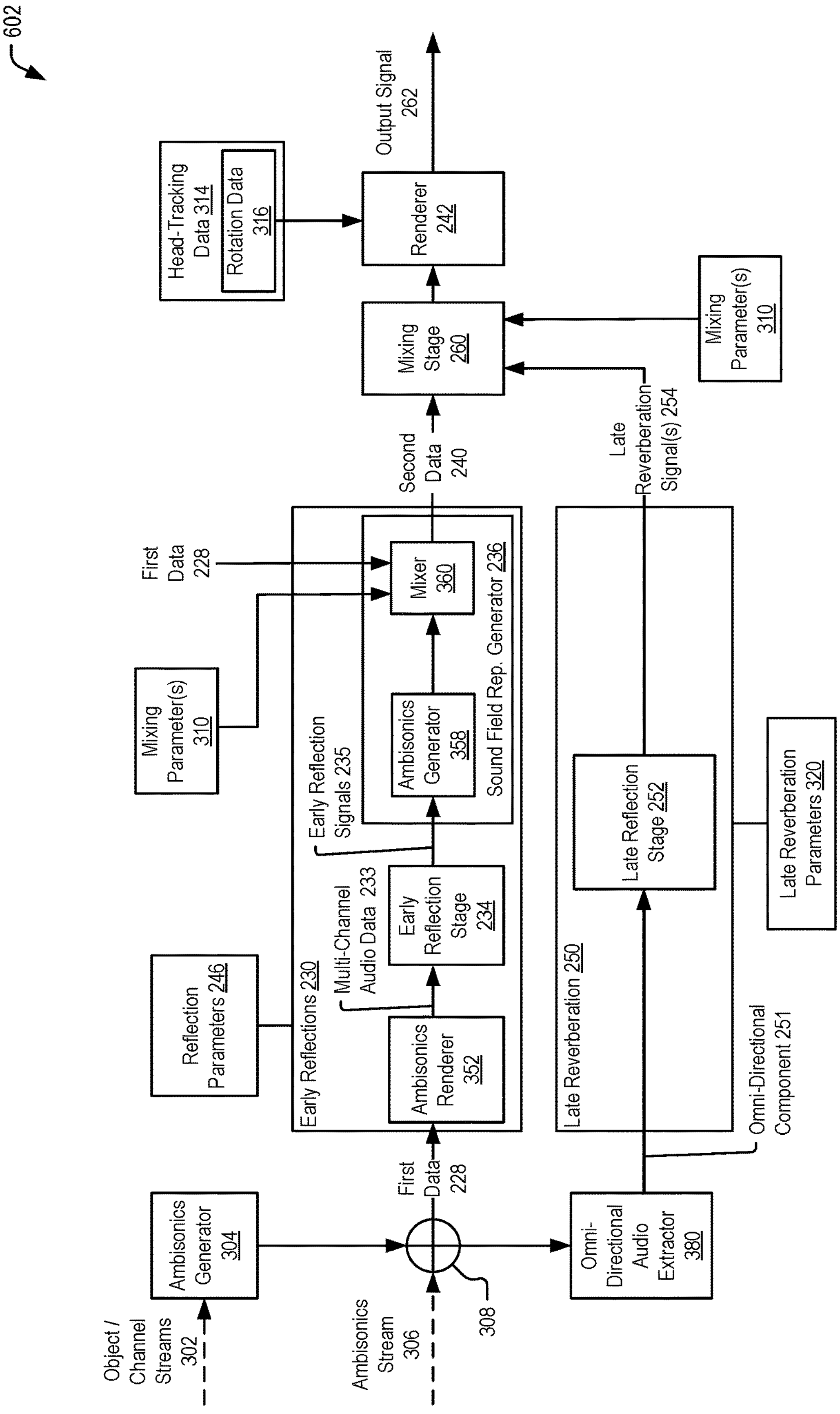
FIG. 6B is a block diagram of an illustrative aspect of components of the device of FIG. 2, in accordance with some examples of the present disclosure.

FIG. 6A illustrates another example of components 600 that can be included in the device 202 in an ambisonics-based implementation. The components 600 include the ambisonics generator 304, the combiner 308, the omni-directional audio extractor 380, the early reflections component 230, the late reverberation component 250, the renderer 242, and the mixing stage 260. In FIG. 6A, the first data 228 is mixed in the sound field representation generator 236, and rotation is performed at the renderer 242 based on the rotation data 316, resulting in fewer components and complexity as compared to several of the examples of FIG. 3-5. The one or more late reverberation signals 254 are added post-rendering at the mixing stage 260 and may have a stereo or mono format, as illustrative, non-limiting examples.

FIG. 6B illustrates another example of components 602 that can be included in the device 202 in an ambisonics-based implementation. The components 602 include the ambisonics generator 304, the combiner 308, the omni-directional audio extractor 380, the early reflections component 230, the late reverberation component 250, the renderer 242, and the mixing stage 260. As compared to FIG. 6A, the mixing of the second data 240 and the one or more late reverberation signals 254 is performed in the ambisonics domain prior to rotation and rendering at the renderer 242. The one or more late reverberation signals 254 may correspond to a decorrelated stream having a multi-channel or mono format to facilitate mixing in the ambisonics domain, as illustrative, non-limiting examples.

Figure 6C:
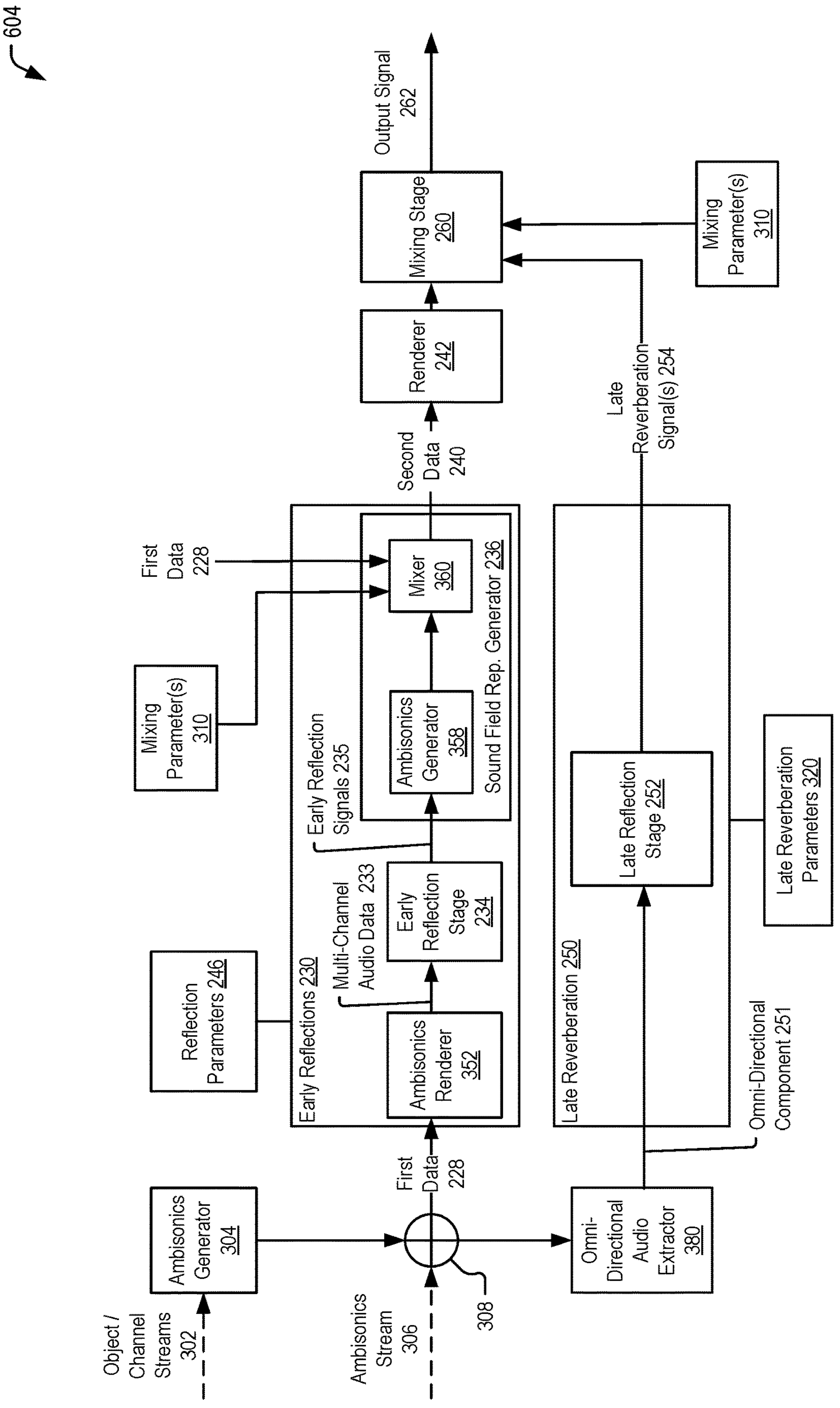
FIG. 6C is a block diagram of an illustrative aspect of components of the device of FIG. 2, in accordance with some examples of the present disclosure.

FIG. 6C illustrates another example of components 604 that can be included in the device 202 in an ambisonics-based implementation. The components 604 include the ambisonics generator 304, the combiner 308, the omni-directional audio extractor 380, the early reflections component 230, the late reverberation component 250, the renderer 242, and the mixing stage 260 arranged as in FIG. 6A. As compared to FIG. 6A, no rotation is performed based on head movement. In a particular implementation, the system of FIG. 6C operates as a head-locked version of the system depicted in FIG. 6A.

Figure 7:
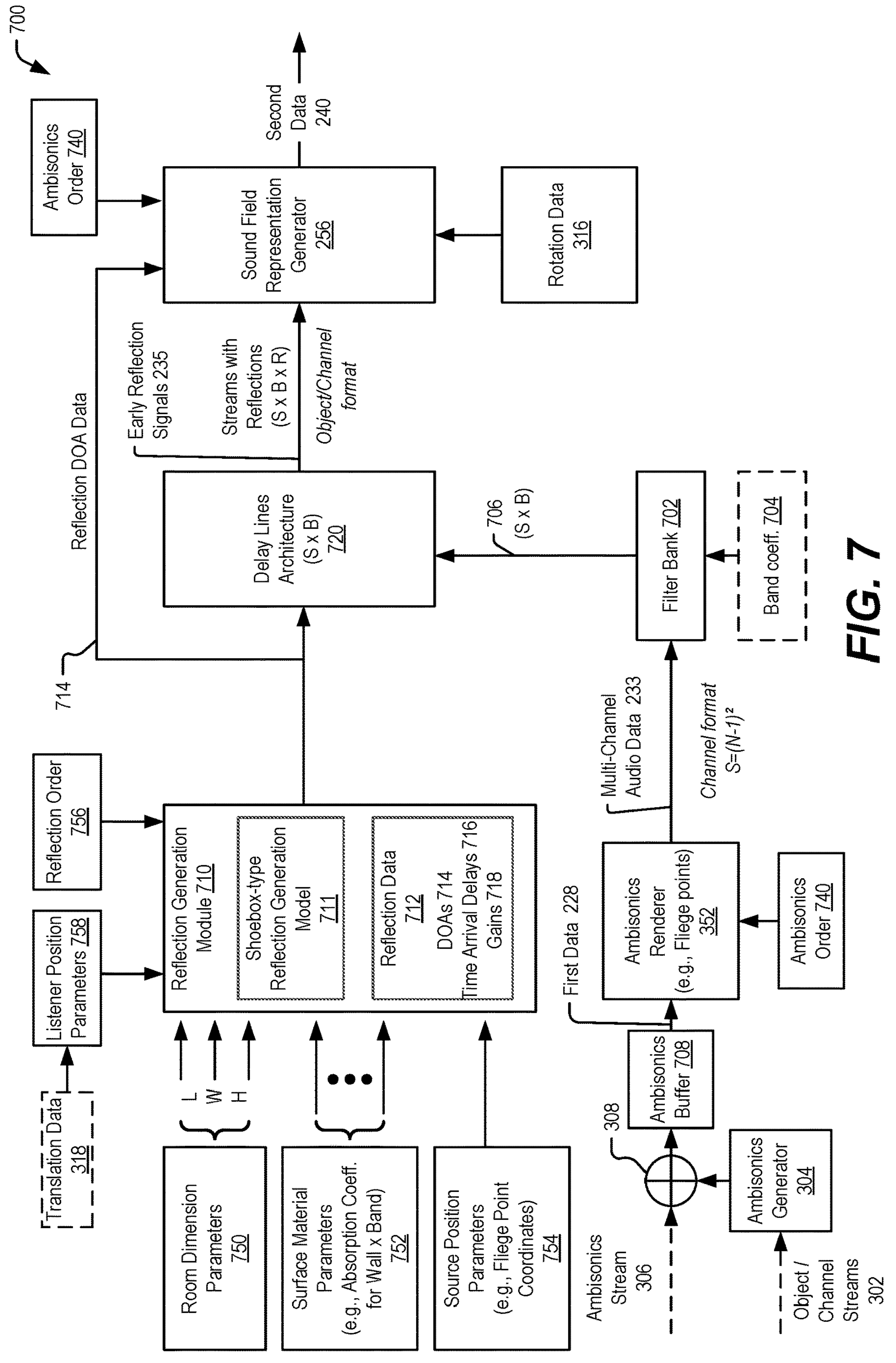
FIG. 7 is a block diagram of an illustrative aspect including components of the device of FIG. 2 associated with generating early reflections, in accordance with some examples of the present disclosure.

FIG. 7 illustrates an example of components 700 associated with generating early reflections that can be included in the device 202 in an ambisonics-based implementation. The components 700 include a reflection generation module 710, a delay lines architecture 720, and the sound field representation generator 236.

The components 700 include the ambisonics generator 304 and the combiner 308. The first data 228 generated by the combiner 308 is buffered in an ambisonics buffer 708 prior to being provided to the ambisonics renderer 352. The ambisonics renderer 352 is responsive to an ambisonics order 740 parameter that indicates order of ambisonics used for generation of the multi-channel audio data 233. In a particular example, for an ambisonics order of N, the ambisonics renderer 352 selects a set of decoding points for generation of S channels of audio data, where $S=(N-1)^2$. In some implementations, the decoding points correspond to a set of S Fliege points, or Fliege-Maier nodes corresponding to a nearly uniform arrangement of sampling points that enable efficient operations such as integration on a spherical surface. Such Fliege points can include decoding coordinates representing optimal layouts depending on the ambisonics order, and the rendering performed by the ambisonics renderer 352 can involve use of a precomputed decoding matrix for each ambisonics order that may be used.

The S channels of the multi-channel audio data 233 output by the ambisonics renderer 352 are input to a filter bank 702. The filter bank 702 is configured to filter each channel of the multi-channel audio data 233 into one or more frequency bands, responsive to one or more band coefficients 704, to generate a multi-channel input 706, having dimension (S×B), where B indicates the number of frequency bands. In a particular implementation, the one or more band coefficients 704 correspond to adjustable parameters. For example, the one or more band coefficients 704 can be determined based on surface material parameters 752. To illustrate, as described below, the surface material parameters 752 may include multiple absorption coefficients corresponding to different absorption characteristics of a material (e.g., a floor material) for a first number of frequency bands, and the one or more band coefficients 704 may be set so that the multi-channel input 706 includes the first number of matching frequency bands to align the sub-bands of the multi-channel input 706 with the frequency bands specified in the surface material parameters 752. In some implementations, the one or more band coefficients 704 may be omitted or may be set to a default value that causes the filter bank 702 to not perform filtering. In some implementations, the filter bank 702 is omitted and the multi-channel input 706 matches the multi-channel audio data 233.

A delay lines architecture 720 applies reflection parameters, including time of arrival delay data 716 and gain data 718, to the multi-channel input 706 to generate the early reflection signals 235. To illustrate, according to an aspect, the delay lines architecture 720 is configured to generate the early reflection signals 235 via application of time of arrival delays and gains, such as the time of arrival delay data 716 and the gain data 718 of a set of reflection data 712, to respective channels of the multi-channel audio data 233. The early reflection signals 235 include R reflection signals for each of the multi-channel input 706, resulting in (S×B×R) streams with reflections, and have an object or channel format. An example of the delay lines architecture 720 is described in further detail with reference to FIG. 8.

In some implementations, the sound field representation generator 236 generates the second data 240 based on encoding the early reflection signals 235 in conjunction with reflection direction of arrival (DOA) data 714. According to an aspect, the second data 240 is generated further based on the rotation data 316 and the ambisonics order 740.

The reflection direction of arrival data 714, the time of arrival delay data 716, and the gain data 718 correspond to a set of reflection data 712 that is generated by a reflection generation module 710. In a particular implementation, the reflection generation module 710 and the delay lines architecture 720 are included in the early reflection stage 234.

The reflection generation module 710 is configured to generate the set of reflection data 712 including reflection direction of arrival (DOA) data 714, the time of arrival delay data 716, and the gain data 718 for multiple reflections. In an example, the reflection generation module 710 is configured to generate the set of reflection data 712 based on a shoebox-type reflection generation model 711. For example, the shoebox-type reflection generation model 711 can represent a rectangular room having four walls, a floor, and a ceiling at right angles to each other, enabling simplicity of design and efficiency of simulation. In some implementations, the reflection generation module 710 is configured to generate the reflection data 712 for rooms having other geometries.

The reflection generation module 710 generates the reflection data 712 based on various parameters including room dimension parameters 750, such as room size (e.g., length (L), width (W), and height (H), and surface material parameters 752, such as absorption coefficients for each wall (including ceiling and floor), optionally for multiple frequency bands for frequency-varying absorption properties. Other parameters that can be used to generate the reflection data 712 include source position parameters 754, such as coordinates of sources located at the Fliege points associated with the ambisonics order 740, reflection order 756, and listener position parameters 758. The reflection order 756 can indicate, for example, an upper limit on the number of reflections used to determine audio image sources for the shoebox-type reflection generation model 711. The listener position parameters 758 can indicate coordinates indicating a position of a listener in the room and can correspond to the position at which the reflections are calculated. In some implementations in which the head-tracking data 314 includes the translation data 318, the translation data 318 can be used to adjust the listener position parameters 758 according to the tracked movement of the user's head to another position in the room.

In a particular implementation, the reflection direction of arrival data 714 indicates the DOA of each of the early reflection signals 235, the time of arrival delay data 716 indicates a propagation time for each of the early reflection signals 235 from its virtual source to the listener's position, and the gain data 718 indicates a gain (e.g., attenuation) of each of the early reflection signals 235 when it reaches the listener's position. According to an aspect, the set of reflection data 712 is based at least partially on the spatialized reflection parameters 246, and the early reflection signals 235 are based on the set of reflection data 712.

Figure 8:
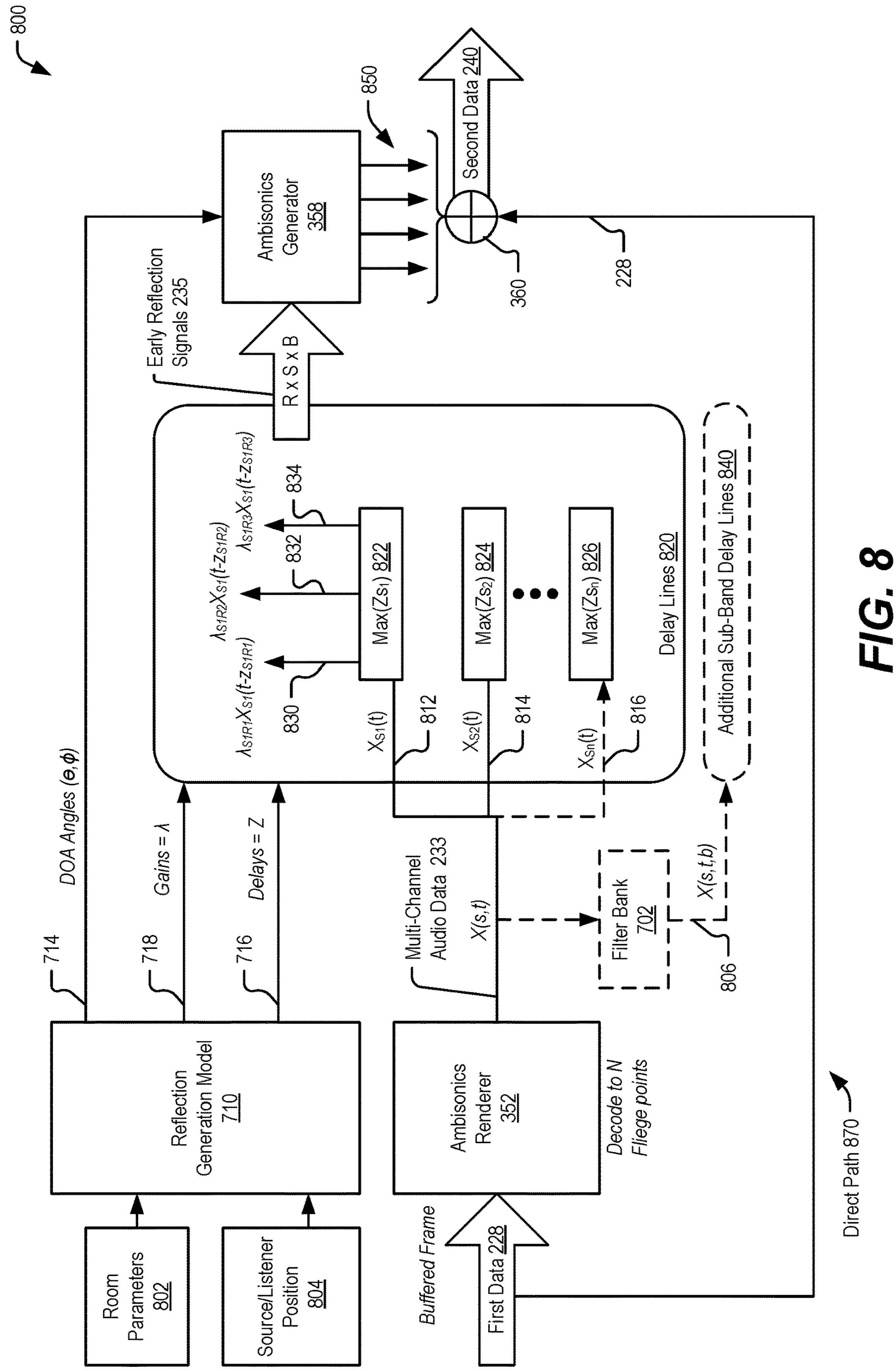
FIG. 8 is a block diagram of an illustrative aspect including components of the device of FIG. 2 associated with generating early reflections, in accordance with some examples of the present disclosure.

FIG. 8 depicts an example of components 800 associated with early reflections generated that can be included in the device 202 in an ambisonics-based implementation. The components 800 include the reflection generation module 710, the ambisonics renderer 352 and optionally the filter bank 702, a set of delay lines 820 and optionally additional sub-band delay lines 840, the ambisonics generator 358, and the mixer 360.

The reflection generation module 710 processes input parameters including room parameters 802 and source/listener position parameters 804. In an illustrative example, the room parameters 802 include or correspond to the room dimension parameters 750, the surface material parameters 752, and the source position parameters 754, and the source/listener position parameters 804 include or correspond to the source position parameters 754 and the listener position parameters 758. Based on at least the room parameters 802 and the source/listener position parameters 804, the reflection generation module 710 generates the reflection direction of arrival data 714, the time of arrival delay data 716, and the gain data 718. The reflection direction of arrival data 714 is illustrated as DOA angles (θ,ϕ) representing a polar angle θ and an azimuthal angle ϕ for each reflection. The time of arrival delay data 716 is represented as delay values Z for each reflection, and the gain data 718 is represented as gain values λ for each reflection.

The delay lines 820 include a first delay line 822, a second delay line 824, and a $n^{th}$ delay line 826. The first delay line 822 is configured to receive first channel data 812 of the multi-channel audio data 233 and to generate multiple early reflection signals based on the gains and the delays associated with the first channel data 812. As illustrated, the multi-channel audio data 233 is denoted as an array of signals X(s, t), where S indicates the signal index and t indicates time. The first channel data 812, denoted as $X_{S1}(t)$, is fed into the first delay line 822, second channel data 814, denoted as $X_{S2}(t)$, is fed into the second delay line 824, and $n^{th}$ channel data 816, denoted as $X_{Sn}(t)$, is fed into the $n^{th}$ delay line 826. The length of the first delay line 822 has an upper limit corresponding to an upper limit on the delays associated with the first channel data 812, denoted Max($Z_{S1}$). Similarly, the length of the second delay line 824 has an upper limit on the delays associated with the second channel data 814, denoted Max($Z_{S2}$), and the length of the $n^{th}$ delay line 826 has an upper limit on the delays associated with the $n^{th}$ channel data 816, denoted Max($Z_{Sn}$).

A first early reflection signal 830 is generated by applying a first delay $z_{S1R1}$ and a first gain $\lambda_{S1R1}$ to the first channel data 812, and the resulting first early reflection signal 830 is denoted as $\lambda_{S1R1}X_{S1}(t-z_{S1R1})$. Similarly, a second early reflection signal 832 $\lambda S_{1R2}X_{S1}(t-z_{S1R2})$ is generated by applying a second delay $z_{S1R2}$ and a second gain $\lambda_{S1R2}$ to the first channel data 812, and a third early reflection signal 834 $\lambda_{S1R3}X_{S1}(t-z_{S1R3})$ is generated by applying a third delay $z_{S1R3}$ and a third gain $\lambda_{S1R3}$ to the first channel data 812. In a similar manner, the second delay line 824 generates multiple early reflection signals based on applying gain and delay values to the second channel data 814 $X_{S2}(t)$ in a similar manner as described with reference to the first delay line 822, and the $n^{th}$ delay line 826 generates multiple early reflection signals based on applying gain and delay values to the $n^{th}$ channel data 816 $X_{Sn}(t)$. In a particular implementation, the early reflection signals 235 generated using the delay lines are individual audio signals which as a group exhibit a decay pattern as a function of the various gains and delays, although individually they do not decay.

In an implementation in which the filter bank 702 is included and configured to generate B frequency bands for each channel of the multi-channel audio data 233, the resulting frequency band components 806 output by the filter bank 702 are denoted X(s, t, b). In such implementations, the first channel data 812, the second channel data 814, and the $n^{th}$ channel data 816 can correspond to a first frequency band (e.g., b=1) of each of the channels. The additional sub-band delay lines 840 include a duplicate of the delay lines 820 for each additional frequency band generated by the filter bank 702 to generate early reflection signals for each frequency band of each channel of the multi-channel audio data 233. In a particular implementation, the delay lines 820 and the additional sub-band delay lines 840 are included in the delay lines architecture 720 of FIG. 7. The resulting set of early reflection signals 235 generated by the delay lines 820 and the additional sub-band delay lines 840 has dimension R×S×B, where R indicates the number of reflections per delay line, S indicates the number of channels of the multi-channel audio data 233, and B indicates the number of frequency bands per channel.

The early reflection signals 235 are processed by the ambisonics generator 358 in conjunction with the reflection direction of arrival data 714 for each of the early reflection signals 235 to generate ambisonics representations 850 of the early reflection signals 235. The ambisonics representations 850 are combined with the first data 228, provided to the mixer 360 via a direct path 870, to generate the second data 240.

Figure 9:
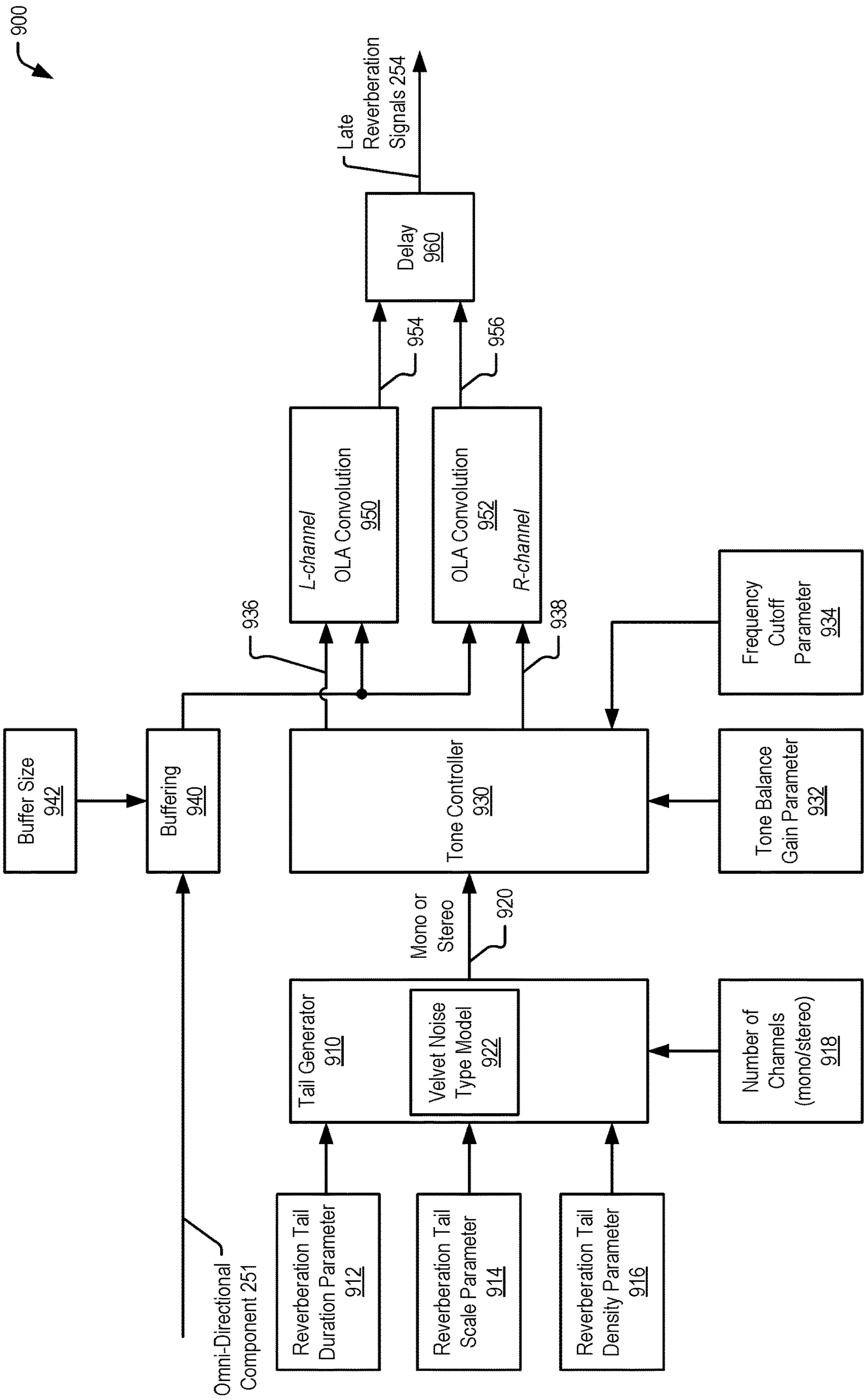
FIG. 9 is a block diagram of an illustrative aspect including components of the device of FIG. 2 associated with generating late reverberation, in accordance with some examples of the present disclosure.

FIG. 9 depicts an example of components 900 associated with late reverberation that can be included in the device 202 in an ambisonics-based implementation. The components 900 include a tail generator 910, a tone controller 930, a left channel convolver 950, a right channel convolver 952, and a delay component 960.

The tail generator 910 is configured to generate one or more noise signals 920, such as mono or stereo noise signals, corresponding to a reverberation tail. In a particular implementation, the tail generator 910 is a velvet noise-type generator that generates the one or more noise signals 920 using a velvet noise-type model 922. According to an aspect, one or more noise signals 920 are generated based on one or more of a reverberation tail duration parameter 912, a reverberation tail scale parameter 914, a reverberation tail density parameter 916, a number of channels 918 (e.g., indicating stereo or mono output), one or more of which may be included in the set of late reverberation parameters 320 of FIG. 3.

In an illustrative example, the velvet noise-type model 922 generates the noise signals 920 based on an exponential decay of a random signal, where each discrete sample of the random signal has a randomly (or pseudo-randomly) selected value of 1, 0, or −1. Each of the noise signals 920 can have a form $y(t)=x(t)*\exp(t/\tau)$, where x(t) is the random signal, exp( ) denotes an exponential function, and τ denotes a decay constant. Advantages of this type of velvet noise include fast generation, "smooth" ratings in listening tests, and the ability to be applied to a signal through a sparse convolution. In an illustrative example, the reverberation tail duration parameter 912 is used to adjust the decay constant t, the reverberation tail scale parameter 914 is used to adjust an amplitude of the tail, and the reverberation tail density parameter 916 is used to adjust how many samples are included in x(t) per unit time. In a particular implementation, one or more of the reverberation tail duration parameter 912, the reverberation tail scale parameter 914, the reverberation tail density parameter 916, or the number of channels 918 can be selected or derived from parameters associated with generating the early reflection signals 235.

In some implementations, the tone controller 930 is configured to generate one or more adjusted noise signals, such as a left channel noise signal 936 and a right channel noise signal 938, corresponding to the reverberation tail. In a particular implementation, the adjusted noise signals (the left channel noise signal 936 and the right channel noise signal 938) are generated based on the one or more noise signals 920, a tone balance gain parameter 932, and a frequency cutoff parameter 934. For example, the noise signals 920 can be adjusted to reduce a high-frequency component, such as via a low-pass filter or shelf filter. In a particular example, the tone balance gain parameter 932 controls a gain applied by the filter, and the frequency cutoff parameter 934 controls a cutoff frequency of the filter. In a particular aspect, the tone balance gain parameter 932 and the frequency cutoff parameter 934 may be included in the set of late reverberation parameters 320 of FIG. 3

The left channel convolver 950 and the right channel convolver 952 are configured to convolve the omni-directional component 251 with the one or more noise signals, such as the left channel noise signal 936 and the right channel noise signal 938, respectively, to generate one or more reverberation signals, illustrated as a left channel reverberation signal 954 and a right channel reverberation signal 956. In a particular implementation, a buffering module 940 controls buffering of the omni-directional component 251, based on a buffer size parameter 942, for the convolution processing, and the left channel convolver 950 and the right channel convolver 952 are configured to perform a sparse convolution operation based on a relatively low density of the noise signals 920. According to an aspect, the left channel convolver 950 and the right channel convolver 952 are configured to perform an overlap-add (OLA)-type convolution operation. As a result, a complexity and processing requirement of the left channel convolver 950 and the right channel convolver 952 can be reduced as compared to conventional noise generation techniques.

The delay component 960 is configured to apply a delay to the one or more reverberation signals (e.g., the left channel reverberation signal 954 and the right channel reverberation signal 956) to generate the one or more late reverberation signals 254. The length of the delay can be selected or determined based on parameters associated with generation of the early reflection signals 235, such as the reflection order 756 in an illustrative, non-limiting example.

Figure 10:
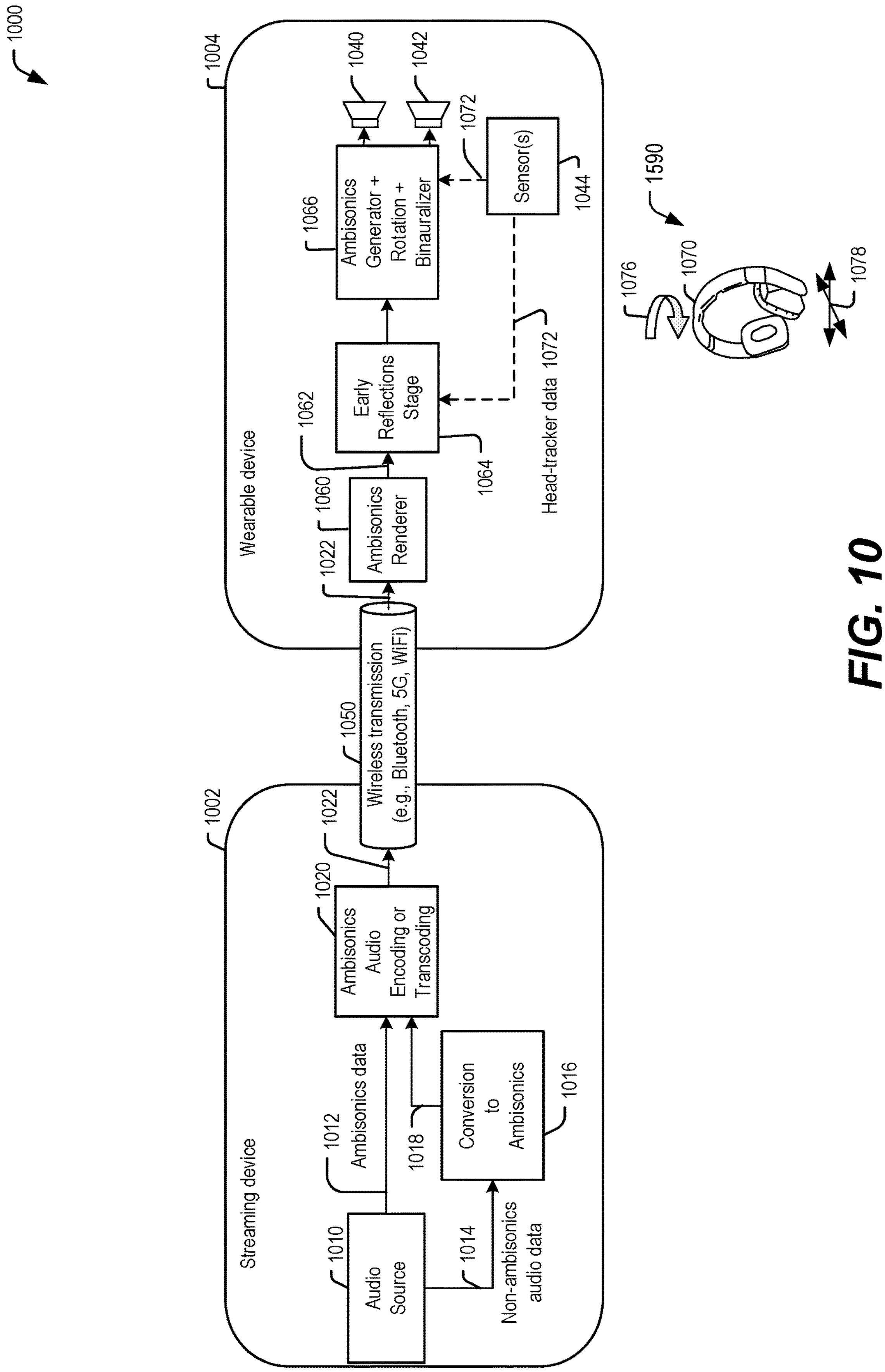
FIG. 10 is a block diagram illustrating a first implementation of components and operations of a system for generating artificial reverberation in spatial audio, in accordance with some examples of the present disclosure.

FIG. 10 is a block diagram illustrating a first implementation of components and operations of a system for generating artificial reverberation. A system 1000 includes a streaming device 1002 coupled to a wearable device 1004.

The streaming device 1002 includes an audio source 1010 that is configured to output ambisonics data 1012 that represents first audio content, non-ambisonics audio data 1014 that represents second audio content, or a combination thereof. The streaming device 1002 is configured to perform a rendering/conversion to ambisonics operation 1016 to convert the streamed non-ambisonics audio data 1014 to an ambisonics sound field (e.g., first order ambisonics (FOA), HOA, mixed-order ambisonics) to generate ambisonics data 1018. In a particular implementation, the audio source 1010 corresponds to the one or more audio sources 222, the rendering/conversion to ambisonics operation 1016 is performed by the sound field representation generator 224, and the ambisonics data 1012 and ambisonics data 1018 together correspond to the first data 228 of FIG. 2.

The streaming device 1002 is configured to perform an ambisonics audio encoding or transcoding operation 1020, such as by operating on the ambisonics data 1012, the ambisonics data 1018, or both, in the ambisonics buffer 708 of FIG. 7. In a particular implementation, the streaming device 1002 is configured to compress ambisonics coefficients of the ambisonics data 1012, the ambisonics data 1018, or a combination thereof, to generate compressed coefficients 1022 and to transmit the compressed coefficients 1022 wirelessly to the wearable device 1004 via a wireless transmission 1050 (e.g., via Bluetooth®, 5G, or WiFi, as illustrative, non-limiting examples). In an example, the ambisonics audio encoding or transcoding operation 1020 is performed using a low-delay codec, such as based on Audio Processing Technology-X (AptX), low-delay Advanced Audio Coding (AAC-LD), or Enhanced Voice Services (EVS), as illustrative, non-limiting examples.

The wearable device 1004 (e.g., a headphone device) is configured to receive the compressed coefficients 1022 and to process the compressed coefficients 1022 at an ambisonics renderer 1060 (or at a decoder prior to the ambisonics renderer 1060) to generate multi-channel audio data 1062. In a particular implementation, the ambisonics renderer 1060 corresponds to the sound field representation renderer 232 and the multi-channel audio data 1062 corresponds to the multi-channel audio data 233 of FIG. 2.

The wearable device 1004 is configured to process the multi-channel audio data 1062 at an early reflections stage 1064 to generate artificial spatial reflections, such as described for the early reflection stage 234.

The wearable device 1004 is also configured to generate head-tracker data 1072 based on detection by one or more sensors 1044 of a rotation 1076 and a translation 1078 of the wearable device 1004. A diagram 1090 illustrates an example representation of the wearable device 1004 implemented as a headphone device 1070 to demonstrate examples of the rotation 1076 and the translation 1078.

An ambisonics sound field generation, rotation, and binauralization operation 1066 at the wearable device 1004 processes the output of the early reflections stage 1064 to generate sound field data. In some implementations, the ambisonics sound field generation, rotation, and binauralization operation 1066 includes performing compensation for head-rotation via sound field rotation based on the head-tracker data 1072 measured at the wearable device 1004 (and optionally also processing a low-latency translation). The ambisonics sound field generation, rotation, and binauralization operation 1066 at the wearable device 1004 also performs binauralization of the compensated ambisonics sound field using HRTFs or BRIRs with or without headphone compensation filters associated with the wearable device 1004 to output pose-adjusted binaural audio with artificial reverberation via an output binaural signal to a first loudspeaker 1040 and a second loudspeaker 1042.

In some implementations, the ambisonics renderer 1060 corresponds to the sound field representation renderer 232, the early reflections stage 1064 corresponds to the early reflections component 230 or the early reflection stage 234, the ambisonics sound field generation, rotation, and binauralization operation 1066 is performed at the renderer 242, the renderer 330, the mixing stage 260, or a combination thereof, the one or more sensors 1044 correspond to the one or more sensors 280, and the head-tracker data 1072 corresponds to the sensor data 282 or the head-tracking data 314. Although described in the context of generation of binaural output, in other implementations the ambisonics sound field generation, rotation, and binauralization operation 1066 instead generates output having a different format, such as a stereo output, as an illustrative, non-limiting example.

The system 1000 therefore enables low rendering latency wireless immersive audio with artificial reverberations for spatial audio generation and rendering post transmission.

In other implementations, one or more operations described as being performed at the wearable device 1004 can instead be performed at the streaming device 1002 in a split rendering implementation. For example, in one implementation, the rendering performed by the ambisonics renderer 1060 can be moved to the streaming device 1002, so that the multi-channel audio data 1062 is generated at the streaming device 1002 and encoded for transmission to the wearable device 1004. In this implementation, processing resource usage and power consumption associated with the ambisonics renderer 1060 can be offloaded to the streaming device 1002, extending the battery life and improving the user experience associated with the wearable device 1004.

Figure 11:
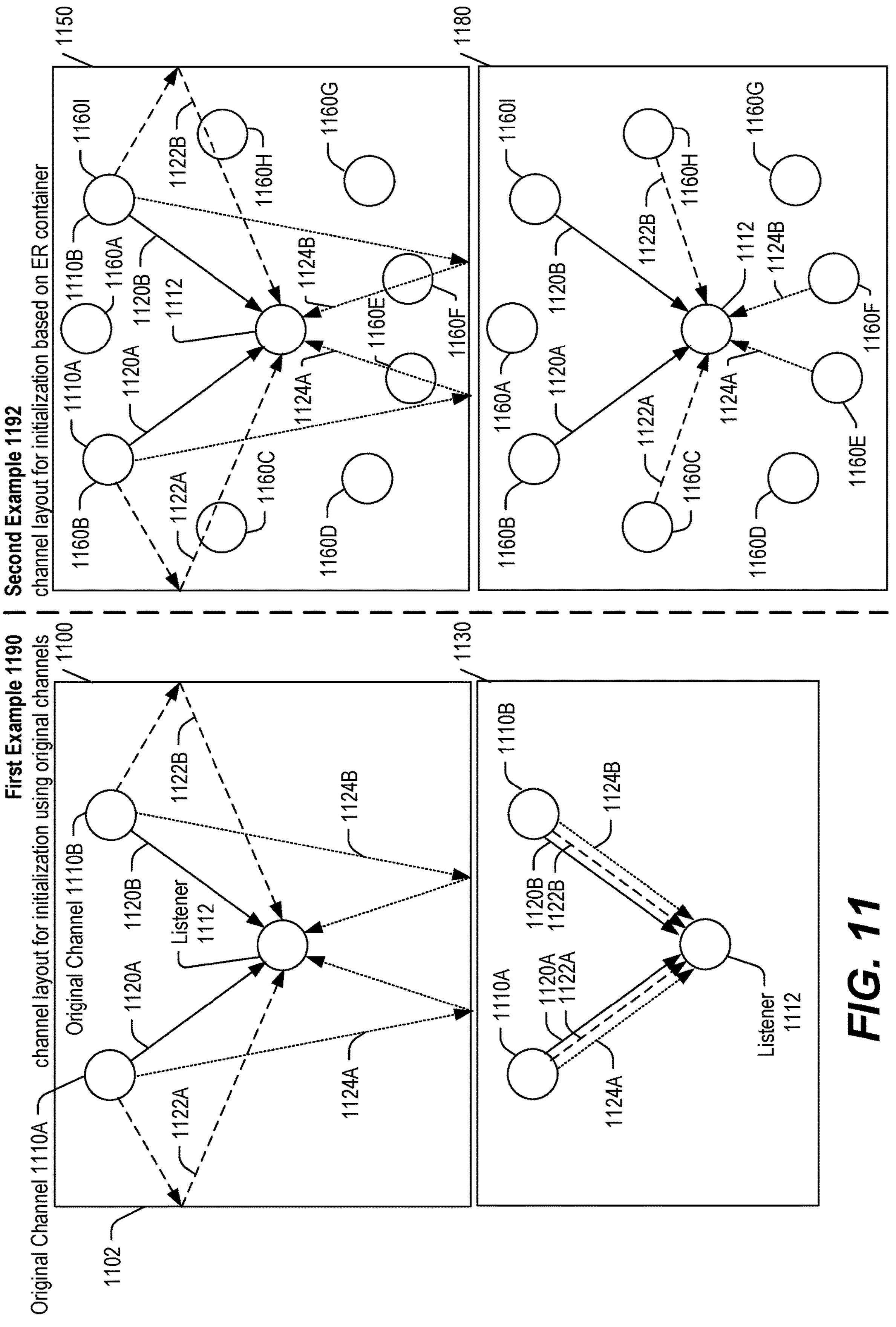
FIG. 11 illustrates examples of panning early reflection signals to channel positions, in accordance with some examples of the present disclosure.

FIG. 11 illustrates a first set of diagrams 1100, 1130 graphically depicting a first example 1190 of early reflection generation in which rendering is based on the original channel positions and a second set of diagrams 1150, 1180 graphically depicting a second example 1192 of early reflection generation in which rendering is based on channel positions of an early reflection channel container.

Each of the diagrams 1100, 1130, 1150, and 1180 depicts a top view of a listener 1112 in a room 1102 with two audio sources or channels that are labeled original channel 1110A and 1110B, such as a front-left channel and a front-right channel that the listener 1112 is facing and arranged in a stereo configuration. Sound propagates from the original channels 1110 to the listener 1112 via direct paths 1120 and various early reflections. For example, as illustrated in the diagram 1100, sound from the original channel 1110A and the original channel 1110B propagates to the listener 1112 via a direct path 1120A and a direct path 1120B, respectively. Left/right reflections 1122 correspond to reflections off the walls to the left and right of the listener 1112 and include a reflection 1122A and a reflection 1122B. Rear reflections 1124 correspond to reflections off the wall behind the listener 1112 and include a reflection 1124A and a reflection 1124B.

The reflections 1122, 1124 may be computed based on the original layout including the positions of the original channels 1110 and the listener 1112, dimensions of the room 1102, etc. In an example, the reflections 1122, 1124 are computed by the early reflection stage 234 using the shoebox-type reflection generation model 711. It should be understood that although only two first-degree reflections are shown for each original channel 1110, there may be a larger number of reflection paths from the original channels 1110 to the listener 1112 (e.g., a first-degree reflection off of each of the four walls of the room 1102 for each original channel 1110, one or more second or third degree reflections off of multiple walls, reflections off of the floor and/or ceiling of the room 1102, etc.).

According to the first example 1190 as shown in the diagrams 1100, 1130, rendering is performed using a multi-channel convolution renderer that supports a single binauralizer that is initialized based on the input channel layout. With sparse input channel layouts (e.g., stereo), rendering of early reflections can have unsatisfactory spatial accuracy.

To illustrate, the binauralizer may be initialized based on the positions of the original channels 1110A and 1110B, and the early reflections 1122, 1124 are panned to these positions. An example of panning reflections to the original channels 1110A is depicted in the diagram 1130, showing that the left reflection 1122A and the rear reflection 1124A have been panned to the position of the original channel 1110A. Similarly, the right reflection 1122B and the rear reflection 1124B have been panned to the position of the original channel 1110B. As a result, the left/right reflections 1122 are panned/rendered with some error (e.g., some spatial inaccuracy), and the rear reflections 1124 are panned/rendered with greater error (e.g., a larger amount of spatial inaccuracy).

The spatial inaccuracy is reduced or eliminated in the second example 1192 corresponding to the diagrams 1150, 1180. In the diagram 1150, candidate channel positions 1160 are illustrated as locations which may be used for audio sources during rendering, such as sources for sound that reaches the listener 1112 via direct paths and reflection paths. The candidate channel positions 1160 can be predetermined and used during initialization of the binauralizer, enabling binaural rendering having greater spatial accuracy. Data indicating the candidate channel positions 1160 can include, can be included in, or can be implemented as an early reflection channel container. As a non-limiting example, the early reflection channel container can include a data structure that includes azimuth and elevation data for each candidate channel position 1160.

As illustrated in the diagram 1150, the candidate channel positions 1160 include candidate channel positions 1160A, 1160B, 1160C, 1160D, 1160E, 1160F, 1160G, 1160H, and 1160I spaced around the listener 1112. The candidate channel position 1160B coincides with the position of original channel 1110A, and the candidate channel position 1160I coincides with the position of original channel 1110B. Although nine candidate channel positions 1160 are depicted, other implementations may include fewer than nine candidate channel positions 1160 or more than nine candidate channel positions 1160.

In some implementations, the candidate channel positions 1160 correspond to a superset of all possible channel positions defined in the multi-channel renderer. For example, the multi-channel renderer may be configured to support various surround sound channel layouts, such as mono, stereo, 5.1, 5.2, 7.1.2, 7.1.4, one or more other channel layouts (e.g., coding independent code points (CICP) channel configurations), or any combination thereof. According to an aspect, the multi-channel renderer is configured to "support" a particular channel layout when precomputed HRTFs and/or other data associated with the particular channel layout is available for use during rendering. Each channel layout may define channel positions via data such as an azimuth and elevation for each channel. If a distance from each channel position to the position of the listener 1112 is not defined in the channel layout, the distance may be selected or predetermined as a parameter for calculating the early reflections. For example, a distance parameter may correspond to a radius of a circle or sphere upon which some or all of the channels are situated to be equidistant from the position of the listener 1112.

In other implementations, the candidate channel positions 1160 may correspond to any arbitrary collection of channel positions. In still other implementations, the candidate channel positions 1160 may correspond to a combination of one or more of the surround sound channel layouts and one or more arbitrary channel positions.

According to the second example 1192, rendering is performed using a single binauralizer that is initialized based on the candidate channel positions 1160. Thus, even with sparse input channel layouts (e.g., stereo), rendering of early reflections can have enhanced spatial accuracy.

To illustrate, the binauralizer may be initialized based on the candidate channel positions 1160, and each of the early reflections 1122, 1124 is panned to the nearest one of these positions. For example, as depicted in the diagram 1180, the left reflection 1122A is panned to the candidate channel position 1160C, the rear reflection 1124A is panned to the candidate channel position 1160E, the right reflection 1122B is panned to the candidate channel position 1160H, and the rear reflection 1124B is panned to the candidate channel position 1160F. If the original channels 1110 did not coincide with the candidate channel positions 1160, these channels would also be panned to the nearest candidate channel position 1160. The original audio (e.g., the direct paths 1120) is mixed with the early reflections (e.g., reflections 1122 and 1124), and the single binauralizer renders the container mix for diotic playback (e.g., headphones or XR glasses). Thus, the direct paths and all reflections can be panned to, and rendered from, channel positions that are more spatially accurate than in the first example 1190 (e.g., the spatial accuracy illustrated in the diagram 1180 is greater than in the diagram 1130).

Figure 12A:
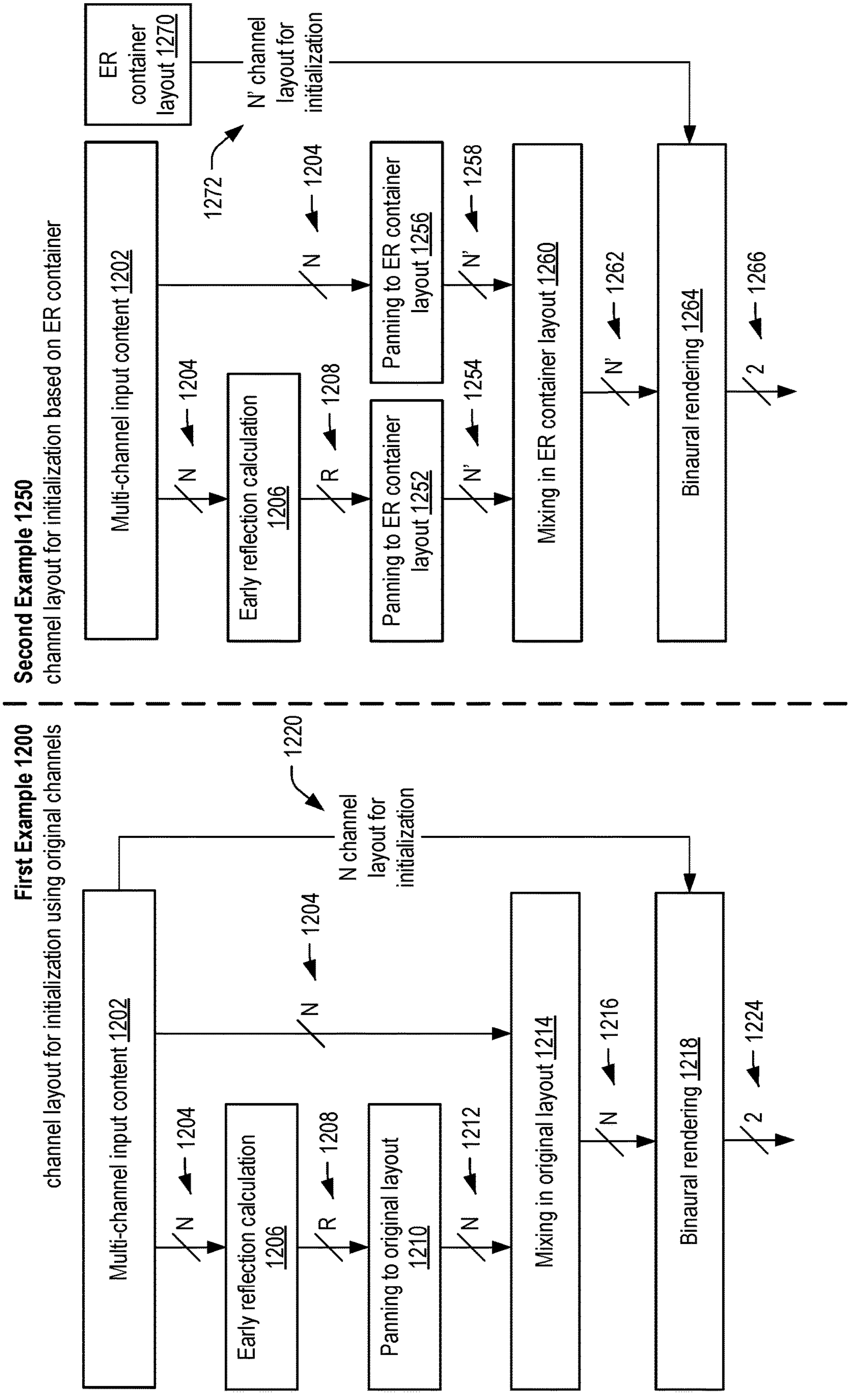
FIG. 12A illustrates examples of operations associated with generating an output binaural signal based on panned early reflection signals, in accordance with some examples of the present disclosure.

FIG. 12A depicts a first example 1200 and a second example 1250 of operations associated with early reflections generation and rendering. The first example 1200 corresponds to the first example 1190 (e.g., diagrams 1100, 1130) of FIG. 11 and the second example 1250 corresponds to the second example 1192 (e.g., diagrams 1150, 1180) of FIG. 11.

The first example 1200 includes obtaining multi-channel input content, at operation 1202. For example, the multi-channel input content can correspond to the multi-channel audio data 233, the object/channel streams 302, or other multi-channel audio. The multi-channel input content corresponds to N channels of audio content 1204 (N is an integer greater than one).

An operation 1206 includes processing the N channels of audio content 1204 to calculate early reflections, resulting in generation of R early reflection signals 1208 (R is an integer greater than or equal to N). For example, the early reflection calculation operation 1206 can be performed by the early reflection stage 234, such as by using the shoebox-type reflection generation model 711.

An operation 1210 includes panning the R early reflection signals 1208 to the original layout, such as previously described with reference the diagram 1130 of FIG. 11, to generate N channels of panned early reflection signals 1212.

The N channels of panned early reflection signals 1212 and the N channels of audio content 1204 are mixed in the original layout, at operation 1214, to generate N channels of mixed content 1216.

Binaural rendering is performed on the N channels of mixed content 1216, at operation 1218, to generate an output binaural signal 1224 that represents the one or more audio sources with artificial reverberation. The binaural rendering is performed by a single binauralizer, of a multi-channel convolution renderer, that is initialized based on the N-channel layout 1220. For example, initializing a multi-channel convolution renderer based on a particular channel layout can include loading hardcoded HRTFs associated with the particular channel layout, allocating memory based on the number of channels of the particular channel layout, preparing buffers based on the number of channels the particular channel layout, etc. As a result of initializing the binauralizer based on the N-channel layout 1220, spatial accuracy of the early reflections can be impacted as described previously with reference to the diagram 1130.

The second example 1250 includes obtaining the multi-channel input content, at operation 1202, and processing the N channels of audio content 1204 to calculate the R early reflection signals 1208, at operation 1206, as described previously for the first example 1200. In addition, an early reflections (ER) container layout 1272 corresponding to N' channels (e.g. the candidate channel positions 1160) is obtained, at operation 1270. According to an aspect, N' is a positive integer greater than N. For example, as depicted in the diagram 1150 of FIG. 11, N'=9 and N=2.

An operation 1252 includes panning the R early reflection signals 1208 to the N' channel ER container layout 1272, such as previously described with reference the diagram 1180 of FIG. 11, to generate N' channels of panned early reflection signals 1254. Optionally, the N channels of audio content 1204 are also panned to the ER container layout, at operation 1256, such as when the position of one or more of the original channel 1110 does not coincide with any of the candidate channel positions 1160, to generate N' channels of audio data 1258. One or more of the N' channels of panned early reflection signals 1254, the N' channels of audio data 1258, or both, may be devoid of audio content. Using the diagram 1180 as an example, the candidate channel positions 1160A, 1160B, 1160D, 1160G, and 1160I are devoid of early reflection audio content, the candidate channel positions 1160A and 1160C-H are devoid of input audio content, and the candidate channel positions 1160A, 1160D, and 1160G are devoid of all audio content.

The N' channels of panned early reflection signals 1254 and the N' channels of audio data 1258 are mixed in the ER container layout, at operation 1260, to generate N' channels of mixed content 1262.

Binaural rendering is performed on the N' channels of mixed content 1262, at operation 1264, to generate an output binaural signal 1266 that represents the one or more audio sources with artificial reverberation. The binaural rendering is performed by a single binauralizer, of a multi-channel convolution renderer, that is initialized based on the N' channel ER container layout 1272. The output binaural signal 1266 is thus based on the audio data and the panned early reflection signals and represents the one or more audio sources with artificial reverberation.

As a result of initializing the binauralizer based on the N' channel ER container layout 1272, spatial accuracy of the early reflections improved as compared to the first example 1200 in a similar manner as described previously with reference to the diagram 1180.

Although in the second example 1250 the number of channels N' in the ER container layout is greater than the number of audio channels N, in other implementations N' may be a positive integer that is equal to or less than N, which can provide reduced computational load during multi-channel convolution but may also result in increased spatial inaccuracy of the direct paths, the early reflections, or both. In some implementations, multiple ER channel layouts having different numbers of channels (e.g., different values of N') are supported, and metadata (e.g., one or more metadata bits) is used to select a particular one of the multiple ER channel layouts. For example, obtaining the ER container layout, at operation 1270, can include selecting, based on the metadata, one early reflection channel container from among multiple early reflection channel containers that are associated with different numbers of candidate channel positions. To illustrate, the metadata bit(s) may be set to a first value corresponding to a first ER container layout having a larger number of channels (a larger value of N') for enhanced spatial accuracy, or may be set to a second value corresponding to a second ER container layout having a smaller number of channels (a smaller value of N') for reduced complexity. The metadata can correspond to an explicit payload parameter that is set by a user/application through a config or may be obtained from a processor (e.g., the processor(s) 220), or from a transmission server (e.g., to prioritize low-latency computation vs. spatial accuracy for time-critical communication), as illustrative, non-limiting examples. The metadata may be set during configuration or during runtime. In a particular example, the metadata bit(s) may be included in reflection/reverb configuration data that is sent by an encoder and read at the beginning of the decoding process. In some implementations, the metadata may be set or obtained based on user input, such as via a graphical user interface (GUI) that enables a user to select a level of spatial accuracy, or may be determined by the processor based on battery charge or processor resource availability, as illustrative, non-limiting examples.

Figure 12B:
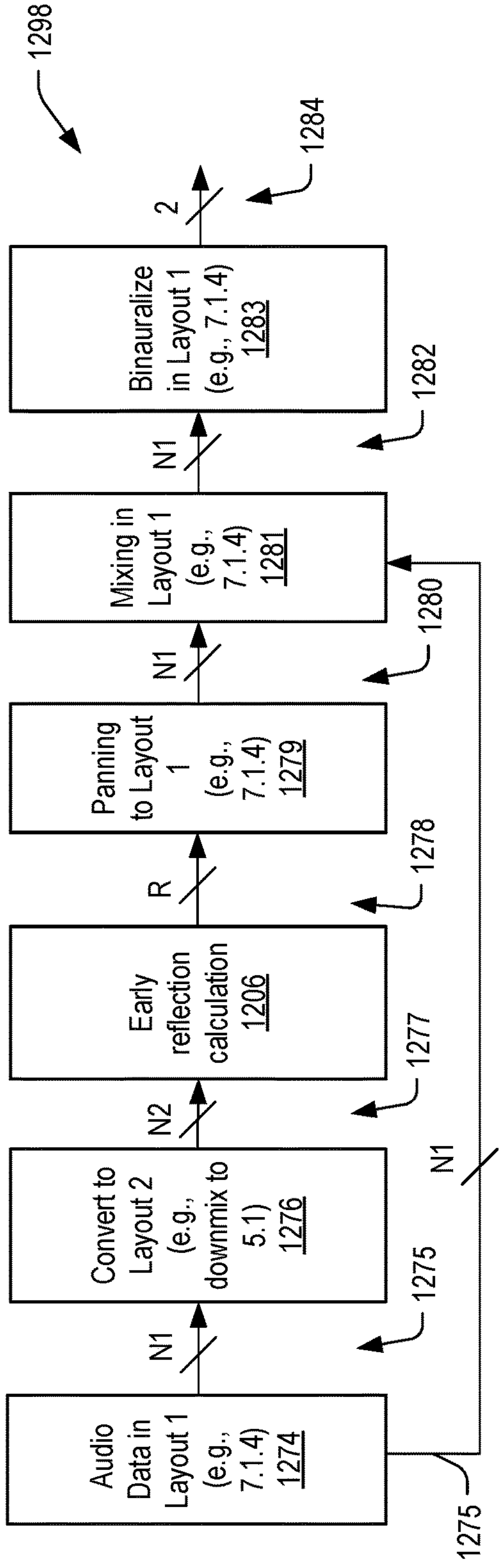
FIG. 12B illustrates another example of operations associated with generating an output binaural signal based on panned early reflection signals, in accordance with some examples of the present disclosure.

FIG. 12B depicts a third example 1298 of operations associated with early reflections generation and rendering that may be performed by a device. The third example 1298 includes obtaining the multi-channel input content, such as audio data that represents one or more audio sources and that corresponds to a first channel layout (e.g., 5.1) of the multiple channel layouts that are supported by the device, at operation 1274. The audio data is converted from the first channel layout to a second channel layout, at operation 1276. To illustrate, the N1 channels 1275 of the audio data in the first channel layout are converted to N2 channels 1277 of audio data in the second channel layout (where N1 and N2 are positive integers). For example, the first channel layout can be a 7.1.4 layout (e.g., N1=12), and the audio data of the N1 channels 1275 can be downmixed to a 5.1 layout (e.g., N2=6). The N2 channels 1277 (e.g., 6 channels) of audio data are processed to calculate the R early reflection signals 1278, at operation 1206, as described previously for the first example 1200.

An operation 1279 includes panning the R early reflection signals 1278 to the first channel layout (e.g., 7.1.4) to generate N1 channels 1280 of panned early reflection signals.

The N1 channels 1280 of panned early reflection signals and the N1 channels 1275 of the audio data are mixed in the first layout, at operation 1281, to generate N1 channels of mixed content 1282.

Binaural rendering is performed on the N1 channels of mixed content 1282, at operation 1283, to generate an output binaural signal 1284 that represents the one or more audio sources with artificial reverberation. The binaural rendering is performed by a single binauralizer, of a multi-channel convolution renderer, that is initialized based on the N1 channel layout (e.g., an N1-channel ER container layout). The output binaural signal 1284 is thus based on the audio data and the panned early reflection signals and represents the one or more audio sources with artificial reverberation.

Conversion from the first channel layout to the second channel layout for generation of the early reflections enables the early reflections to be computed with a lower complexity when the second channel layout has fewer channels than the first channel layout (e.g., when the audio content is downmixed at operation 1276 from a 7.1.4 layout to a 5.1 layout for generation of the early reflections) as compared to computing the early reflection in the second example 1250, while panning the early reflections to the first channel layout provides improved spatial accuracy of the early reflections as compared to the first example 1200.

Figure 12C:
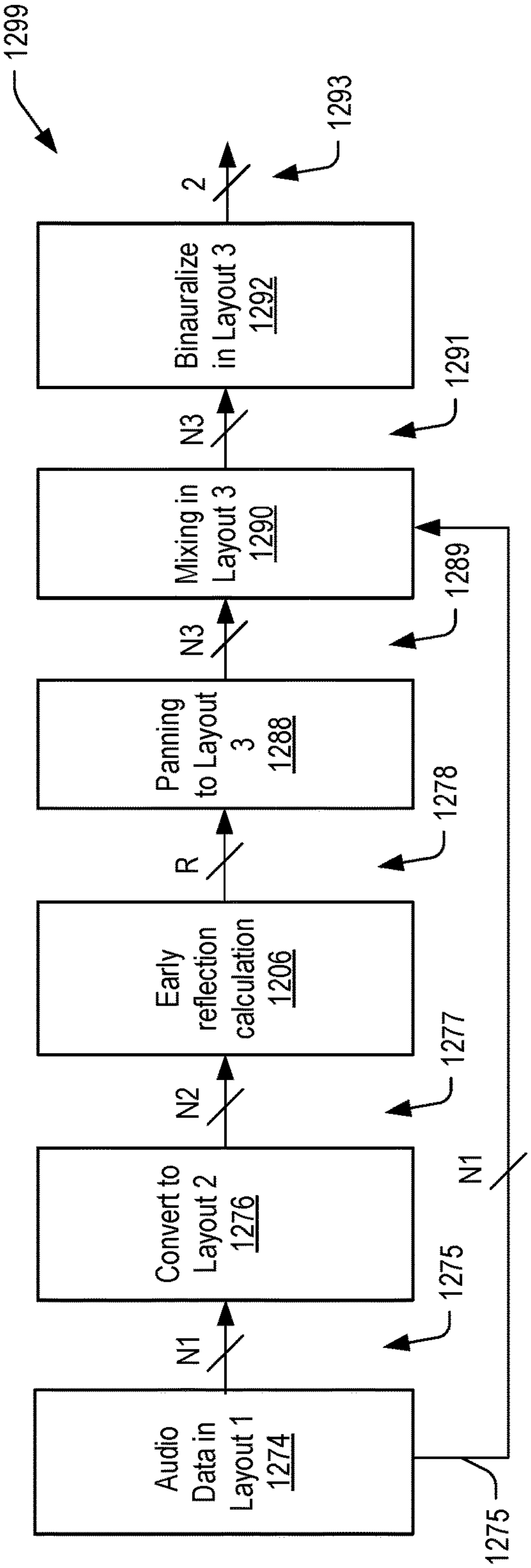
FIG. 12C illustrates another example of operations associated with generating an output binaural signal based on panned early reflection signals, in accordance with some examples of the present disclosure.

FIG. 12C depicts a fourth example 1299 of operations associated with early reflections generation and rendering that may be performed by a device. The fourth example 1299 includes obtaining the multi-channel input content, such as audio data that represents one or more audio sources and that corresponds to a first channel layout of the multiple channel layouts that are supported by the device, at operation 1274, converting from the first channel layout to a second channel layout, at operation 1276, and processing the N2 channels 1277 of audio data to calculate the R early reflection signals 1278, at operation 1206, as described with reference to the third example 1298.

The fourth example 1299 also includes panning the R early reflection signals 1278 to a third channel layout to generate N3 channels of panned early reflection signals 1289, at operation 1288 (where N3 is a positive integer).

The N3 channels of panned early reflection signals 1289 and the N1 channels 1275 of the audio data are mixed in the third channel layout, at operation 1290, to generate N3 channels of mixed content 1291. Optionally, the N1 channels 1275 of the audio data are also converted to the third channel layout when the first channel layout does not match the third channel layout, such as via an upmixing operation, a downmixing operation, a panning operation as described above with reference to operation 1256, etc., as illustrative, non-limiting examples.

Binaural rendering is performed, at operation 1292, on the N3 channels of mixed content 1291 to generate an output binaural signal 1293 that represents the one or more audio sources with artificial reverberation. The binaural rendering is performed by a single binauralizer, of a multi-channel convolution renderer, that is initialized based on the N3 channel layout (e.g., an N3-channel ER container layout). The output binaural signal 1293 is thus based on the audio data and the panned early reflection signals and represents the one or more audio sources with artificial reverberation.

Converting the audio data to the second channel layout, at operation 1276, enables a complexity of the early reflections calculations to be adjusted (e.g., to reduce complexity when N2<N1), and panning the early reflection signals and mixing using the third channel layout enables adjustment of the spatial accuracy of the early reflection signals (e.g., to increase spatial accuracy when N3>N2).

Although in the above description, the panning illustrated in the diagram 1180 and performed in operations 1252, 1256, 1279, and 1288 corresponds to a snapping operation (e.g., moving an entire audio signal to a single closest candidate channel position 1160), in other implementations the panning performed in operation 1252, 1256, 1279, 1288, or any combination thereof, can include panning one or more audio signals between multiple candidate channel positions. To illustrate, in an example in which the rear reflection 1124B passes between the candidate channel positions 1160F and 1160G, panning the rear reflection 1124B to the closest candidate channel positions can result in 50% of the reflection 1124B at the candidate channel position 1160F and 50% of the reflection 1124B at the candidate channel position 1160G. Although 50% is provided as an illustrative example, the proportion of the reflection 1124B assigned to each of the candidate channel positions 1160F and 1160G may be calculated based on the distances between the reflection 1124B and each of the candidate channel positions 1160F and 1160G. Thus, the operation 1252 may pan each of the early reflection signals to one or more respective candidate channel positions 1160 of the multiple candidate channel positions 1160 to generate panned early reflection signals, and the operation 1256 may pan each audio source to one or more respective candidate channel positions 1160 of the multiple candidate channel positions 1160 to generate panned audio source signals.

Although the second example 1250, the third example 1298, and the fourth example 1299 each depict various operations, it should be understood that one or more additional operations associated with convolution rendering can also be included, such as rotation, late reverberation, etc., such as described in further detail with reference to FIG. 13. Further, one or more operations may be combined. For example, in a particular implementation, the panning performed in operations 1252 and 1256 and the mixing performed in operation 1260 can be combined.

Figure 13:
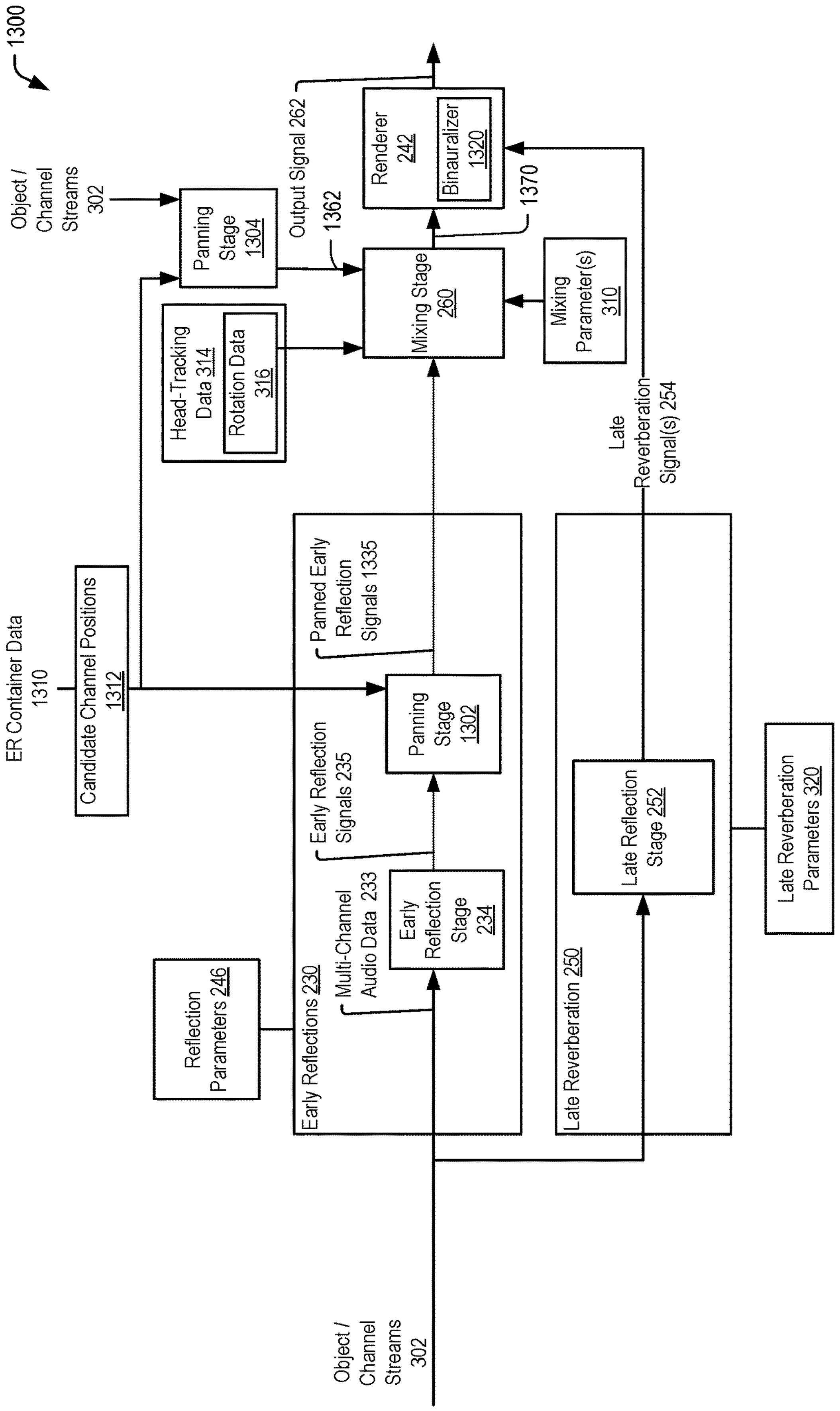
FIG. 13 is a block diagram of an illustrative aspect of components associated with generating an output binaural signal based on panned early reflection signals that may be implemented in the device of FIG. 2, in accordance with some examples of the present disclosure.

FIG. 13 illustrates an example of components 1300 that can be included in a device, such as the device 202, in a multi-channel convolution rendering implementation. The components 1300 include implementations of the early reflections component 230, the late reverberation component 250, the mixing stage 260, and the renderer 242 that are configured to operate in conjunction with the early reflection channel container and multi-channel convolutional rendering previously described with reference to the second examples 1192 of FIGS. 11 and 1250 of FIG. 12A, the third example 1298 of FIG. 12B, and the fourth example 1299 of FIG. 12C.

The early reflections component 230 includes the early reflection stage 234 configured to process the multi-channel audio data 233 to generate the early reflection signals 235 based on the audio data 233 and the spatialized reflection parameters 246. As illustrated, the multi-channel audio data 233 can correspond to the object/channel streams 302 directly (e.g., without first converting to ambisonics at the ambisonics generator 304 of FIG. 3 and then rendering to multi-channel data at the ambisonics renderer 352 of FIG. 3), although in other implementations the multi-channel audio data 233 can be generated as described in FIG. 3. According to an implementation, the early reflection stage 234 performs the operation 1206 of FIG. 12A, the multi-channel audio data 233 corresponds to the N channels of audio content 1204, and the early reflection signals 235 correspond to the R early reflection signals 1208.

The early reflections component 230 also includes a panning stage 1302 that receives early reflections container data 1310 including multiple candidate channel positions 1312. The panning stage 1302 is configured to pan each of the early reflection signals 235 to a respective candidate channel position of the multiple candidate channel positions 1312 to generate panned early reflection signals 1335. According to an implementation, the candidate channel positions 1312 correspond to the candidate channel positions 1160 of FIG. 11 and/or the N' channel ER container layout 1272 of FIG. 12A, the panning stage 1302 performs the operation 1252 of FIG. 12A, and the panned early reflection signals 1335 correspond to the N' channels of panned early reflection signals 1254.

Another panning stage 1304 is configured to pan each of the one or more audio sources of the object/channel streams 302 to one or more respective candidate position of the multiple candidate channel positions to generate panned audio source signals, illustrated as output channels of audio data 1362 that correspond to the candidate channel positions 1312. In an example, the panning stage 1304 is configured to pan one or more channels of the object/channel streams 302 to one or more of the candidate channel positions 1312 when the one or more channels do not coincide with any of the candidate channel positions 1312. In a particular implementation, the panning stage 1304 is configured to perform the operation 1256 of FIG. 12A, and the channels of audio data 1362 corresponds to the N' channels of audio data 1258.

The late reverberation component 250 processes the object/channel streams 302 at the late reflection stage 252 to generate the one or more late reverberation signals 254. For example, the late reverberation component 250 may downmix the object/channel streams 302 to generate a mono channel input for the late reflection stage 252, such as by performing a weighted summation of the object/channel streams 302 as an illustrative, non-limiting example.

The mixing stage 260 is configured to mix the panned early reflection signals 1335 and the channels of audio data 1362 and generate a mixed output 1370 to the renderer 242. The mixing stage 260 may also be configured to mix the late reverberation signals 254 from the late reflection stage 252, perform a rotation operation based on the head-tracking data 314, or both. In a particular implementation, the mixing stage 260 is configured to perform the operation 1260 of FIG. 12A, and the mixed output 1370 corresponds to the N' channels of mixed content 1262.

The renderer 242 is configured to perform multi-channel convolutional rendering including binauralization of the mixed output 1370 at a single binauralizer 1320 to generate the output signal 262. The binauralization is initialized based on the ER container data 1310, which may correspond to the N' channel ER container layout 1272 of FIG. 12A. The output signal 262 corresponds to an output binaural signal that is based on the audio data (e.g., the object/channel streams 302) and the panned early reflection signals 1335 and that represents the one or more audio sources with artificial reverberation. In a particular implementation, the renderer 242 is configured to perform the operation 1264 of FIG. 12A, and the output signal 262 corresponds to the output binaural signal 1266.

Although FIG. 13 illustrates that the components 1300 include the late reverberation component 250, in other implementations the late reverberation component 250 may be omitted. Although the head-tracking data 314 is illustrated as being provided to the mixing stage 260, in other implementations rotation may be performed via one or more other components (e.g., at the renderer 242 or at a rotator such as the rotator 430 of FIG. 4D) or may not be performed.

Although FIG. 13 depicts a particular arrangement of the components 1300, it should be understood that in other implementations the components 1300 can be implemented in other arrangements, such as arrangements that are analogous to one or more of the various examples described with reference to 3-6 C. In an example, the components 1300 can include a converter (e.g., a downmixer) prior to the early reflection stage 234 to perform the channel layout conversion corresponding to the operation 1276 of FIG. 12B and/or FIG. 12C.

Figure 14:
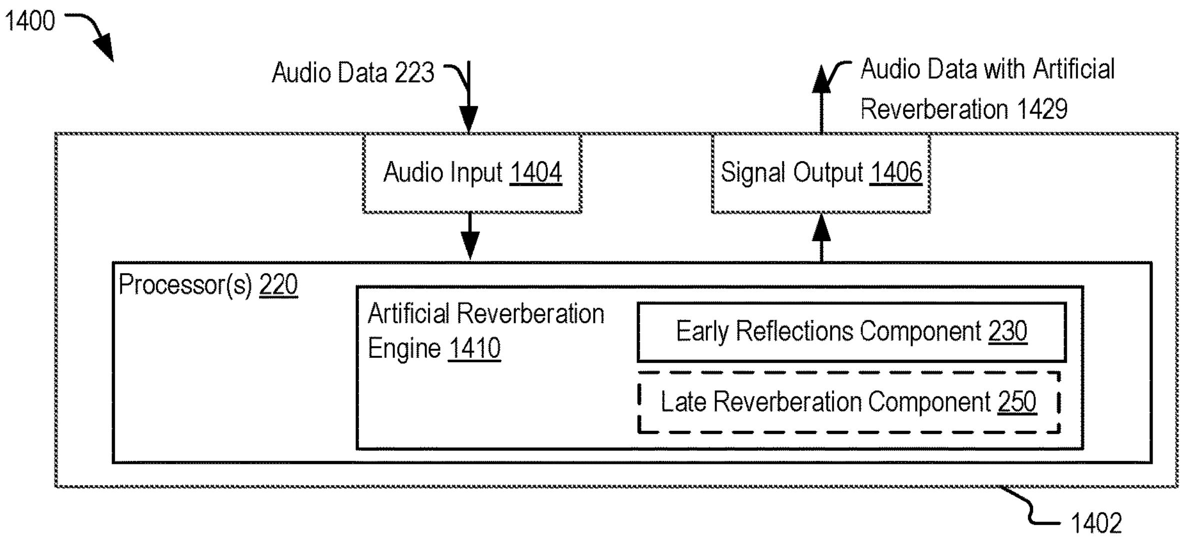
FIG. 14 illustrates an example of an integrated circuit operable to generate artificial reverberation in spatial audio, in accordance with some examples of the present disclosure.

FIG. 14 depicts an implementation 1400 of the device 202 as an integrated circuit 1402 that includes the one or more processors 220. The processor(s) 220 include one or more components of an artificial reverberation engine 1410, including the early reflections component 230 (e.g., as illustrated in any of FIGS. 2-6C or FIG. 13) and optionally including the late reverberation component 250. The integrated circuit 1402 also includes signal input circuitry 1404, such as one or more bus interfaces, to enable the audio data 223 to be received for processing. The integrated circuit 1402 also includes signal output circuitry 1406, such as a bus interface, to enable sending audio data with artificial reverberation 1429 from the integrated circuit 1402. For example, the audio data with artificial reverberation 1429 can correspond to the early reflection signals 235, the second data 240, the rendering 244, or the output signal 262 (e.g., the output binaural signal 262 of FIG. 13), as illustrative, non-limiting examples.

The integrated circuit 1402 enables implementation of artificial reverberation as a component in a system that includes audio playback, such as a pair of earbuds as depicted in FIG. 15, a headset as depicted in FIG. 16, or an extended reality (e.g., a virtual reality, mixed reality, or augmented reality) headset as depicted in FIG. 17. The integrated circuit 1402 also enables implementation of artificial reverberation as a component in a system that transmits audio to an earphone for playout, such as a mobile phone or tablet as depicted in FIG. 18, a wearable electronic device as depicted in FIG. 19, a voice assistant device as depicted in FIG. 20, or a vehicle as depicted in FIG. 21.

FIG. 15 depicts an implementation 1500 of the device 202 in which the device 202 corresponds to an in-ear style earphone, illustrated as a pair of earbuds 1506 including a first earbud 1502 and a second earbud 1504. Although earbuds are depicted, it should be understood that the present technology can be applied to other in-ear, on-ear, or over-ear playback devices. Various components, such as the artificial reverberation engine 1410, are illustrated using dashed lines to indicate internal components that are not generally visible to a user.

The first earbud 1502 includes the artificial reverberation engine 1410, the speaker 270, a first microphone 1520, such as a high signal-to-noise microphone positioned to capture the voice of a wearer of the first earbud 1502, an array of one or more other microphones configured to detect ambient sounds and that may be spatially distributed to support beamforming, illustrated as microphones 1522A, 1522B, and 1522C, and a self-speech microphone 1526, such as a bone conduction microphone configured to convert sound vibrations of the wearer's ear bone or skull into an audio signal. In a particular implementation, the microphones 1522A, 1522B, and 1522C correspond to the one or more microphones 290, and audio signals generated by the microphones 1520 and 1522A, 1522B, and 1522C are used as audio data 223.

The artificial reverberation engine 1410 is coupled to the speaker 270 and is configured to generate artificial reverberation in audio data, such as early reflections, late reverberation, or both, as described above. The artificial reverberation engine 1410 may also be configured to adjust the artificial reverberation so that the directionality of early reflections are updated based on movement of a user of the earbud 1502, such as head tracking data generated by an IMU integrated in the earbud 1502. The second earbud 1504 can be configured in a substantially similar manner as the first earbud 1502 or may be configured to receive one signal of the output signal 262 from the first earbud 1502 for playout while the other signal of the output signal 262 is played out at the first earbud 1502.

In some implementations, the earbuds 1502, 1504 are configured to automatically switch between various operating modes, such as a passthrough mode in which ambient sound is played via the speaker 270, a playback mode in which non-ambient sound (e.g., streaming audio corresponding to a phone conversation, media playback, a video game, etc.) is played back through the speaker 270, and an audio zoom mode or beamforming mode in which one or more ambient sounds are emphasized and/or other ambient sounds are suppressed for playback at the speaker 270. In other implementations, the earbuds 1502, 1504 may support fewer modes or may support one or more other modes in place of, or in addition to, the described modes.

In an illustrative example, the earbuds 1502, 1504 can automatically transition from the playback mode to the passthrough mode in response to detecting the wearer's voice, and may automatically transition back to the playback mode after the wearer has ceased speaking. In some examples, the earbuds 1502, 1504 can operate in two or more of the modes concurrently, such as by performing audio zoom on a particular ambient sound (e.g., a dog barking) and playing out the audio zoomed sound superimposed on the sound being played out while the wearer is listening to music (which can be reduced in volume while the audio zoomed sound is being played). In this example, the wearer can be alerted to the ambient sound associated with the audio event without halting playback of the music. Artificial reverberation can be added by the artificial reverberation engine 1410 in one or more of the modes. For example, the audio played out at the speaker 270 during the playback mode can be processed to add artificial reverberation.

FIG. 16 depicts an implementation 1600 in which the device 202 is a headset device 1602. The headset device 1602 includes the speakers 270, 272 and a microphone 1616, and the artificial reverberation engine 1410 is integrated in the headset device 1602 and configured to add artificial reverberation to audio to be played out at the speakers 270, 272 as described above.

The artificial reverberation engine 1410 is coupled to the speakers 270, 272 and is configured to generate artificial reverberation in audio data, such as early reflections, late reverberation, or both, as described above. The artificial reverberation engine 1410 may also be configured to adjust the artificial reverberation so that the directionality of early reflections are updated based on movement of a user of the headset device 1602, such as head tracking data generated by an IMU integrated in the headset device 1602.

FIG. 17 depicts an implementation 1700 in which the device 202 includes a portable electronic device that corresponds to an extended reality (e.g., a virtual reality, mixed reality, or augmented reality) headset 1702. The headset 1702 includes a visual interface device and earphone devices, illustrated as over-ear earphone cups that each include one of the speaker 270 or the speaker 272. The visual interface device is positioned in front of the user's eyes to enable display of augmented reality, mixed reality, or virtual reality images or scenes to the user while the headset 1702 is worn.

The artificial reverberation engine 1410 is integrated in the headset 1702 and configured to add artificial reverberation to audio as described above. For example, the artificial reverberation engine 1410 may add head motion compensated artificial reverberation during playback of sound data associated with audio sources in a virtual audio scene, spatial audio associated with a gaming session, voice audio such as from other participants in a video conferencing session or a multiplayer online gaming session, or a combination thereof.

FIG. 18 depicts an implementation 1800 in which the device 202 includes a mobile device 1802, such as a phone or tablet, coupled to earphones 1890, such as a pair of earbuds, as illustrative, non-limiting examples. The artificial reverberation engine 1410 is integrated in the mobile device 1802 and configured to generate artificial reverberation for spatial audio as described above. Each of the earphones 1890 includes a speaker, such as the speakers 270 and 272. Each earphone 1890 is configured to wirelessly receive audio data from the mobile device 1802 for playout.

In some implementations, the mobile device 1802 generates the output signal 262 that includes artificial reverberation and transmits audio data representing the output signal 262 to the earphones 1890 for playout. In some examples, one or more of the earphones 1890 includes an IMU and transmits head-tracking data, such as the head-tracking data 314, to the mobile device 1802 for use in generating the artificial reverberation.

In some implementations, the earphones 1890 perform at least a portion of the audio processing associated with generating the artificial reverberation with spatialized audio. In a first example, the mobile device 1802 generates audio data with artificial reverberation, and the earphones 1890 apply rotation based on head-tracking data to generate the output signal 262. For example, the mobile device 1802 may transmit audio data representing the second data 240 of FIG. 6A and the one or more late reverberation signals 254 of FIG. 6A to the earphones 1890, or representing the channels of audio data 1362 and the panned early reflection signals 1335 of FIG. 13, and the earphones 1890 may perform rotation, rendering, and mixing operations such as described for the renderer 242 and the mixing stage 260 of FIG. 6A or FIG. 13, respectively. In another example, the mobile device 1802 may transmit audio data representing the output of the mixing stage 260 of FIG. 6B or FIG. 13 to the earphones 1890, and the earphones 1890 may perform rotation and rendering operations such as described for the renderer 242 of FIG. 6B or FIG. 13. In another example, the mobile device 1802 transmits audio data to the earphones 1890 corresponding to an earlier stage of the artificial reverberation generation, such as sending the first data 228 to the earphones 1890, and the earphones 1890 perform the remainder of the stages of the artificial reverberation generation to generate the output signal 262 for playout.

In some implementations, the mobile device 1802 is configured to provide a user interface via a display screen 1804 that enables a user of the mobile device 1802 to adjust one or more parameters associated with generating artificial reverberation, such as one or more of the reflection parameters 246, one or more of the one or more late reverberation parameters 320, one or more of the one or more mixing parameters 310, one or more other parameters such as a head-tracking/head-locked toggle to enable/disable use of the head-tracking data 314, or a combination thereof, to generate a customized audio experience.

FIG. 19 depicts an implementation 1900 in which the device 202 includes a wearable device 1902, illustrated as a "smart watch," coupled to the earphones 1890, such as a pair of earbuds, as illustrative, non-limiting examples. The artificial reverberation engine 1410 is integrated in the wearable device 1902 and configured to generate artificial reverberation for spatial audio as described above. The earphones 1890 each include a speaker, such as the speakers 270 and 272. Each earphone 1890 is configured to wirelessly receive audio data from the wearable device 1902 for playout.

In some implementations, the wearable device 1902 generates the output signal 262 that includes artificial reverberation and transmits audio data representing the output signal 262 to the earphones 1890 for playout. In some examples, one or more of the earphones 1890 includes an IMU and transmits head-tracking data, such as the head-tracking data 314, to the wearable device 1902 for use in generating the artificial reverberation.

In some implementations, the earphones 1890 perform at least a portion of the audio processing associated with generating the artificial reverberation with spatialized audio. In a first example, the wearable device 1902 generates audio data with artificial reverberation, and the earphones 1890 apply rotation based on head-tracking data to generate the output signal 262. For example, the wearable device 1902 may transmit audio data representing the second data 240 of FIG. 6A and the one or more late reverberation signals 254 of FIG. 6A, or representing the channels of audio data 1362 and the panned early reflection signals 1335 of FIG. 13, to the earphones 1890, and the earphones 1890 may perform rotation, rendering, and mixing operations such as described for the renderer 242 and the mixing stage 260 of FIG. 6A or FIG. 13, respectively. In another example, the wearable device 1902 may transmit audio data representing the output of the mixing stage 260 of FIG. 6B or FIG. 13 to the earphones 1890, and the earphones 1890 may perform rotation and rendering operations such as described for the renderer 242 of FIG. 6B or FIG. 13. In another example, the wearable device 1902 transmits audio data to the earphones 1890 corresponding to an earlier stage of the artificial reverberation generation, such as sending the first data 228 to the earphones 1890, and the earphones 1890 perform the remainder of the stages of the artificial reverberation generation to generate the output signal 262 for playout.

In some implementations, the wearable device 1902 is configured to provide a user interface via a display screen 1904 that enables a user of the wearable device 1902 to adjust one or more parameters associated with generating artificial reverberation, such as one or more of the reflection parameters 246, one or more of the one or more late reverberation parameters 320, one or more of the one or more mixing parameters 310, one or more other parameters such as a head-tracking/head-locked toggle to enable/disable use of head-tracking data, or a combination thereof, to generate a customized audio experience.

FIG. 20 is an implementation 2000 in which the device 202 includes a wireless speaker and voice activated device 2002 coupled to the earphones 1890. The wireless speaker and voice activated device 2002 can have wireless network connectivity and is configured to execute an assistant operation, such as adjusting a temperature, playing music, turning on lights, etc. For example, assistant operations can be performed responsive to receiving a command after a keyword or key phrase (e.g., "hello assistant").

The one or more processors 220 including the artificial reverberation engine 1410 are integrated in the wireless speaker and voice activated device 2002 and configured to generate artificial reverberation for spatial audio as described above. The wireless speaker and voice activated device 2002 also includes a microphone 2026 and a speaker 2042 that can be used to support voice assistant sessions with users that are not wearing earphones.

In some implementations, the wireless speaker and voice activated device 2002 generates the output signal 262 that includes artificial reverberation and transmits audio data representing the output signal 262 to the earphones 1890 for playout. In some examples, one or more of the earphones 1890 includes an IMU and transmits head-tracking data, such as the head-tracking data 314, to the wireless speaker and voice activated device 2002 for use in generating the artificial reverberation.

In some implementations, the earphones 1890 perform at least a portion of the audio processing associated with generating the artificial reverberation with spatialized audio. In a first example, the wireless speaker and voice activated device 2002 generates audio data with artificial reverberation, and the earphones 1890 apply rotation based on head-tracking data to generate the output signal 262. For example, the wireless speaker and voice activated device 2002 may transmit audio data representing the second data 240 of FIG. 6A and the one or more late reverberation signals 254 of FIG. 6A, or representing the channels of audio data 1362 and the panned early reflection signals 1335 of FIG. 13, to the earphones 1890, and the earphones 1890 may perform rotation, rendering, and mixing operations such as described for the renderer 242 and the mixing stage 260 of FIG. 6A or FIG. 13, respectively. In another example, the wireless speaker and voice activated device 2002 may transmit audio data representing the output of the mixing stage 260 of FIG. 6B or FIG. 13 to the earphones 1890, and the earphones 1890 may perform rotation and rendering operations such as described for the renderer 242 of FIG. 6B or FIG. 13. In another example, the wireless speaker and voice activated device 2002 transmits audio data to the earphones 1890 corresponding to an earlier stage of the artificial reverberation generation, such as sending the first data 228 to the earphones 1890, and the earphones 1890 perform the remainder of the stages of the artificial reverberation generation to generate the output signal 262 for playout.

In some implementations, the wireless speaker and voice activated device 2002 is configured to provide a user interface, such as a speech interface or via a display screen, that enables a user of the wireless speaker and voice activated device 2002 to adjust one or more parameters associated with generating artificial reverberation, such as one or more of the reflection parameters 246, one or more of the one or more late reverberation parameters 320, one or more of the one or more mixing parameters 310, one or more other parameters such as a head-tracking/head-locked toggle to enable/disable use of head-tracking data, or a combination thereof, to generate a customized audio experience.

FIG. 21 depicts an implementation 2100 in which the device 202 includes a vehicle 2102, illustrated as a car. Although a care is depicted, the vehicle 2102 can be any type of vehicle, such as an aircraft (e.g., an air taxi). The one or more processors 220 including the artificial reverberation engine 1410 are integrated in the vehicle 2102 and configured to perform generate artificial reverberation for spatial audio for one or more occupants (e.g., passenger(s) and/or operator(s)) of the vehicle 2102 that are wearing earphones, such as the earphones 1890 (not shown). For example, the vehicle 2102 is configured to support multiple independent wireless or wired audio sessions with multiple occupants that are each wearing earphones, such as by enabling each of the occupants to independently stream audio, engage in a voice call or voice assistant session, etc., via their respective earphones, during which artificial reverberation generation may be performed, enabling each occupant to experience an individualized virtual audio scene. The vehicle 2102 also includes multiple microphones 2126, one or more speakers 2142, and a display 2146. The microphones 2126 and the speakers 2142 can be used to support, for example, voice calls, voice assistant sessions, in-vehicle entertainment, etc., with users that are not wearing earphones.

Although various illustrative implementations are depicted in the preceding figures, it should be understood that the present techniques may be applied in one or more other applications in which artificial reverberation is generated for spatial audio. As a particular, non-limiting example, one or more elements of the present techniques can be implemented in robot, such as a system or device that is controlled autonomously or via a remote user. Such a robot may include one or more motion trackers, such as an IMU, to generate motion or position tracking data of the robot (or a rotatable portion of the robot) that may be used in place of the head-tracking data 314, such that a rotational orientation and/or position of the robot functions as a proxy for a rotational orientation and/or position of a listener's head.

In a particular example, the robot can correspond to a drone that may provide a video stream and audio stream to a user, in which artificial reverberation is added to virtual sound and is adjusted based on the rotational orientation of the robot. The user may be provided with the ability to rotate the robot (e.g., via a controller or speech interface) and to experience a rotation-tracked virtual audio scene with reverberation emulating what the user would experience if the user were in a room (e.g., an actual or virtual room) with a virtual sound source, and with the user's head orientation matching the robot's rotational orientation. Other examples of robots or other devices that may implement rotation or motion tracking for use with generation of artificial reverberation for spatial audio can include a robot that has a swiveling component, or a smart speaker device or other device (e.g., a soundbar) with a camera that is configured to rotate, such as to turn toward a most prominent sound source or toward a detected person (e.g., using face detection), as illustrative, non-limiting examples.

Figure 22:
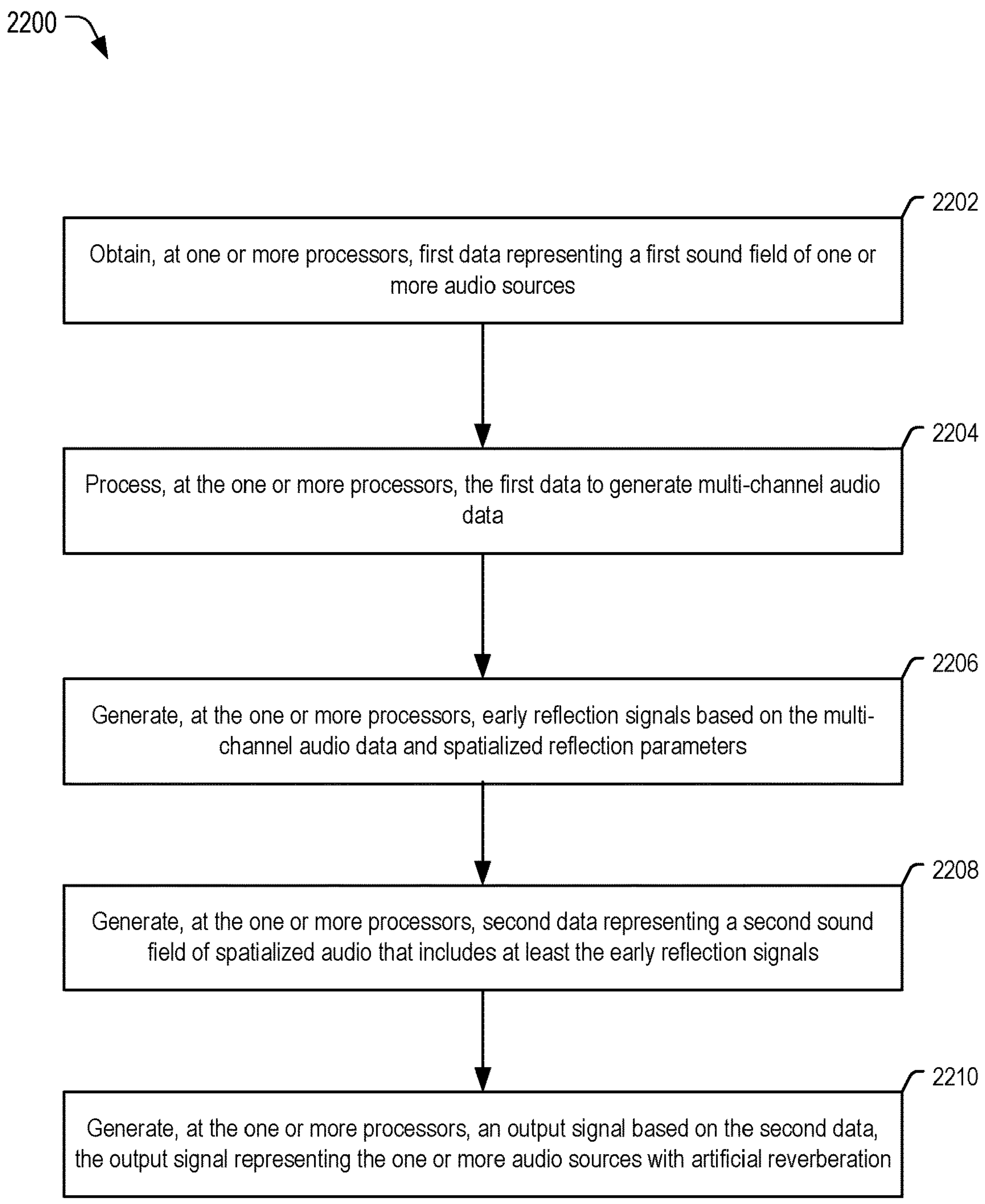
FIG. 22 is a diagram of a particular implementation of a method of generating artificial reverberation in spatial audio that may be performed by the device of FIG. 2, in accordance with some examples of the present disclosure.

FIG. 22 illustrates an example of a method 2200 of generating artificial reverberation in spatial audio. The method 2200 may be performed by an electronic device, such as the device 202, as an illustrative, non-limiting example.

In a particular aspect, the method 2200 includes, at block 2202, obtaining, at one or more processors, first data representing a first sound field of one or more audio sources. For example, the sound field representation generator 224 of FIG. 2 generates the first data 228 representing the first sound field 226, as described with reference to FIG. 2. In some implementations, the first data includes or corresponds to ambisonics data.

The method 2200 also includes, at block 2204, processing, at the one or more processors, the first data to generate multi-channel audio data. For example, the sound field representation renderer 232 of FIG. 2 processes the first data 228 to generate the multi-channel audio data 233, as described with reference to FIG. 2.

The method 2200 further includes, at block 2206, generating, at the one or more processors, early reflection signals based on the multi-channel audio data and spatialized reflection parameters. For example, the early reflection stage 234 of FIG. 2 generates the early reflection signals 235 based on the multi-channel audio data 233 and based on the spatialized reflection parameters 246, as described with reference to FIG. 2. The spatialized reflection parameters 246 include, for example, the room dimension parameters 750, the surface material parameters 752, the source position parameters 754, the listener position parameters 758 of FIG. 7, or combinations thereof.

The method 2200 also includes, at block 2208, generating, at the one or more processors, second data (e.g., ambisonics data) representing a second sound field of spatialized audio that includes at least the early reflection signals. For example, the sound field representation generator 236 of FIG. 2 generates the second data 240 representing the second sound field 238, as described with reference to FIG. 2.

The method 2200 further includes, at block 2210, generating, at the one or more processors, an output signal based on the second data, the output signal representing the one or more audio sources with artificial reverberation. For example, the renderer 242 (and optionally the mixing stage 260) generates the output signal 262, as described with reference to FIG. 2. In a particular implementation, the output signal is an output binaural signal.

In some implementations, the method 2200 includes providing the output signal for playout at earphone speakers. For example, the one or more processors 220 provide the output signal 262 to the speakers 270, 272 of FIG. 2, or to the second device 294 (e.g., an earphone device) via the modem 288, In some implementations, the method 2200 includes generating a set of reflection data, such as the reflection data 712, including the reflection direction of arrival data 714, the time of arrival delay data 716, and the gain data 718 for multiple reflections. For example, the second data 240 may be based on encoding the early reflection signals 235 in conjunction with the reflection direction of arrival data 714. In some such implementations, the set of reflection data 712 is based at least partially on the spatialized reflection parameters 246, and the early reflection signals 235 are based on the set of reflection data 712. In some such implementations, the set of reflection data 712 is generated based on a shoebox-type reflection generation model, such as the shoebox-type reflection generation model 711. In some such implementations, the early reflection signals 235 are generated via application of time of arrival delays and gains, of the set of reflection data, to respective channels of the multi-channel audio data 233. For example, the early reflection signals 235 may be generated via application of the time of arrival delay data 716 and the gain data 718 to respective channels of the multi-channel input 706.

In some implementations, the method 2200 also includes obtaining head-tracking data, such as the head-tracking data 314, that includes rotation data (e.g., the rotation data 316) corresponding to a rotation of a head-mounted playback device, and the second data 240 is generated further based on the rotation data. The head-tracking data may also include translation data (e.g., the translation data 318) corresponding to a change of location of the head-mounted playback device, in which case the early reflection signals 235 are further based on the translation data.

In some implementations, the method 2200 further includes generating one or more late reverberation signals based on an omni-directional component of the first sound field and a set of late reverberation parameters. In such implementations, the output signal is further based on the one or more late reverberation signals. For example, the one or more late reverberation signals 254 generated by the late reverberation component 250 of FIG. 3 are based on the omni-directional component 251 and the one or more late reverberation parameters 320. The set of late reverberation parameters may include, for example, a reverberation tail duration parameter, a reverberation tail scale parameter, a reverberation tail density parameter, a gain parameter, a frequency cutoff parameter, or any combination thereof, such as described with reference to FIG. 9.

In some implementations, the method 2200 includes generating one or more noise signals corresponding to a reverberation tail, convolving the omni-directional component with the one or more noise signals to generate one or more reverberation signals, and applying a delay to the one or more reverberation signals to generate the one or more late reverberation signals. For example, the left channel convolver 950 and the right channel convolver 952 convolve the omni-directional component 251 with the left channel noise signal 936 and the right channel noise signal 938, respectively, and delay is applied by the delay component 960. In such implementations, the one or more noise signals can be generated using a velvet noise-type generator, such as by the tail generator 910 using the velvet noise-type model 922.

In some implementations, the method 2200 includes generating the output signal based on the one or more late reverberation signals, one or more mixing parameters, and a rendering of the second sound field. For example, the output signal 262 of FIG. 3 is generated based on the one or more late reverberation signals 254, the one or more mixing parameters 310, and the rendering 244.

In some implementations, the method 2200 includes obtaining object-based audio data corresponding to at least one of the one or more audio sources. In such implementations, the output signal is generated further based on a rendering of the object-based audio data. For example, the output signal 262 of FIG. 3 can be generated based on a rendering of object-based audio data in the object/channel streams 302 that is performed by the renderer 330.

In some implementations, the method 2200 includes generating the first data based on scene-based audio data, based on object-based audio data, based on channel-based audio data, or based on a combination thereof. For example, the first data 228 may be generated based on the ambisonics stream 306, the object/channel streams 302, or a combination thereof.

The method 2200 of FIG. 22 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 2200 of FIG. 22 may be performed by a processor that executes instructions, such as described with reference to FIG. 24.

Figure 23A:
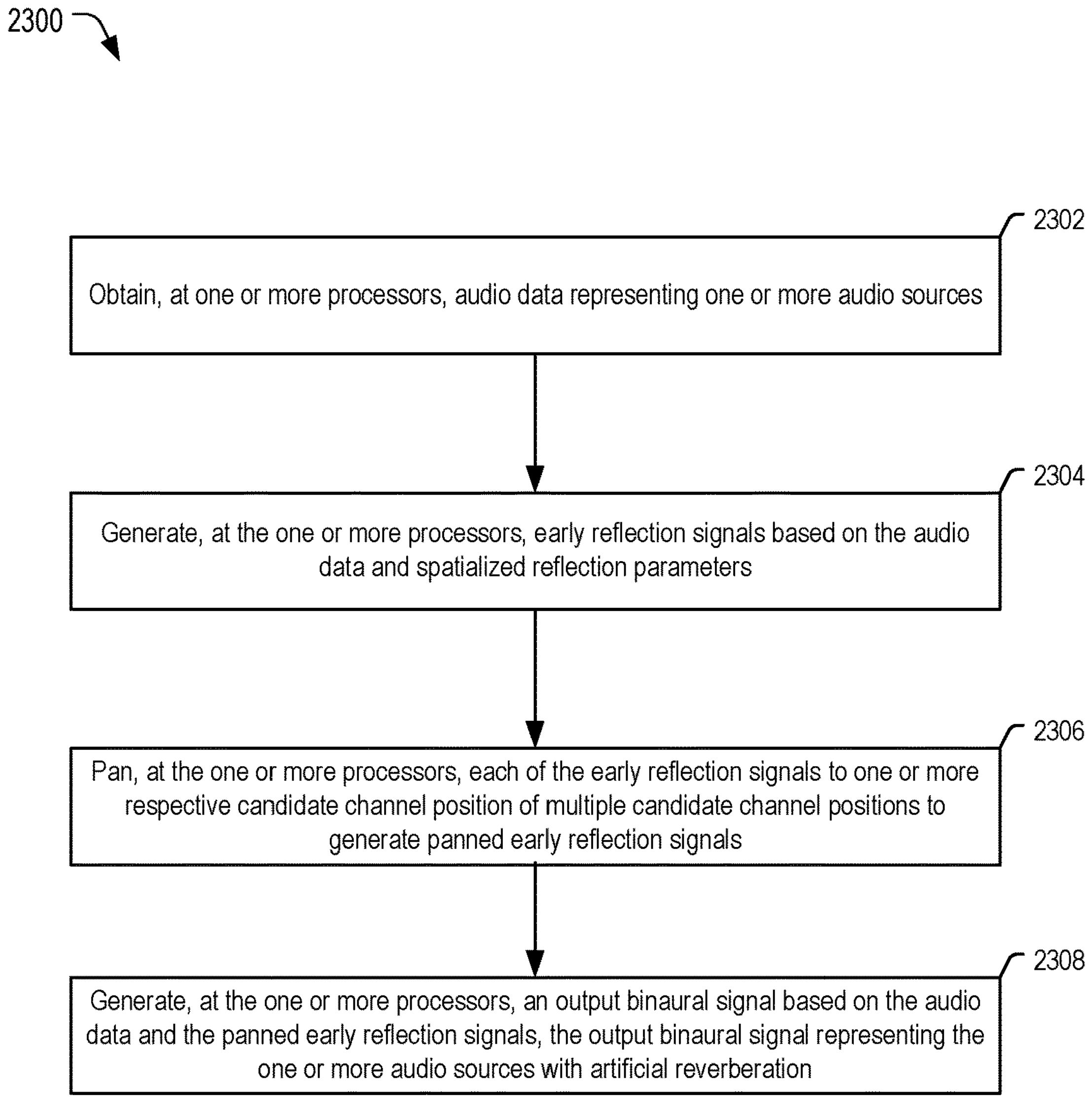
FIG. 23A is a diagram of a particular implementation of a method of generating artificial reverberation in spatial audio that may be performed by the device of FIG. 2, in accordance with some examples of the present disclosure.

FIG. 23A illustrates an example of a method 2300 of generating artificial reverberation in spatial audio. The method 2300 may be performed by an electronic device, such as the device 202 incorporating the components 1300 of FIG. 13, as an illustrative, non-limiting example.

In a particular aspect, the method 2300 includes, at block 2302, obtaining, at one or more processors, audio data representing one or more audio sources. For example, the early reflections component 230 of FIG. 13 can receive the object/channel streams 302 as the multi-channel audio data 233.

The method 2300 also includes, at block 2304, generating, at the one or more processors, early reflection signals based on the audio data and spatialized reflection parameters. For example, the early reflection stage 234 of FIG. 13 generates the early reflection signals 235 based on the multi-channel audio data 233 and the reflection parameters 246.

The method 2300 further includes, at block 2306, panning, at the one or more processors, each of the early reflection signals to one or more respective candidate channel position of multiple candidate channel positions to generate panned early reflection signals. According to an example, the multiple candidate channel positions correspond to an early reflection channel container. For example, the panning stage 1302 pans each of the early reflection signals 235 to one or more of the candidate channel positions 1312 of the early reflections container data 1310 to generate the panned early reflection signals 1335.

The method 2300 optionally also includes panning each of the one or more audio sources to one or more respective candidate channel positions of the multiple candidate channel positions to generate panned audio source signals, and wherein generating the output binaural signal is based on the panned audio source signals. For example, the panning stage 1304 pans each of the object/channel streams 302 to one or more of the candidate channel positions 1312 to generate the channels of audio data 1362.

The method 2300 includes, at block 2308, generating, at the one or more processors, an output binaural signal based on the audio data and the panned early reflection signals, the output binaural signal representing the one or more audio sources with artificial reverberation. For example, the method 2300 can include mixing the audio data with the panned early reflection signals. To illustrate, the output signal 262 of FIG. 13 is an output binaural signal that is generated based on the object/channel streams 302 (e.g., the channels of audio data 1362) and the panned early reflection signals 1335. The output binaural signal may be rendered using a single binauralizer of a multi-channel convolution renderer, such as the binauralizer 1320 of FIG. 13, and the method 2300 may also include initializing the binauralizer based on the multiple candidate channel positions.

Optionally, the method 2300 includes providing the output binaural signal for playout at earphone speakers. For example, the one or more processors 220 provide the output signal 262 to the speakers 270, 272 of FIG. 2, or to the second device 294 (e.g., an earphone device) via the modem 288.

Optionally, the method 2300 includes converting the audio data from a first channel layout to a second channel layout and obtaining the early reflection signals based on the audio data in the second channel layout, such as described in FIG. 12B and FIG. 12C. In some implementations, the multiple candidate channel positions correspond to a third channel layout. The third channel layout can match the first channel layout, such as described with reference to FIG. 12B, or may be distinct from the first channel layout, such as described with reference to FIG. 12C.

In some implementations, the second channel layout includes fewer channels than the first channel layout, and converting the audio data from a first channel layout to a second channel layout includes downmixing the audio data from the first channel layout to the second channel layout, such as described with reference to FIG. 12B. In such implementations, the third channel layout may match the first channel layout, such as described with reference to FIG. 12B, or may be distinct from the first channel layout, such as described with reference to FIG. 12C.

The method 2300 of FIG. 23A may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 2300 of FIG. 23A may be performed by a processor that executes instructions, such as described with reference to FIG. 24.

Figure 23B:
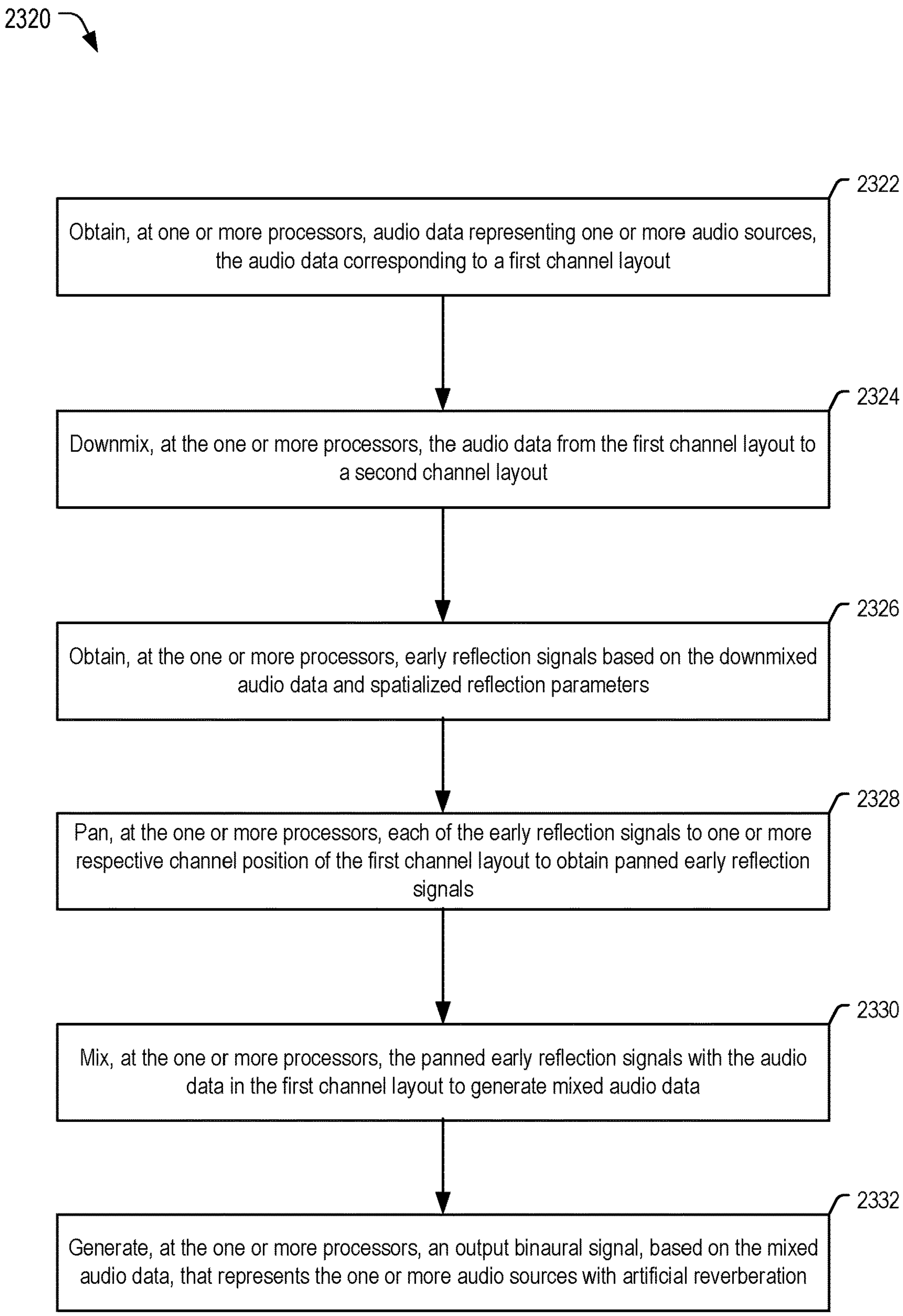
FIG. 23B is a diagram of a particular implementation of a method of generating artificial reverberation in spatial audio that may be performed by the device of FIG. 2, in accordance with some examples of the present disclosure.

FIG. 23B illustrates an example of a method 2320 of generating artificial reverberation in spatial audio. The method 2320 may be performed by an electronic device, such as the device 202 incorporating the components 1300 of FIG. 13, as an illustrative, non-limiting example.

In a particular aspect, the method 2320 includes, at block 2322, obtaining, at one or more processors, audio data that represents one or more audio sources, the audio data corresponding to a first channel layout. For example, audio data in a first channel layout is obtained at operation 1274 of FIG. 12B.

The method 2320 also includes, at block 2324, downmixing, at the one or more processors, the audio data from the first channel layout to a second channel layout. For example, the N1 channels 1275 of the first channel layout may be downmixed, at operation 1276 of FIG. 12B, to the N2 channels 1277 of the second channel layout when N1>N2.

The method 2320 includes, at block 2326, obtaining, at the one or more processors, early reflection signals based on the downmixed audio data and spatialized reflection parameters. For example, the N2 channels 1277 are processed at the early reflection calculation operation 1206 of FIG. 12B to generate the R early reflection signals 1278.

The method 2320 includes, at block 2328, panning, at the one or more processors, each of the early reflection signals to one or more respective channel positions of the first channel layout to obtain panned early reflection signals. For example, the R early reflection signals are panned to the N1 channels of the first channel layout at operation 1279 of FIG. 12B.

The method 2320 includes, at block 2330, mixing, at the one or more processors, the panned early reflection signals with the audio data in the first channel layout to generate mixed audio data. For example, the N1 channels 1280 are mixed with the N1 channels 1275 of the audio data at operation 1281 of FIG. 12B to generate the N1 channels of mixed content 1282.

The method 2320 includes, at block 2332, generating, at the one or more processors, an output binaural signal, based on the mixed audio data, that represents the one or more audio sources with artificial reverberation. For example, the output binaural signal 1284 of FIG. 12B is generated based on the N1 channels of mixed content 1282.

Downmixing from the first channel layout (e.g., 7.1.4) to the second channel layout (e.g., 5.1) for generation of the early reflections enables the early reflections to be computed with a lower complexity as compared to computing the early reflections based on the first channel layout, while panning the early reflections to the first channel layout provides improved spatial accuracy of the early reflections as compared to panning the early reflections to the second channel layout.

The method 2320 of FIG. 23B may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 2320 of FIG. 23B may be performed by a processor that executes instructions, such as described with reference to FIG. 24.

Figure 23C:
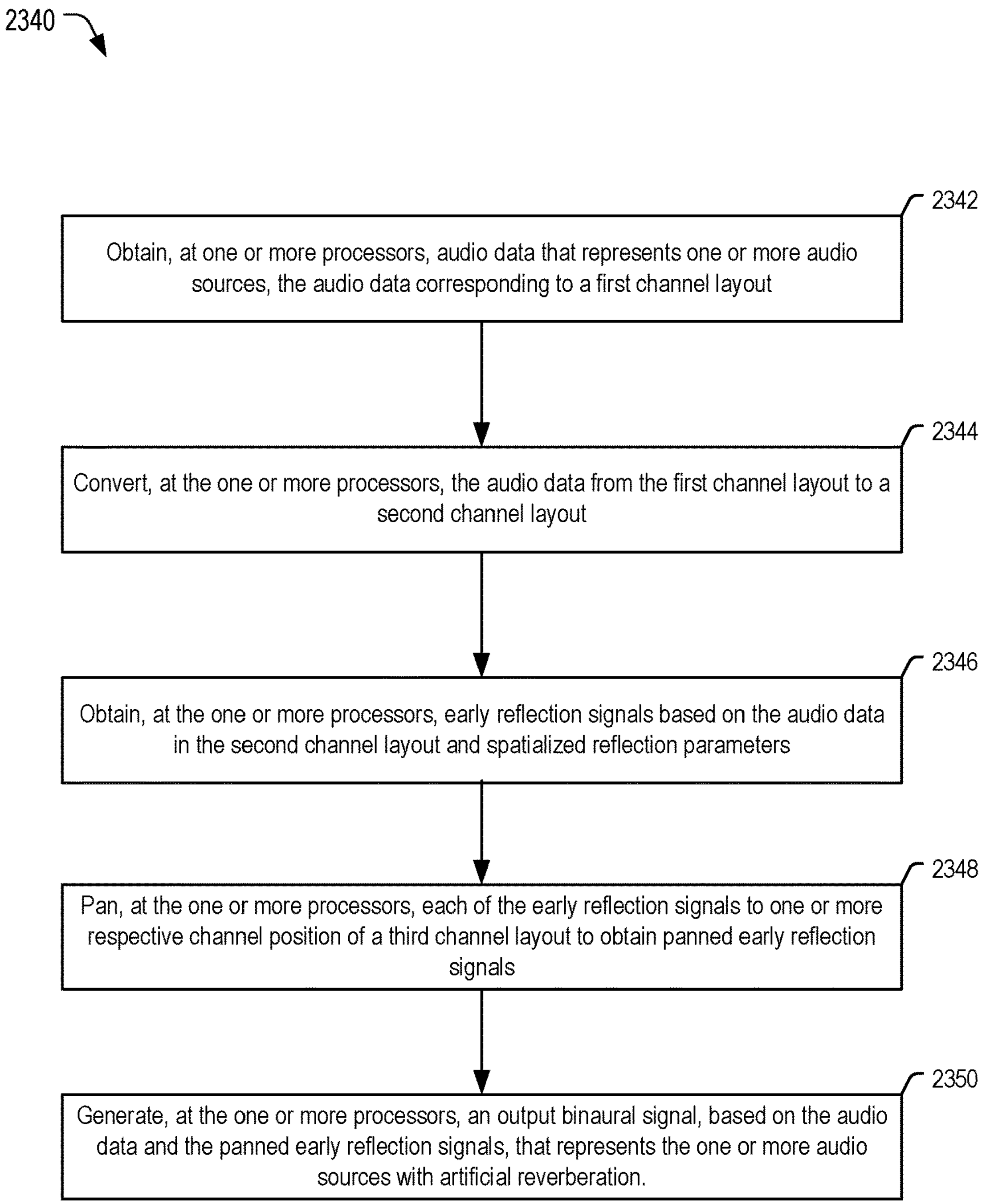
FIG. 23C is a diagram of a particular implementation of a method of generating artificial reverberation in spatial audio that may be performed by the device of FIG. 2, in accordance with some examples of the present disclosure.

FIG. 23C illustrates an example of a method 2340 of generating artificial reverberation in spatial audio. The method 2340 may be performed by an electronic device, such as the device 202 incorporating the components 1300 of FIG. 13, as an illustrative, non-limiting example.

In a particular aspect, the method 2340 includes, at block 2342, obtaining, at one or more processors, audio data that represents one or more audio sources, the audio data corresponding to a first channel layout. For example, audio data in a first channel layout is obtained at operation 1274 of FIG. 12C.

The method 2340 includes, at block 2344, converting, at the one or more processors, the audio data from the first channel layout to a second channel layout. For example, the N1 channels 1275 of the audio data in the first channel layout of FIG. 12C are converted, at operation 1276, to the N2 channels 1277 of audio data in the second channel layout.

The method 2340 includes, at block 2346, obtaining, at the one or more processors, early reflection signals based on the audio data in the second channel layout and spatialized reflection parameters. For example, the N2 channels 1277 of audio data in the second channel layout of FIG. 12C are processed at operation 1206 to generate the R early reflection signals 1278.

The method 2340 includes, at block 2348, panning, at the one or more processors, each of the early reflection signals to one or more respective channel positions of a third channel layout to obtain panned early reflection signals. For example, the R early reflection signals 1278 of FIG. 12C are panned to the third channel layout at operation 1288.

The method 2340 includes, at block 2350, generating, at the one or more processors, an output binaural signal, based on the audio data and the panned early reflection signals, that represents the one or more audio sources with artificial reverberation. For example, the N3 channels of panned early reflection signals 1289 of FIG. 12C are mixed to generate the N3 channels of mixed content 1291, at operation 1290, and the N3 channels of mixed content 1291 are binauralized, at operation 1292, to generate the output binaural signal 1293 that represents the one or more audio sources with artificial reverberation.

Converting the audio data to the second channel layout enables a complexity of the early reflections calculations to be adjusted (e.g., to reduce complexity by using a smaller number of channels), and panning the early reflection signals and mixing using the third channel layout enables adjustment of the spatial accuracy of the early reflection signals (e.g., to increase spatial accuracy by using a larger number of channels).

The method 2340 of FIG. 23C may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 2340 of FIG. 23C may be performed by a processor that executes instructions, such as described with reference to FIG. 24.

Figure 24:
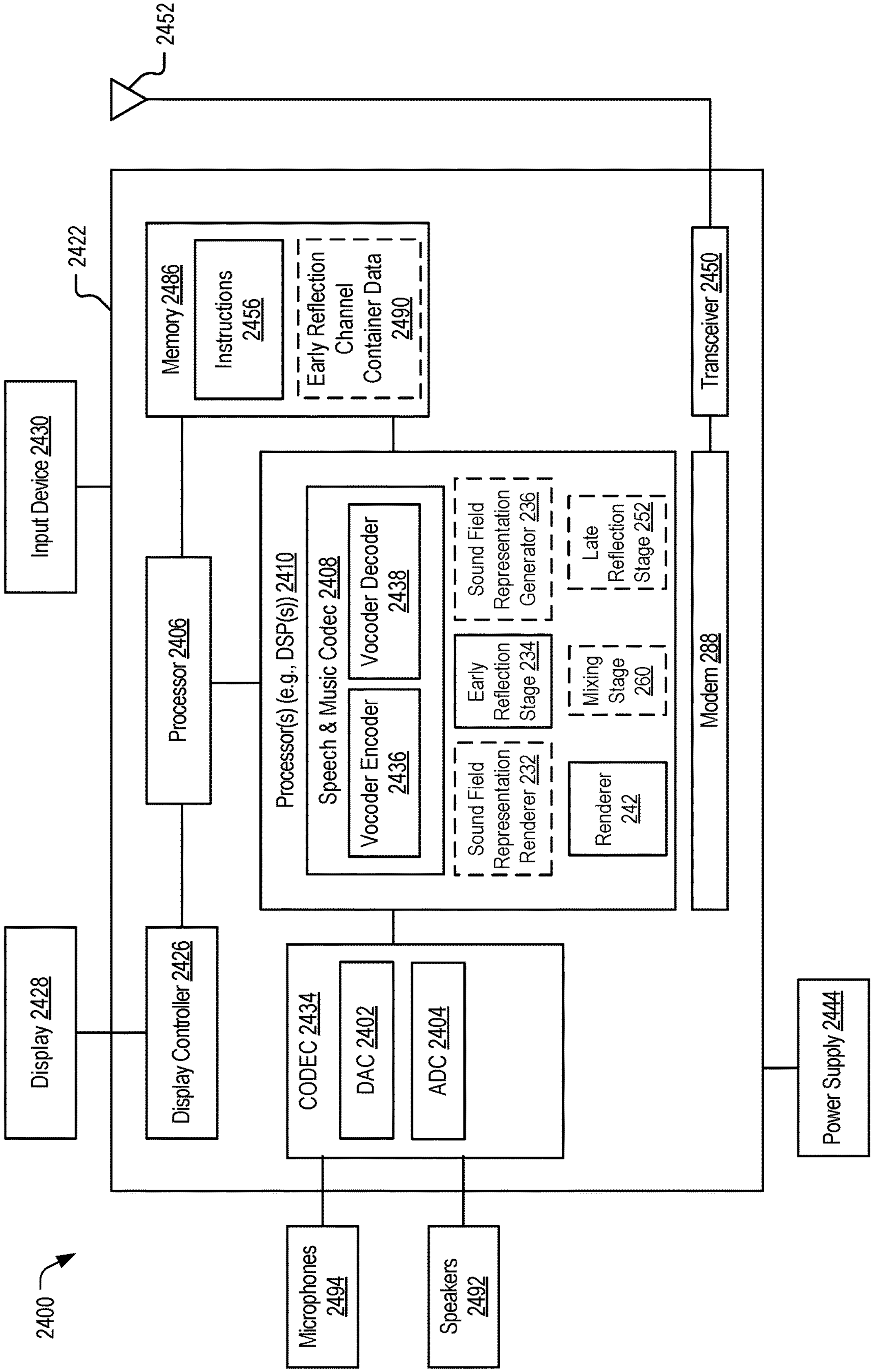
FIG. 24 is a block diagram of a particular illustrative example of a device that is operable to generate artificial reverberation in spatial audio, in accordance with some examples of the present disclosure.

Referring to FIG. 24, a block diagram of a particular illustrative implementation of a device is depicted and generally designated 2400. In various implementations, the device 2400 may have more or fewer components than illustrated in FIG. 24. In an illustrative implementation, the device 2400 may correspond to the device 202 of FIG. 2. In an illustrative implementation, the device 2400 may perform one or more operations described with reference to FIGS. 1-23C.

In a particular implementation, the device 2400 includes a processor 2406 (e.g., a CPU). The device 2400 may include one or more additional processors 2410 (e.g., one or more DSPs). In a particular aspect, the one or more processors 220 of FIG. 1 correspond to the processor 2406, the processors 2410, or a combination thereof. The processors 2410 may include a speech and music coder-decoder (CODEC) 2408 that includes a voice coder ("vocoder") encoder 2436, a vocoder decoder 2438, the sound field representation renderer 232, the early reflection stage 234, the sound field representation generator 236, the renderer 242, the mixing stage 260, the late reflection stage 252, or a combination thereof.

The device 2400 may include a memory 2486 and a CODEC 2434. The memory 2486 may include instructions 2456, that are executable by the one or more additional processors 2410 (or the processor 2406) to implement the functionality described with reference to the sound field representation renderer 232, the early reflection stage 234, the sound field representation generator 236, the renderer 242, the mixing stage 260, the late reflection stage 252, or a combination thereof. The memory 2486 may also include early reflection channel container data 2490, such as the early reflections container data 1310 and/or the candidate channel positions 1312. The device 2400 may include the modem 288 coupled, via a transceiver 2450, to an antenna 2452.

The device 2400 may include a display 2428 coupled to a display controller 2426. One or more speakers 2492 and one or more microphones 2494 may be coupled to the CODEC 2434. In a particular implementation, the speaker(s) 2492 correspond to the speakers 270, 272 and the microphone(s) 2494 correspond to the microphone(s) 290. The CODEC 2434 may include a digital-to-analog converter (DAC) 2402, an analog-to-digital converter (ADC) 2404, or both. In a particular implementation, the CODEC 2434 may receive analog signals from the microphone(s) 2404, convert the analog signals to digital signals using the analog-to-digital converter 2404, and provide the digital signals to the speech and music codec 2408. The speech and music codec 2408 may process the digital signals, and the digital signals may further be processed by the sound field representation renderer 232 and/or the early reflection stage 234. In a particular implementation, the speech and music codec 2408 may provide digital signals to the CODEC 2434. In an example, the digital signals may include the output signal 262. The CODEC 2434 may convert the digital signals to analog signals using the digital-to-analog converter 2402 and may provide the analog signals to the speaker(s) 2492.

In a particular implementation, the device 2400 may be included in a system-in-package or system-on-chip device 2422. In a particular implementation, the memory 2486, the processor 2406, the processors 2410, the display controller 2426, the CODEC 2434, and the modem 288 are included in the system-in-package or system-on-chip device 2422. In a particular implementation, an input device 2430 and a power supply 2444 are coupled to the system-in-package or the system-on-chip device 2422. Moreover, in a particular implementation, as illustrated in FIG. 24, the display 2428, the input device 2430, the speaker(s) 2492, the microphone (s) 2494, the antenna 2452, and the power supply 2444 are external to the system-in-package or the system-on-chip device 2422. In a particular implementation, each of the display 2428, the input device 2430, the speaker 2492, the microphone(s) 2494, and the power supply 2444 may be coupled to a component of the system-in-package or the system-on-chip device 2422, such as an interface or a controller.

The device 2400 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a computing device, a communication device, an internet-of-things (IoT) device, a virtual reality (VR) device, a base station, a mobile device, or any combination thereof.

In conjunction with the described techniques and implementations, an apparatus includes means for obtaining first data representing a first sound field of one or more audio sources. For example, the means for obtaining first data representing a first sound field can correspond to the sound field representation generator 224, the one or more processors 220, the device 202, the artificial reverberation engine 1410, the processor 2406, the processor(s) 2410, one or more other circuits or components configured to obtain first data representing a first sound field of one or more audio sources, or any combination thereof.

The apparatus also includes means for processing the first data to generate multi-channel audio data. For example, the means for processing the first data to generate the multi-channel audio data can correspond to the sound field representation renderer 232, the one or more processors 220, the device 202, the artificial reverberation engine 1410, the processor 2406, the processor(s) 2410, one or more other circuits or components configured to process first data to generate multi-channel audio data, or any combination thereof.

The apparatus also includes means for generating early reflection signals based on the multi-channel audio data and spatialized reflection parameters. For example, the means for generating the early reflection signals based on the multi-channel audio data and the spatialized reflection parameters can correspond to the early reflection stage 234, the reflection generation module 710, the delay lines architecture 720, the delay lines 820, the additional sub-band delay lines 840, one or more processors 220, the device 202, the artificial reverberation engine 1410, the processor 2406, the processor(s) 2410, one or more other circuits or components configured to generate early reflection signals based on multi-channel audio data and spatialized reflection parameters, or any combination thereof.

The apparatus also includes means for generating second data representing a second sound field of spatialized audio that includes at least the early reflection signals. For example, the means for generating the second data representing the second sound field can correspond to the sound field representation generator 236, the ambisonics generator 358, the mixer 360, the rotator 362, the one or more processors 220, the device 202, the artificial reverberation engine 1410, the processor 2406, the processor(s) 2410, one or more other circuits or components configured to generate the second data representing the second sound field, or any combination thereof.

The apparatus also includes means for generating an output signal based on the second data, where the output signal represents the one or more audio sources with artificial reverberation. For example, the means for generating the output signal based on the second data can correspond to the renderer 242, the mixing stage 260, the renderer 330, the rotator 430, the one or more processors 220, the device 202, the artificial reverberation engine 1410, the processor 2406, the processor(s) 2410, one or more other circuits or components configured to generate an output signal based on the second data, or any combination thereof.

In conjunction with the described techniques and implementations, a second apparatus includes means for obtaining audio data that represents one or more audio sources. For example, the means for means for obtaining audio data that represents one or more audio sources can correspond to the early reflection stage 234 of FIG. 13, the one or more processors 220, the device 202, the artificial reverberation engine 1410, the processor 2406, the processor(s) 2410, one or more other circuits or components configured to obtain audio data that represents one or more audio sources, or any combination thereof.

The second apparatus also includes means for generating early reflection signals based on the audio data and spatialized reflection parameters. For example, the means for generating early reflection signals based on the audio data and spatialized reflection parameters can correspond to the early reflection stage 234 of FIG. 13, the reflection generation module 710, the delay lines architecture 720, the delay lines 820, the additional sub-band delay lines 840, one or more processors 220, the device 202, the artificial reverberation engine 1410, the processor 2406, the processor(s) 2410, one or more other circuits or components configured to generate early reflection signals based on the audio data and spatialized reflection parameters, or any combination thereof.

The second apparatus also includes means for panning each of the early reflection signals to one or more respective candidate channel position of multiple candidate channel positions to generate panned early reflection signals. For example, the means for panning each of the early reflection signals to one or more respective candidate channel position of multiple candidate channel positions to generate panned early reflection signals can correspond to the panning stage 1302, the one or more processors 220, the device 202, the artificial reverberation engine 1410, the processor 2406, the processor(s) 2410, one or more other circuits or components configured to pan each of the early reflection signals to one or more respective candidate channel position of multiple candidate channel positions to generate panned early reflection signals, or any combination thereof.

The second apparatus also includes means for generating an output binaural signal, based on the audio data and the panned early reflection signals, that represents the one or more audio sources with artificial reverberation. For example, the means for generating the output binaural signal can correspond to the renderer 242 of FIG. 13, the binauralizer 1320, the mixing stage 260 of FIG. 13, the one or more processors 220, the device 202, the artificial reverberation engine 1410, the processor 2406, the processor(s) 2410, one or more other circuits or components configured to generating an output binaural signal, based on the audio data and the panned early reflection signals, that represents the one or more audio sources with artificial reverberation, or any combination thereof.

In some implementations, a non-transitory computer-readable medium (e.g., a computer-readable storage device, such as the memory 210 or the memory 2486) includes instructions (e.g., the instructions 212 or the instructions 2456) that, when executed by one or more processors (e.g., the one or more processors 220, the processor 2406, or the one or more processors 2410), cause the one or more processors to perform operations corresponding to at least a portion of any of the techniques or methods described with reference to FIGS. 1-23C or any combination thereof.

Particular aspects of the disclosure are described below in sets of interrelated examples:

According to Example 1, a device includes one or more processors configured to obtain first data representing a first sound field of one or more audio sources; process the first data to generate multi-channel audio data; generate early reflection signals based on the multi-channel audio data and spatialized reflection parameters; generate second data representing a second sound field of spatialized audio that includes at least the early reflection signals; and generate an output signal based on the second data, the output signal representing the one or more audio sources with artificial reverberation.

Example 2 includes the device of Example 1, wherein the one or more processors are configured to provide the output signal for playout at earphone speakers.

Example 3 includes the device of Example 1 or Example 2, wherein the spatialized reflection parameters include room dimension parameters.

Example 4 includes the device of any of Examples 1 to 3, wherein the spatialized reflection parameters include surface material parameters.

Example 5 includes the device of any of Examples 1 to 4, wherein the spatialized reflection parameters include source position parameters.

Example 6 includes the device of any of Examples 1 to 5, wherein the spatialized reflection parameters include listener position parameters.

Example 7 includes the device of any of Examples 1 to 6, wherein the one or more processors are configured to generate a set of reflection data including reflection direction of arrival data, time of arrival delay data, and gain data for multiple reflections, wherein the set of reflection data is based at least partially on the spatialized reflection parameters, and wherein the early reflection signals are based on the set of reflection data.

Example 8 includes the device of Example 7, wherein the one or more processors are configured to generate the set of reflection data based on a shoebox-type reflection generation model.

Example 9 includes the device of Example 7 or Example 8, wherein the one or more processors are configured to generate the early reflection signals via application of time of arrival delays and gains, of the set of reflection data, to respective channels of the multi-channel audio data.

Example 10 includes the device of any of Examples 7 to 9, wherein the second data is based on encoding the early reflection signals in conjunction with the reflection direction of arrival data.

Example 11 includes the device of any of Examples 7 to 10, wherein the one or more processors are configured to obtain head-tracking data that includes rotation data corresponding to a rotation of a head-mounted playback device, and wherein the second data is generated further based on the rotation data.

Example 12 includes the device of Example 11, wherein the head-tracking data further includes translation data corresponding to a change of location of the head-mounted playback device, and wherein the early reflection signals are further based on the translation data.

Example 13 includes the device of any of Examples 1 to 12, wherein the one or more processors are configured to generate one or more late reverberation signals based on an omni-directional component of the first sound field and a set of late reverberation parameters, and wherein the output signal is further based on the one or more late reverberation signals.

Example 14 includes the device of Example 13, wherein the set of late reverberation parameters includes a reverberation tail duration parameter.

Example 15 includes the device of Example 13 or Example 14, wherein the set of late reverberation parameters includes a reverberation tail scale parameter.

Example 16 includes the device of any of Examples 13 to 15, wherein the set of late reverberation parameters includes a reverberation tail density parameter.

Example 17 includes the device of any of Examples 13 to 16, wherein the set of late reverberation parameters includes a gain parameter.

Example 18 includes the device of any of Examples 13 to 17, wherein the set of late reverberation parameters includes a frequency cutoff parameter.

Example 19 includes the device of any of Examples 13 to 18, wherein the one or more processors are configured to generate one or more noise signals corresponding to a reverberation tail; convolve the omni-directional component with the one or more noise signals to generate one or more reverberation signals; and apply a delay to the one or more reverberation signals to generate the one or more late reverberation signals.

Example 20 includes the device of Example 19, wherein the one or more noise signals are generated using a velvet noise-type generator.

Example 21 includes the device of any of Examples 13 to 20, wherein the one or more processors are configured to generate the output signal based on the one or more late reverberation signals, one or more mixing parameters, and a rendering of the second sound field.

Example 22 includes the device of any of Examples 1 to 21, wherein the one or more processors are configured to obtain object-based audio data corresponding to at least one of the one or more audio sources, and wherein the output signal is generated further based on a rendering of the object-based audio data.

Example 23 includes the device of any of Examples 1 to 22, wherein the first data and the second data correspond to ambisonics data.

Example 24 includes the device of any of Examples 1 to 23, wherein the one or more processors are configured to generate the first data based on scene-based audio data.

Example 25 includes the device of any of Examples 1 to 24, wherein the one or more processors are configured to generate the first data based on object-based audio data.

Example 26 includes the device of any of Examples 1 to 25, wherein the one or more processors are configured to generate the first data based on channel-based audio data.

Example 27 includes the device of any of Examples 1 to 26 and further includes one or more microphones coupled to the one or more processors and configured to provide microphone data representing sound of at least one of the one or more audio sources, and wherein the first data is at least partially based on the microphone data.

Example 28 includes the device of any of Examples 1 to 27 and further includes one or more speakers coupled to the one or more processors and configured to play out the output signal.

Example 29 includes the device of any of Examples 1 to 28 and further includes a modem coupled to the one or more processors, the modem configured to transmit the output signal to an earphone device.

Example 30 includes the device of any of Examples 1 to 29, wherein the one or more processors are integrated in a headset device, and wherein the second sound field, the early reflection signals, or both, are based on movement of the headset device.

Example 31 includes the device of Example 30, wherein the headset device corresponds to at least one of a virtual reality headset, a mixed reality headset, or an augmented reality headset.

Example 32 includes the device of any of Examples 1 to 29, wherein the one or more processors are integrated in a mobile phone.

Example 33 includes the device of any of Examples 1 to 29, wherein the one or more processors are integrated in a tablet computer device.

Example 34 includes the device of any of Examples 1 to 29, wherein the one or more processors are integrated in a wearable electronic device.

Example 35 includes the device of any of Examples 1 to 29, wherein the one or more processors are integrated in a camera device.

Example 36 includes the device of any of Examples 1 to 29, wherein the one or more processors are integrated in a vehicle.

According to Example 37, a method includes obtaining, at one or more processors, first data representing a first sound field of one or more audio sources; processing, at the one or more processors, the first data to generate multi-channel audio data; generating, at the one or more processors, early reflection signals based on the multi-channel audio data and spatialized reflection parameters; generating, at the one or more processors, second data representing a second sound field of spatialized audio that includes at least the early reflection signals; and generating, at the one or more processors, an output signal based on the second data, the output signal representing the one or more audio sources with artificial reverberation.

Example 38 includes the method of Example 37 and further includes providing the output signal for playout at earphone speakers.

Example 39 includes the method of Example 37 or Example 38, wherein the spatialized reflection parameters include room dimension parameters.

Example 40 includes the method of any of Examples 37 to 39, wherein the spatialized reflection parameters include surface material parameters.

Example 41 includes the method of any of Examples 37 to 40, wherein the spatialized reflection parameters include source position parameters.

Example 42 includes the method of any of Examples 37 to 41, wherein the spatialized reflection parameters include listener position parameters.

Example 43 includes the method of any of Examples 37 to 42 and further includes generating a set of reflection data including reflection direction of arrival data, time of arrival delay data, and gain data for multiple reflections, wherein the set of reflection data is based at least partially on the spatialized reflection parameters, and wherein the early reflection signals are based on the set of reflection data.

Example 44 includes the method of Example 43 and further includes generating the set of reflection data based on a shoebox-type reflection generation model.

Example 45 includes the method of Example 43 or Example 44 and further includes generating the early reflection signals via application of time of arrival delays and gains, of the set of reflection data, to respective channels of the multi-channel audio data.

Example 46 includes the method of any of Examples 43 to 45, wherein the second data is based on encoding the early reflection signals in conjunction with the reflection direction of arrival data.

Example 47 includes the method of any of Examples 43 to 46 and further includes obtaining head-tracking data that includes rotation data corresponding to a rotation of a head-mounted playback device, and wherein the second data is generated further based on the rotation data.

Example 48 includes the method of Example 47, wherein the head-tracking data further includes translation data corresponding to a change of location of the head-mounted playback device, and wherein the early reflection signals are further based on the translation data.

Example 49 includes the method of any of Examples 37 to 48 and further includes generating one or more late reverberation signals based on an omni-directional component of the first sound field and a set of late reverberation parameters, and wherein the output signal is further based on the one or more late reverberation signals.

Example 50 includes the method of Example 49, wherein the set of late reverberation parameters includes a reverberation tail duration parameter.

Example 51 includes the method of Example 49 or Example 50, wherein the set of late reverberation parameters includes a reverberation tail scale parameter.

Example 52 includes the method of any of Examples 49 to 51, wherein the set of late reverberation parameters includes a reverberation tail density parameter.

Example 53 includes the method of any of Examples 49 to 52, wherein the set of late reverberation parameters includes a gain parameter.

Example 54 includes the method of any of Examples 49 to 53, wherein the set of late reverberation parameters includes a frequency cutoff parameter.

Example 55 includes the method of any of Examples 49 to 54 and further includes generating one or more noise signals corresponding to a reverberation tail; convolving the omni-directional component with the one or more noise signals to generate one or more reverberation signals; and applying a delay to the one or more reverberation signals to generate the one or more late reverberation signals.

Example 56 includes the method of Example 55, wherein the one or more noise signals are generated using a velvet noise-type generator.

Example 57 includes the method of any of Examples 49 to 56 and further includes generating the output signal based on the one or more late reverberation signals, one or more mixing parameters, and a rendering of the second sound field.

Example 58 includes the method of any of Examples 37 to 57 and further includes obtaining object-based audio data corresponding to at least one of the one or more audio sources, and wherein the output signal is generated further based on a rendering of the object-based audio data.

Example 59 includes the method of any of Examples 37 to 58, wherein the first data and the second data correspond to ambisonics data.

Example 60 includes the method of any of Examples 37 to 59 and further includes generating the first data based on scene-based audio data.

Example 61 includes the method of any of Examples 37 to 60 and further includes generating the first data based on object-based audio data.

Example 62 includes the method of any of Examples 37 to 61 and further includes generating the first data based on channel-based audio data.

According to Example 63, a device includes: a memory configured to store instructions; and a processor configured to execute the instructions to perform the method of any of Examples 37 to 62.

According to Example 64, a non-transitory computer-readable medium stores instructions that, when executed by a processor, cause the processor to perform the method of any of Examples 37 to 62.

According to Example 65, an apparatus includes means for carrying out the method of any of Examples 37 to 62.

According to Example 66, a non-transitory computer-readable medium includes instructions that, when executed by one or more processors, cause the one or more processors to obtain first data representing a first sound field of one or more audio sources; process the first data to generate multi-channel audio data; generate early reflection signals based on the multi-channel audio data and spatialized reflection parameters; generate second data representing a second sound field of spatialized audio that includes at least the early reflection signals; and generate an output signal based on the second data, the output signal representing the one or more audio sources with artificial reverberation.

Example 67 includes the non-transitory computer-readable medium of Example 66, wherein the instructions further cause the one or more processors to provide the output signal for playout at earphone speakers.

Example 68 includes the non-transitory computer-readable medium of Example 66 or Example 67, wherein the spatialized reflection parameters include room dimension parameters.

Example 69 includes the non-transitory computer-readable medium of any of Examples 66 to 68, wherein the spatialized reflection parameters include surface material parameters.

Example 70 includes the non-transitory computer-readable medium of any of Examples 66 to 69, wherein the spatialized reflection parameters include source position parameters.

Example 71 includes the non-transitory computer-readable medium of any of Examples 66 to 70, wherein the spatialized reflection parameters include listener position parameters.

Example 72 includes the non-transitory computer-readable medium of any of Examples 66 to 71, wherein the instructions further cause the one or more processors to generate a set of reflection data including reflection direction of arrival data, time of arrival delay data, and gain data for multiple reflections, wherein the set of reflection data is based at least partially on the spatialized reflection parameters, and wherein the early reflection signals are based on the set of reflection data.

Example 73 includes the non-transitory computer-readable medium of Example 72, wherein the instructions further cause the one or more processors to generate the set of reflection data based on a shoebox-type reflection generation model.

Example 74 includes the non-transitory computer-readable medium of Example 72 or Example 73, wherein the instructions further cause the one or more processors to generate the early reflection signals via application of time of arrival delays and gains, of the set of reflection data, to respective channels of the multi-channel audio data.

Example 75 includes the non-transitory computer-readable medium of any of Examples 72 to 74, wherein the second data is based on encoding the early reflection signals in conjunction with the reflection direction of arrival data.

Example 76 includes the non-transitory computer-readable medium of any of Examples 72 to 75, wherein the instructions further cause the one or more processors to obtain head-tracking data that includes rotation data corresponding to a rotation of a head-mounted playback device, and wherein the second data is generated further based on the rotation data.

Example 77 includes the non-transitory computer-readable medium of Example 76, wherein the head-tracking data further includes translation data corresponding to a change of location of the head-mounted playback device, and wherein the early reflection signals are further based on the translation data.

Example 78 includes the non-transitory computer-readable medium of any of Examples 66 to 77, wherein the instructions further cause the one or more processors to generate one or more late reverberation signals based on an omni-directional component of the first sound field and a set of late reverberation parameters, and wherein the output signal is further based on the one or more late reverberation signals.

Example 79 includes the non-transitory computer-readable medium of Example 78, wherein the set of late reverberation parameters includes a reverberation tail duration parameter.

Example 80 includes the non-transitory computer-readable medium of Example 78 or Example 79, wherein the set of late reverberation parameters includes a reverberation tail scale parameter.

Example 81 includes the non-transitory computer-readable medium of any of Examples 78 to 80, wherein the set of late reverberation parameters includes a reverberation tail density parameter.

Example 82 includes the non-transitory computer-readable medium of any of Examples 78 to 81, wherein the set of late reverberation parameters includes a gain parameter.

Example 83 includes the non-transitory computer-readable medium of any of Examples 78 to 82, wherein the set of late reverberation parameters includes a frequency cutoff parameter.

Example 84 includes the non-transitory computer-readable medium of any of Examples 78 to 83, wherein the instructions further cause the one or more processors to generate one or more noise signals corresponding to a reverberation tail; convolve the omni-directional component with the one or more noise signals to generate one or more reverberation signals; and apply a delay to the one or more reverberation signals to generate the one or more late reverberation signals.

Example 85 includes the non-transitory computer-readable medium of Example 84, wherein the one or more noise signals are generated using a velvet noise-type generator.

Example 86 includes the non-transitory computer-readable medium of any of Examples 78 to 85, wherein the instructions further cause the one or more processors to generate the output signal based on the one or more late reverberation signals, one or more mixing parameters, and a rendering of the second sound field.

Example 87 includes the non-transitory computer-readable medium of any of Examples 66 to 86, wherein the instructions further cause the one or more processors to obtain object-based audio data corresponding to at least one of the one or more audio sources, and wherein the output signal is generated further based on a rendering of the object-based audio data.

Example 88 includes the non-transitory computer-readable medium of any of Examples 66 to 87, wherein the first data and the second data correspond to ambisonics data.

Example 89 includes the non-transitory computer-readable medium of any of Examples 66 to 88, wherein the instructions further cause the one or more processors to generate the first data based on scene-based audio data.

Example 90 includes the non-transitory computer-readable medium of any of Examples 66 to 89, wherein the instructions further cause the one or more processors to generate the first data based on object-based audio data.

Example 91 includes the non-transitory computer-readable medium of any of Examples 66 to 90, wherein the instructions further cause the one or more processors to generate the first data based on channel-based audio data.

According to Example 92, an apparatus includes means for obtaining first data representing a first sound field of one or more audio sources; means for processing the first data to generate multi-channel audio data; means for generating early reflection signals based on the multi-channel audio data and spatialized reflection parameters; means for generating second data representing a second sound field of spatialized audio that includes at least the early reflection signals; and means for generating an output signal based on the second data, the output signal representing the one or more audio sources with artificial reverberation.

Example 93 includes the apparatus of Example 92 and further includes means for providing the output signal for playout at earphone speakers.

Example 94 includes the apparatus of Example 92 or Example 93, wherein the spatialized reflection parameters include room dimension parameters.

Example 95 includes the apparatus of any of Examples 92 to 94, wherein the spatialized reflection parameters include surface material parameters.

Example 96 includes the apparatus of any of Examples 92 to 95, wherein the spatialized reflection parameters include source position parameters.

Example 97 includes the apparatus of any of Examples 92 to 96, wherein the spatialized reflection parameters include listener position parameters.

Example 98 includes the apparatus of any of Examples 92 to 97 and further includes means for generating a set of reflection data including reflection direction of arrival data, time of arrival delay data, and gain data for multiple reflections, wherein the set of reflection data is based at least partially on the spatialized reflection parameters, and wherein the early reflection signals are based on the set of reflection data.

Example 99 includes the apparatus of Example 98 and further includes means for generating the set of reflection data based on a shoebox-type reflection generation model.

Example 100 includes the apparatus of Example 98 or Example 99 and further includes means for generating the early reflection signals via application of time of arrival delays and gains, of the set of reflection data, to respective channels of the multi-channel audio data.

Example 101 includes the apparatus of any of Examples 98 to 100, wherein the second data is based on encoding the early reflection signals in conjunction with the reflection direction of arrival data.

Example 102 includes the apparatus of any of Examples 98 to 101 and further includes means for obtaining head-tracking data that includes rotation data corresponding to a rotation of a head-mounted playback device, and wherein the second data is generated further based on the rotation data.

Example 103 includes the apparatus of Example 102, wherein the head-tracking data further includes translation data corresponding to a change of location of the head-mounted playback device, and wherein the early reflection signals are further based on the translation data.

Example 104 includes the apparatus of any of Examples 92 to 103 and further includes means for generating one or more late reverberation signals based on an omni-directional component of the first sound field and a set of late reverberation parameters, and wherein the output signal is further based on the one or more late reverberation signals.

Example 105 includes the apparatus of Example 104, wherein the set of late reverberation parameters includes a reverberation tail duration parameter.

Example 106 includes the apparatus of Example 104 or Example 105, wherein the set of late reverberation parameters includes a reverberation tail scale parameter.

Example 107 includes the apparatus of any of Examples 104 to 106, wherein the set of late reverberation parameters includes a reverberation tail density parameter.

Example 108 includes the apparatus of any of Examples 104 to 107, wherein the set of late reverberation parameters includes a gain parameter.

Example 109 includes the apparatus of any of Examples 104 to 108, wherein the set of late reverberation parameters includes a frequency cutoff parameter.

Example 110 includes the apparatus of any of Examples 104 to 109 and further includes means for generating one or more noise signals corresponding to a reverberation tail; means for convolving the omni-directional component with the one or more noise signals to generate one or more reverberation signals; and means for applying a delay to the one or more reverberation signals to generate the one or more late reverberation signals.

Example 111 includes the apparatus of Example 110, wherein the one or more noise signals are generated using a velvet noise-type generator.

Example 112 includes the apparatus of any of Examples 104 to 111 and further includes means for generating the output signal based on the one or more late reverberation signals, one or more mixing parameters, and a rendering of the second sound field.

Example 113 includes the apparatus of any of Examples 92 to 112 and further includes means for obtaining object-based audio data corresponding to at least one of the one or more audio sources, and wherein the output signal is generated further based on a rendering of the object-based audio data.

Example 114 includes the apparatus of any of Examples 92 to 113, wherein the first data and the second data correspond to ambisonics data.

Example 115 includes the apparatus of any of Examples 92 to 114 and further includes means for generating the first data based on scene-based audio data.

Example 116 includes the apparatus of any of Examples 92 to 115 and further includes means for generating the first data based on object-based audio data.

Example 117 includes the apparatus of any of Examples 92 to 116 and further includes means for generating the first data based on channel-based audio data.

Example 118 includes the device of any of Examples 1 to 36, wherein the multi-channel audio data corresponds to multiple virtual sources.

Example 119 includes the device of any of Examples 1 to 36 or Example 118, wherein the output signal corresponds to an output binaural signal.

Example 120 includes the method of any of Examples 37 to 62, wherein the multi-channel audio data corresponds to multiple virtual sources.

Example 121 includes the method of any of Examples 37 to 62 or Example 120, wherein the output signal corresponds to an output binaural signal.

Example 122 includes the non-transitory computer-readable medium of any of Examples 66 to 91, wherein the multi-channel audio data corresponds to multiple virtual sources.

Example 123 includes the non-transitory computer-readable medium of any of Examples 66 to 91 or Example 122, wherein the output signal corresponds to an output binaural signal.

Example 124 includes the apparatus of any of Examples 92-117, wherein the multi-channel audio data corresponds to multiple virtual sources.

Example 125 includes the apparatus of any of Examples 92-117 or Example 124, wherein the output signal corresponds to an output binaural signal.

According to Example 126, a device includes a memory configured to store data corresponding to multiple candidate channel positions; and one or more processors coupled to the memory and configured to obtain audio data that represents one or more audio sources; generate early reflection signals based on the audio data and spatialized reflection parameters; pan each of the early reflection signals to one or more respective candidate channel position of the multiple candidate channel positions to generate panned early reflection signals; and generate an output binaural signal, based on the audio data and the panned early reflection signals, that represents the one or more audio sources with artificial reverberation.

Example 127 includes the device of Example 126, wherein the one or more processors are configured to: convert the audio data from a first channel layout to a second channel layout; and obtain the early reflection signals based on the audio data in the second channel layout.

Example 128 includes the device of Example 126, or 127, wherein the multiple candidate channel positions correspond to a third channel layout.

Example 129 includes the device of Example 128, wherein the third channel layout matches the first channel layout.

Example 130 includes the device of Example 128, wherein the second channel layout includes fewer channels than the first channel layout, and wherein the one or more processors are configured to downmix the audio data to convert the audio data from the first channel layout to the second channel layout.

Example 131 includes the device of Example 130, wherein the third channel layout matches the first channel layout.

Example 132 includes the device of any of Examples 126 to 131, wherein the output binaural signal is rendered using a single binauralizer of a multi-channel convolution renderer.

Example 133 includes the device of any of Examples 126 to 132, wherein the one or more processors are configured to initialize the binauralizer based on the multiple candidate channel positions.

Example 134 includes the device of any of Examples 126 to 133, wherein the data corresponding to the multiple candidate channel positions includes an early reflection channel container.

Example 135 includes the device of any of Examples 126 to 134, wherein the one or more processors are configured to select, based on metadata, the early reflection channel container from among multiple early reflection channel containers that are associated with different numbers of candidate channel positions.

Example 136 includes the device of any of Examples 126 to 135, wherein the one or more processors are configured to pan each of the one or more audio sources to one or more respective candidate channel positions of the multiple candidate channel positions to generate panned audio source signals, and wherein the output binaural signal is based on the panned audio source signals.

Example 137 includes the device of any of Examples 126 to 136, wherein the one or more processors are configured to mix the audio data with the panned early reflection signals.

Example 138 includes the device of any of Examples 126 to 137, wherein the one or more processors are configured to provide the output binaural signal for playout at earphone speakers.

Example 139 includes the device of any of Examples 126 to 138, wherein the spatialized reflection parameters include one or more of: room dimension parameters, surface material parameters, source position parameters, or listener position parameters.

Example 140 includes the device of any of Examples 126 to 139, wherein the one or more processors are configured to generate a set of reflection data including reflection direction of arrival data, time of arrival delay data, and gain data for multiple reflections, wherein the set of reflection data is based at least partially on the spatialized reflection parameters, and wherein the early reflection signals are based on the set of reflection data.

Example 141 includes the device of any of Examples 126 to 140, wherein the one or more processors are configured to generate the set of reflection data based on a shoebox-type reflection generation model.

Example 142 includes the device of any of Examples 126 to 141, wherein the one or more processors are configured to generate the early reflection signals via application of time of arrival delays and gains, of the set of reflection data, to respective channels of the audio data.

Example 143 includes the device of any of Examples 126 to 142, wherein the one or more processors are configured to obtain head-tracking data that includes rotation data corresponding to a rotation of a head-mounted playback device, and wherein the output binaural signal is generated further based on the rotation data.

Example 144 includes the device of Example 143, wherein the head-tracking data further includes translation data corresponding to a change of location of the head-mounted playback device, and wherein the early reflection signals are further based on the translation data.

Example 145 includes the device of any of Examples 126 to 144, wherein the one or more processors are configured to generate one or more late reverberation signals based on the audio data and a set of late reverberation parameters, and wherein the output binaural signal is further based on the one or more late reverberation signals.

Example 146 includes the device of any of Examples 126 to 145, wherein the audio data includes to object-based audio data corresponding to at least one of the one or more audio sources.

Example 147 includes the device of any of Examples 126 to 146, wherein the audio data includes to multi-channel audio data corresponding to at least one of the one or more audio sources.

Example 148 includes the device of any of Examples 126 to 147, wherein the audio data includes object-based audio data, channel-based audio data, or a combination thereof.

Example 149 includes the device of any of Examples 126 to 148, wherein the audio data corresponds to multiple virtual sources.

Example 150 includes the device of any of Examples 126 to 149 and further includes one or more microphones coupled to the one or more processors and configured to provide microphone data representing sound of at least one of the one or more audio sources, and wherein the audio data is at least partially based on the microphone data.

Example 151 includes the device of any of Examples 126 to 150 and further includes one or more speakers coupled to the one or more processors and configured to play out the output binaural signal.

Example 152 includes the device of any of Examples 126 to 151 and further includes a modem coupled to the one or more processors, the modem configured to transmit the output binaural signal to an earphone device.

Example 153 includes the device of any of Examples 126 to 152, wherein the one or more processors are integrated in a headset device, and wherein the output binaural signal, the panned early reflection signals, or both, are based on movement of the headset device.

Example 154 includes the device of Example 153, wherein the headset device corresponds to at least one of a virtual reality headset, a mixed reality headset, or an augmented reality headset.

Example 155 includes the device of any of Examples 126 to 153, wherein the one or more processors are integrated in at least one of a mobile phone, a tablet computer device, a wearable electronic device, or a camera device.

Example 156 includes the device of any of Examples 126 to 152, wherein the one or more processors are integrated in a vehicle.

According to Example 157, a device includes a memory configured to store data corresponding to multiple channel layouts; and one or more processors coupled to the memory and configured to: obtain audio data that represents one or more audio sources, the audio data corresponding to a first channel layout of the multiple channel layouts; convert the audio data from the first channel layout to a second channel layout of the multiple channel layouts; obtain early reflection signals based on the audio data in the second channel layout and spatialized reflection parameters; pan each of the early reflection signals to one or more respective channel positions of a third channel layout of the multiple channel layouts to obtain panned early reflection signals; and generate an output binaural signal, based on the audio data and the panned early reflection signals, that represents the one or more audio sources with artificial reverberation.

According to Example 158, a device includes a memory configured to store channel layout data; and one or more processors coupled to the memory and configured to: obtain audio data that represents one or more audio sources, the audio data corresponding to a first channel layout; downmix the audio data from the first channel layout to a second channel layout; obtain early reflection signals based on the downmixed audio data and spatialized reflection parameters; pan each of the early reflection signals to one or more respective channel positions of the first channel layout to obtain panned early reflection signals; mix the panned early reflection signals with the audio data in the first channel layout to generate mixed audio data; and generate an output binaural signal, based on the mixed audio data, that represents the one or more audio sources with artificial reverberation.

According to Example 159, a method includes obtaining, at one or more processors, audio data representing one or more audio sources; generating, at the one or more processors, early reflection signals based on the audio data and spatialized reflection parameters; panning, at the one or more processors, each of the early reflection signals to one or more respective candidate channel position of multiple candidate channel positions to generate panned early reflection signals; and generating, at the one or more processors, an output binaural signal based on the audio data and the panned early reflection signals, the output binaural signal representing the one or more audio sources with artificial reverberation.

Example 160 includes the method of Example 159, wherein obtaining the early reflection signals includes: converting the audio data from a first channel layout to a second channel layout; and obtaining the early reflection signals based on the audio data in the second channel layout.

Example 161 includes the method of Example 160, wherein the multiple candidate channel positions correspond to a third channel layout.

Example 162 includes the method of Example 161, wherein the third channel layout matches the first channel layout.

Example 163 includes the method of Example 161, wherein the second channel layout includes fewer channels than the first channel layout, and wherein converting the audio data from a first channel layout to a second channel layout includes downmixing the audio data from the first channel layout to the second channel layout.

Example 164 includes method of Example 163, wherein the third channel layout matches the first channel layout.

Example 165 includes the method of any of Examples 159 to 164, wherein the output binaural signal is rendered using a single binauralizer of a multi-channel convolution renderer.

Example 166 includes the method of any of Examples 159 to 165, further comprising initializing the binauralizer based on the multiple candidate channel positions.

Example 167 includes the method of any of Examples 159 to 166, wherein the multiple candidate channel positions correspond to an early reflection channel container.

Example 168 includes the method of any of Examples 159 to 167 and further includes panning each of the one or more audio sources to one or more respective candidate channel positions of the multiple candidate channel positions to generate panned audio source signals, and wherein generating the output binaural signal is based on the panned audio source signals.

Example 169 includes the method of any of Examples 159 to 168 and further includes mixing the audio data with the panned early reflection signals.

Example 170 includes the method of any of Examples 159 to 169 and further includes providing the output binaural signal for playout at earphone speakers.

According to Example 171, a method includes obtaining, at one or more processors, audio data that represents one or more audio sources, the audio data corresponding to a first channel layout; converting, at the one or more processors, the audio data from the first channel layout to a second channel layout; obtaining, at the one or more processors, early reflection signals based on the audio data in the second channel layout and spatialized reflection parameters; panning, at the one or more processors, each of the early reflection signals to one or more respective channel positions of a third channel layout to obtain panned early reflection signals; and generating, at the one or more processors, an output binaural signal, based on the audio data and the panned early reflection signals, that represents the one or more audio sources with artificial reverberation.

According to Example 172, a method includes obtaining, at one or more processors, audio data that represents one or more audio sources, the audio data corresponding to a first channel layout; downmixing, at the one or more processors, the audio data from the first channel layout to a second channel layout; obtaining, at the one or more processors, early reflection signals based on the downmixed audio data and spatialized reflection parameters; panning, at the one or more processors, each of the early reflection signals to one or more respective channel positions of the first channel layout to obtain panned early reflection signals; mixing, at the one or more processors, the panned early reflection signals with the audio data in the first channel layout to generate mixed audio data; and generating, at the one or more processors, an output binaural signal, based on the mixed audio data, that represents the one or more audio sources with artificial reverberation.

According to Example 173, a non-transitory computer-readable medium comprises instructions that, when executed by one or more processors, cause the one or more processors to obtain audio data representing one or more audio sources; generate early reflection signals based on the audio data and spatialized reflection parameters; pan each of the early reflection signals to one or more respective candidate channel position of multiple candidate channel positions to generate panned early reflection signals; and generate an output binaural signal, based on the audio data and the panned early reflection signals, that represents the one or more audio sources with artificial reverberation.

According to Example 174, an apparatus includes means for obtaining audio data that represents one or more audio sources; means for generating early reflection signals based on the audio data and spatialized reflection parameters; means for panning each of the early reflection signals to one or more respective candidate channel position of multiple candidate channel positions to generate panned early reflection signals; and means for generating an output binaural signal, based on the audio data and the panned early reflection signals, that represents the one or more audio sources with artificial reverberation.

The foregoing techniques may be performed with respect to any number of different contexts and audio ecosystems. A number of example contexts are described below, although the techniques should not be limited to the example contexts. One example audio ecosystem may include audio content, movie studios, music studios, gaming audio studios, channel based audio content, coding engines, game audio stems, game audio coding/rendering engines, and delivery systems.

The movie studios, the music studios, and the gaming audio studios may receive audio content. In some examples, the audio content may represent the output of an acquisition. The movie studios may output channel based audio content (e.g., in 2.0, 5.1, and 7.1) such as by using a digital audio workstation (DAW). The music studios may output channel based audio content (e.g., in 2.0, and 5.1) such as by using a DAW. In either case, the coding engines may receive and encode the channel based audio content based on one or more codecs (e.g., AAC, AC3, Dolby True HD, Dolby Digital Plus, and DTS Master Audio) for output by the delivery systems. The gaming audio studios may output one or more game audio stems, such as by using a DAW. The game audio coding/rendering engines may code and or render the audio stems into channel based audio content for output by the delivery systems. Another example context in which the techniques may be performed includes an audio ecosystem that may include broadcast recording audio objects, professional audio systems, consumer on-device capture, ambisonics audio data format, on-device rendering, consumer audio, TV, and accessories, and car audio systems.

The broadcast recording audio objects, the professional audio systems, and the consumer on-device capture may all code their output using ambisonics audio format. In this way, the audio content may be coded using the ambisonics audio format into a single representation that may be played back using the on-device rendering, the consumer audio, TV, and accessories, and the car audio systems. In other words, the single representation of the audio content may be played back at a generic audio playback system (i.e., as opposed to requiring a particular configuration such as 5.1, 7.1, etc.).

Other examples of context in which the techniques may be performed include an audio ecosystem that may include acquisition elements, and playback elements. The acquisition elements may include wired and/or wireless acquisition devices (e.g., Eigen microphones), on-device surround sound capture, and mobile devices (e.g., smartphones and tablets). In some examples, wired and/or wireless acquisition devices may be coupled to mobile device via wired and/or wireless communication channel(s).

In accordance with one or more techniques of this disclosure, the mobile device may be used to acquire a sound field. For instance, the mobile device may acquire a sound field via the wired and/or wireless acquisition devices and/or the on-device surround sound capture (e.g., a plurality of microphones integrated into the mobile device). The mobile device may then code the acquired sound field into the ambisonics coefficients for playback by one or more of the playback elements. For instance, a user of the mobile device may record (acquire a sound field of) a live event (e.g., a meeting, a conference, a play, a concert, etc.), and code the recording into ambisonics coefficients.

The mobile device may also utilize one or more of the playback elements to playback the ambisonics coded sound field. For instance, the mobile device may decode the ambisonics coded sound field and output a signal to one or more of the playback elements that causes the one or more of the playback elements to recreate the sound field. As one example, the mobile device may utilize the wired and/or wireless communication channels to output the signal to one or more speakers (e.g., speaker arrays, sound bars, etc.). As another example, the mobile device may utilize docking solutions to output the signal to one or more docking stations and/or one or more docked speakers (e.g., sound systems in smart cars and/or homes). As another example, the mobile device may utilize headphone rendering to output the signal to a set of headphones, e.g., to create realistic binaural sound.

In some examples, a particular mobile device may both acquire a 3D sound field and playback the same 3D sound field at a later time. In some examples, the mobile device may acquire a 3D sound field, encode the 3D sound field into ambisonics, and transmit the encoded 3D sound field to one or more other devices (e.g., other mobile devices and/or other non-mobile devices) for playback.

Yet another context in which the techniques may be performed includes an audio ecosystem that may include audio content, game studios, coded audio content, rendering engines, and delivery systems. In some examples, the game studios may include one or more DAWs which may support editing of ambisonics signals. For instance, the one or more DAWs may include ambisonics plugins and/or tools which may be configured to operate with (e.g., work with) one or more game audio systems. In some examples, the game studios may output new stem formats that support ambisonics audio data. In any case, the game studios may output coded audio content to the rendering engines which may render a sound field for playback by the delivery systems.

The techniques may also be performed with respect to exemplary audio acquisition devices. For example, the techniques may be performed with respect to an Eigen microphone which may include a plurality of microphones that are collectively configured to record a 3D sound field. In some examples, the plurality of microphones of the Eigen microphone may be located on the surface of a substantially spherical ball with a radius of approximately 4 cm.

Another exemplary audio acquisition context may include a production truck which may be configured to receive a signal from one or more microphones, such as one or more Eigen microphones. The production truck may also include an audio encoder.

The mobile device may also, in some instances, include a plurality of microphones that are collectively configured to record a 3D sound field. In other words, the plurality of microphones may have X, Y, Z diversity. In some examples, the mobile device may include a microphone which may be rotated to provide X, Y, Z diversity with respect to one or more other microphones of the mobile device. The mobile device may also include an audio encoder.

Example audio playback devices that may perform various aspects of the techniques described in this disclosure are further discussed below. In accordance with one or more techniques of this disclosure, speakers and/or sound bars may be arranged in any arbitrary configuration while still playing back a 3D sound field. Moreover, in some examples, headphone playback devices may be coupled to a decoder via either a wired or a wireless connection. In accordance with one or more techniques of this disclosure, a single generic representation of a sound field may be utilized to render the sound field on any combination of the speakers, the sound bars, and the headphone playback devices.

A number of different example audio playback environments may also be suitable for performing various aspects of the techniques described in this disclosure. For instance, a 5.1 speaker playback environment, a 2.0 (e.g., stereo) speaker playback environment, a 9.1 speaker playback environment with full height front loudspeakers, a 22.2 speaker playback environment, a 16.0 speaker playback environment, an automotive speaker playback environment, and a mobile device with ear bud playback environment may be suitable environments for performing various aspects of the techniques described in this disclosure.

In accordance with one or more techniques of this disclosure, a single generic representation of a sound field may be utilized to render the sound field on any of the foregoing playback environments. Additionally, the techniques of this disclosure enable a renderer to render a sound field from a generic representation for playback on the playback environments other than that described above. For instance, if design considerations prohibit proper placement of speakers according to a 7.1 speaker playback environment (e.g., if it is not possible to place a right surround speaker), the techniques of this disclosure enable a renderer to compensate with the other 6 speakers such that playback may be achieved on a 6.1 speaker playback environment.

Moreover, a user may watch a sports game while wearing headphones. In accordance with one or more techniques of this disclosure, the 3D sound field of the sports game may be acquired (e.g., one or more Eigen microphones may be placed in and/or around the baseball stadium), HOA coefficients corresponding to the 3D sound field may be obtained and transmitted to a decoder, the decoder may reconstruct the 3D sound field based on the HOA coefficients and output the reconstructed 3D sound field to a renderer, the renderer may obtain an indication as to the type of playback environment (e.g., headphones), and render the reconstructed 3D sound field into signals that cause the headphones to output a representation of the 3D sound field of the sports game.

It should be noted that various functions performed by the one or more components of the systems and devices disclosed herein are described as being performed by certain components. This division of components is for illustration only. In an alternate implementation, a function performed by a particular component may be divided amongst multiple components. Moreover, in an alternate implementation, two or more components may be integrated into a single component or module. Each component may be implemented using hardware (e.g., a field-programmable gate array (FPGA) device, an application-specific integrated circuit (ASIC), a DSP, a controller, etc.), software (e.g., instructions executable by a processor), or any combination thereof.

Those of skill would further appreciate that the various illustrative logical blocks, configurations, circuits, and algorithm steps described in connection with the implementations disclosed herein may be implemented as electronic hardware, computer software executed by a processing device such as a hardware processor, or combinations of both. Various illustrative components, blocks, configurations, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be embodied directly in hardware, in a software module executed by a processor, or in a combination of the two. A software module may reside in a memory device, such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary memory device is coupled to the processor such that the processor can read information from, and write information to, the memory device. In the alternative, the memory device may be integral to the processor. The processor and the storage medium may reside in an application-specific integrated circuit (ASIC). The ASIC may reside in a computing device or a user terminal. In the alternative, the processor and the storage medium may reside as discrete components in a computing device or a user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A device comprising:

a memory configured to store data corresponding to multiple candidate channel positions; and one or more processors coupled to the memory and configured to:

obtain audio data that represents one or more audio sources;

convert the audio data from a first channel layout to a second channel layout;

obtain early reflection signals based on the audio data in the second channel layout and spatialized reflection parameters;

pan each of the early reflection signals to one or more respective candidate channel positions of the multiple candidate channel positions to obtain panned early reflection signals; and generate an output binaural signal, based on the audio data and the panned early reflection signals, that represents the one or more audio sources with artificial reverberation.

2. The device of claim 1, wherein the multiple candidate channel positions correspond to a third channel layout.

3. The device of claim 1, wherein the output binaural signal is rendered using a single binauralizer of a multichannel convolution renderer.

4. The device of claim 1, wherein the data corresponding to the multiple candidate channel positions includes an early reflection channel container.

5. The device of claim 1, wherein the one or more processors are configured to pan each of the one or more audio sources to one or more respective candidate channel positions of the multiple candidate channel positions to obtain panned audio source signals, and wherein the output binaural signal is based on the panned audio source signals.

6. The device of claim 1, wherein the one or more processors are configured to mix the audio data with the panned early reflection signals.

7. The device of claim 1, wherein the one or more processors are configured to provide the output binaural signal for playout at earphone speakers.

8. The device of claim 1, wherein the one or more processors are configured to obtain a set of reflection data including reflection direction of arrival data, time of arrival delay data, and gain data for multiple reflections, wherein the set of reflection data is based at least partially on the spatialized reflection parameters, and wherein the early reflection signals are based on the set of reflection data.

9. The device of claim 1, wherein the one or more processors are configured to obtain head-tracking data that includes rotation data corresponding to a rotation of a head-mounted playback device, and wherein the output binaural signal is generated further based on the rotation data.

10. The device of claim 9, wherein the head-tracking data further includes translation data corresponding to a change of location of the head-mounted playback device, and wherein the early reflection signals are further based on the translation data.

11. The device of claim 1, wherein the audio data includes object-based audio data, channel-based audio data, or a combination thereof.

12. The device of claim 1, wherein the audio data corresponds to multiple virtual sources.

13. The device of claim 1, further comprising one or more microphones coupled to the one or more processors and configured to provide microphone data representing sound of at least one of the one or more audio sources, and wherein the audio data is at least partially based on the microphone data.

14. The device of claim 1, wherein the one or more processors are integrated in a headset device, and wherein the output binaural signal, the panned early reflection signals, or both, are based on movement of the headset device.

15. The device of claim 2, wherein the third channel layout matches the first channel layout.

16. The device of claim 4, wherein the early reflection channel container includes a data structure including azimuth and elevation data for each of the plurality of candidate channel positions.

17. The device of claim 1, wherein the panning of each of the early reflection signals to one or more respective candidate channel positions of the multiple candidate channel positions comprises panning each of the early reflection signals to a nearest candidate channel position of the plurality of candidate channel positions.

18. The device of claim 1, wherein the second channel layout includes fewer channels than the first channel layout, and wherein the conversion of the audio data from a first channel layout to a second channel layout comprises downmixing the audio data to convert the audio data from the first channel layout to the second channel layout.

19. The device of claim 1, wherein the conversion of the audio data from the first channel layout to the second channel layout comprises conversion of a first number of audio channels in the first channel layout to a second number of audio channels in the second channel layout.

20. A method comprising:

obtaining, at one or more processors, audio data representing one or more audio sources;

converting, at the one or more processors, the audio data from a first channel layout to a second channel layout;

obtaining, at the one or more processors, early reflection signals based on the audio data in the second channel layout and spatialized reflection parameters;

panning, at the one or more processors, each of the early reflection signals to one or more respective candidate channel positions of multiple candidate channel positions to obtain panned early reflection signals; and generating, at the one or more processors, an output binaural signal based on the audio data and the panned early reflection signals, the output binaural signal representing the one or more audio sources with artificial reverberation.

* * * * *